United States Patent
Ma et al.

(10) Patent No.: US 11,329,758 B2
(45) Date of Patent: May 10, 2022

(54) INFORMATION PROCESSING METHOD AND WIRELESS TRANSMISSION DEVICE

(71) Applicant: Huawei Technologies Co., Ltd., Shenzhen (CN)

(72) Inventors: Liang Ma, Shanghai (CN); Xin Zeng, Shenzhen (CN); Yuejun Wei, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 21 days.

(21) Appl. No.: 16/875,766

(22) Filed: May 15, 2020

(65) Prior Publication Data

US 2020/0280389 A1 Sep. 3, 2020

Related U.S. Application Data

(63) Continuation of application No. PCT/CN2018/077287, filed on Feb. 26, 2018.

(30) Foreign Application Priority Data

Nov. 17, 2017 (CN) .......................... 201711148200.1
Nov. 22, 2017 (CN) .......................... 201711173932.6
Nov. 25, 2017 (CN) ................. PCT/CN2017/112985

(51) Int. Cl.
*H04W 72/04* (2009.01)
*H04L 1/00* (2006.01)
(Continued)

(52) U.S. Cl.
CPC .......... *H04L 1/0009* (2013.01); *H04L 1/0003* (2013.01); *H04L 27/18* (2013.01); *H04L 27/34* (2013.01); *H04W 72/04* (2013.01)

(58) Field of Classification Search
CPC ..... H04L 1/0009; H04L 1/0003; H04L 27/18; H04L 27/34; H04W 72/04
See application file for complete search history.

(56) References Cited

U.S. PATENT DOCUMENTS 10,651,887 B2 * 5/2020 Yuan ...................... H04B 1/707
2005/0025254 A1 * 2/2005 Awad .................... H04L 1/0009
375/295

(Continued)

FOREIGN PATENT DOCUMENTS

CN 101686098 A 3/2010
CN 102098124 A 6/2011
(Continued)

OTHER PUBLICATIONS

"Code Rate Definition for BG Selection," 3GPP TSG RAN WG1 Meeting AH_NR#3, Nagoya, Japan, R1-1716025, Total 4 pages, 3rd Generation Partnership Project, Valbonne, France (Sep. 18-21, 2017).

(Continued)

*Primary Examiner* — Fahmida S Chowdhury
(74) *Attorney, Agent, or Firm* — Leydig, Voit & Mayer, Ltd.

(57) ABSTRACT

Embodiments of this application provide an information processing method and a wireless transmission device. The method includes: obtaining, by a wireless transmission device, a target modulation and coding scheme MCS level; determining, by the wireless transmission device based on a correspondence among MCS levels, modulation schemes, and transport block parameters, a target modulation scheme and a target transport block parameter that correspond to the target MCS level; and performing, by the wireless transmission device, low-density parity-check code LDPC coding or decoding on a transport block based on the target modulation scheme and the target transport block parameter. According (Continued)

to the foregoing technical solution, a wireless transmission device in a system in which LDPC coding is used may perform LDPC coding or decoding on a transport block.

20 Claims, 6 Drawing Sheets

(51) Int. Cl.
*H04L 27/18* (2006.01)
*H04L 27/34* (2006.01)

(56) References Cited

U.S. PATENT DOCUMENTS

| | | | | |
|---|---|---|---|---|
| 2008/0274700 | A1* | 11/2008 | Li | H04L 1/0003 455/67.11 |
| 2010/0309793 | A1* | 12/2010 | Choi | H04L 1/0027 370/252 |
| 2013/0155990 | A1* | 6/2013 | Nishio | H04L 5/0032 370/329 |
| 2015/0200746 | A1* | 7/2015 | Pan | H04L 1/00 370/329 |
| 2015/0358194 | A1* | 12/2015 | Yu | H04L 1/0041 370/329 |
| 2017/0041817 | A1* | 2/2017 | Shomura | H04W 28/0268 |
| 2018/0026740 | A1* | 1/2018 | Chen | G01N 33/487 370/328 |
| 2018/0367253 | A1* | 12/2018 | Nammi | H04L 1/08 |
| 2019/0013901 | A1* | 1/2019 | Nimbalker | H04L 1/1896 |
| 2019/0132087 | A1* | 5/2019 | Wu | H04L 5/0055 |

FOREIGN PATENT DOCUMENTS

| | | |
|---|---|---|
| CN | 103634851 A | 3/2014 |
| CN | 104168084 A | 11/2014 |
| CN | 104243086 A | 12/2014 |
| CN | 104601291 A | 5/2015 |
| CN | 105453468 A | 3/2016 |
| CN | 106464645 A | 2/2017 |
| CN | 106549726 A | 3/2017 |
| CN | 106559171 A | 4/2017 |
| CN | 107070597 A | 8/2017 |
| CN | 104509157 B | 12/2018 |
| GB | 2533412 A | 6/2016 |
| WO | 2014155899 A1 | 10/2014 |
| WO | 2015164251 A1 | 10/2015 |
| WO | 2016097688 A1 | 6/2016 |
| WO | 2016148944 A1 | 9/2016 |

OTHER PUBLICATIONS

"CQI and MCS Design for NR," 3GPP TSG RAN WG1 Meeting NR #3, Nagoya, Japan, R1-1716296, pp. 1-6, 3rd Generation Partnership Project, Valbonne, France (Sep. 18-21, 2017).

"LDPC Codes for NR," 3GPP TSG RAN WG1 Meeting #87, Reno, USA, R1-1612937, Total 3 pages, 3rd Generation Partnership Project, Valbonne, France (Nov. 14-18, 2016).

"CQI/MCS for NR," 3GPP TSG RAN WG1 Meeting 90bis, Prague, CZ, R1-1717370, pp. 1-6, 3rd Generation Partnership Project, Valbonne, France (Oct. 9-13, 2017).

"On CQI and MGS," 3GPP TSG RAN WG1 Meeting #90bis, Prague, Czech Republic, R1-1717426, pp. 1-9, 3rd Generation Partnership Project, Valbonne, France (Oct. 9-13, 2017).

"Discussion on TBS and MCS designs," 3GPP TSG RAN WG1 Meeting 91, Reno, USA, R1-1721390, pp. 1-11, 3rd Generation Partnership Project, Valbonne, France (Nov. 27-Dec. 1, 2017).

"Remaining details of CQI and MCS design," 3GPP TSG RAN WG1 Meeting #91, Reno, USA, R1-1721433, pp. 1-10, 3rd Generation Partnership Project, Valbonne, France (Nov. 27-Dec. 1, 2017).

* cited by examiner

INFORMATION PROCESSING METHOD AND WIRELESS TRANSMISSION DEVICE

CROSS-REFERENCE TO RELATED APPLICATIONS

This application is a continuation of International Application No. PCT/CN2018/077287, filed on Feb. 26, 2018, which claims priority to International Patent Application No. PCT/CN2017/112985, filed on Nov. 25, 2017 and Chinese Patent Application No. 201711148200.1, filed on Nov. 17, 2017 and Chinese Patent Application No. 201711173932.6, filed on Nov. 22, 2017. The disclosures of the aforementioned applications are hereby incorporated by reference in their entireties.

TECHNICAL FIELD

This application relates to the communications field, and more specifically, to an information processing method and a wireless transmission device in a communications system.

BACKGROUND

In a long term evolution (LTE) communications system, a turbo code is used to code a data channel. A length of a code word before coding and a length of a coded code word are determined by using a modulation and coding scheme (MCS) table and a transport block size (TBS) table. Then, the encoder codes to-be-coded data based on the length of the code word before coding and the length of the coded code word.

In a fifth generation (5G) communications system, it has been determined that a low-density parity-check code (LDPC) is used for data channel coding. A coding method changes. Therefore, a coding procedure in which the turbo code is used to code the data channel cannot be directly applied to a scenario in which the LDPC is used for data channel coding.

SUMMARY

Embodiments of this application provide an information processing method and a wireless transmission device, so that the wireless transmission device can perform LDPC coding on a transport block.

According to a first aspect, an embodiment of this application provides an information processing method. The method includes: obtaining, by a wireless transmission device, a target modulation and coding scheme MCS level; and determining, by the wireless transmission device based on a correspondence among MCS levels, modulation schemes, and transport block parameters, a target modulation scheme and a target transport block parameter that correspond to the target MCS level, where the target modulation scheme and the target transport block parameter are used to perform low-density parity-check code LDPC coding or decoding on a to-be-transmitted block. According to the foregoing technical solution, a wireless transmission device in a system in which LDPC coding is used may perform LDPC coding and decoding on a transport block.

With reference to the first aspect, in a first possible implementation of the first aspect, the transport block parameter includes at least one of the following information: code rate information, quadrature amplitude modulation QAM symbol information, and LDPC base graph information.

With reference to the first aspect or the first possible implementation of the first aspect, in a second possible implementation of the first aspect, a correspondence between the MCS levels and the modulation schemes includes: $N_1$ MCS levels correspond to quadrature phase shift keying QPSK modulation, $N_2$ MCS levels correspond to 16 quadrature amplitude modulation QAM, and $N_3$ MCS levels correspond to 64QAM, where $N_1$ is equal to 11, 12, or 13, $N_2$ is equal to 8, 9, or 10, and $N_3$ is equal to 7, 8, or 9. According to the foregoing technical solution, the wireless transmission device may select an appropriate MCS level for modulation and coding, to fully use a channel.

With reference to the first aspect or the first possible implementation of the first aspect, in a third possible implementation of the first aspect, a correspondence between the MCS levels and the modulation schemes includes: $M_1$ MCS levels correspond to quadrature phase shift keying QPSK modulation, $M_2$ MCS levels correspond to 16 quadrature amplitude modulation QAM, $M_3$ MCS levels correspond to 64QAM, and $M_4$ MCS levels correspond to 256QAM, where $M_1$ is equal to 6, 9, 10, or 11, $M_2$ is equal to 5, 6, or 7, $M_3$ is equal to 5, 6, or 7, and $M_4$ is equal to 5, 6, 7, or 10. According to the foregoing technical solution, the wireless transmission device may select an appropriate MCS level for modulation and coding, to fully use a channel.

With reference to the second possible implementation of the first aspect, in a fourth possible implementation of the first aspect, $a_1$ of the $N_1$ MCS levels respectively correspond to $a_1$ of the following 12 code rates, where $a_1$ is a positive integer greater than or equal to 1 and less than or equal to $N_1$: $0.11645+A1_1$, $0.14015+A1_2$, $0.17095+A1_3$, $0.2123+A1_4$, $0.25+A1_5$, $0.3026+A1_6$, $0.37285+A1_7$, $0.44105+A1_8$, $0.5202+A1_9$, $0.59885+A1_{10}$, $0.6789+A1_{11}$, and $0.76085+A1_{12}$, where values of $A1_1$ to $A1_{12}$ are greater than or equal to $-0.02$ and less than or equal to 0.02; $a_2$ of the $N_2$ MCS levels respectively correspond to $a_2$ of the following nine code rates, where $a_2$ is a positive integer greater than or equal to 1 and less than or equal to 9: $0.380425+A2_1$, $0.4378+A2_2$, $0.50175+A2_3$, $0.56155+A2_4$, $0.61965+A2_5$, $0.68145+A2_6$, $0.7455+A2_7$, $0.8059+A2_8$, and $0.8613+A2_9$, where values of $A2_1$ to $A2_9$ are greater than or equal to $-0.02$ and less than or equal to 0.02; and $a_3$ of the $N_3$ MCS levels respectively correspond to $a_3$ of the following eight code rates, where $a_3$ is a positive integer greater than or equal to 1 and less than or equal to 8: $0.5742+A3_1$, $0.6297+A3_2$, $0.686517+A3_3$, $0.74525+A3_4$, $0.801633+A3_5$, $0.855+A3_6$, $0.8976+A3_7$, and $0.931883+A3_8$, where values of $A3_1$ to $A3_8$ are greater than or equal to $-0.02$ and less than or equal to 0.02. According to the foregoing technical solution, the wireless transmission device may select an appropriate MCS level for modulation and coding, to fully use a channel.

With reference to the third possible implementation of the first aspect, in a fifth possible implementation of the first aspect, $b_1$ of the $M_1$ MCS levels respectively correspond to $b_1$ of the following 10 code rates, where $b_1$ is a positive integer greater than or equal to 1 and less than or equal to 10: $0.07615+B1_1$, $0.1038+B1_2$, $0.1385+B1_3$, $0.1916+B1_4$, $0.25+B1_5$, $0.334+B1_6$, $0.4263+B1_7$, $0.53645+B1_8$, $0.6472+B1_9$, and $0.76085+B1_{10}$, where values of $B1_1$ to $B1_{10}$ are greater than or equal to $-0.02$ and less than or equal to 0.02; $b_2$ of the $M_2$ MCS levels respectively correspond to $b_2$ of the following six code rates, where $b_2$ is a positive integer greater than or equal to 1 and less than or equal to 6: $0.380425+B2_1$, $0.475875+B2_2$, $0.57355+B2_3$, $0.669525+B2_4$, $0.769825+B2_5$, and $0.8613+B2_6$, where values of $B2_1$ to $B2_6$ are greater than or equal to $-0.02$ and less than or equal to 0.02; $b_3$ of the $M_3$ MCS levels respectively correspond to $b_3$ of the following six code rates, where $b_3$ is a positive integer greater than or equal to 1 and less than or equal to 6: $0.5742+B3_1$, $0.646333+B3_2$, $0.71735+B3_3$, $0.790617+B3_4$, $0.858633+B3_5$, and $0.909883+B3_6$, where values of $B3_1$ to $B3_6$ are greater than or equal to $-0.02$ and less than or equal to $0.02$; and $b_4$ of the $M_4$ MCS levels respectively correspond to $b_4$ of the following six code rates, where $b_3$ is a positive integer greater than or equal to 1 and less than or equal to $M_4$: $0.682413+B4_1$, $0.74005+B4_2$, $0.793138+B4_3$, $0.83415+B4_4$, $0.889425+B4_5$, and $0.925788+B4_6$, where values of $B4_1$ to $B4_6$ are greater than or equal to $-0.02$ and less than or equal to $0.02$. According to the foregoing technical solution, the wireless transmission device may select an appropriate MCS level for modulation and coding, to fully use a channel.

With reference to the second possible implementation of the first aspect, in a sixth possible implementation of the first aspect, $c_1$ of the $N_1$ MCS levels respectively correspond to $c_1$ of the following 12 code rates, where $c_1$ is a positive integer greater than or equal to 1 and less than or equal to $N_1$: $0.1164+C1_1$, $0.14355+C1_2$, $0.1748+C1_3$, $0.20895+C1_4$, $0.25+C1_5$, $0.30295+C1_6$, $0.3648+C1_7$, $0.43265+C1_8$, $0.50865+C1_9$, $0.5912+C1_{10}$, $0.67685+C1_{11}$, and $0.7543+C1_{12}$, where values of $C1_1$ to $C1_{12}$ are greater than or equal to $-0.02$ and less than or equal to $0.02$; $c_2$ of the $N_2$ MCS levels respectively correspond to $c_2$ of the following nine code rates, where $c_2$ is a positive integer greater than or equal to 1 and less than or equal to 9: $0.37715+C2_1$, $0.432575+C2_2$, $0.4931+C2_3$, $0.553125+C2_4$, $0.619125+C2_5$, $0.686175+C2_6$, $0.746675+C2_7$, $0.803675+C2_8$, and $0.856475+C2_9$, where values of $C2_1$ to $C2_9$ are greater than or equal to $-0.02$ and less than or equal to $0.02$; and $c_3$ of the $N_3$ MCS levels respectively correspond to $c_3$ of the following eight code rates, where $c_3$ is a positive integer greater than or equal to 1 and less than or equal to 8: $0.570983+C3_1$, $0.620917+C3_2$, $0.671933+C3_3$, $0.722083+C3_4$, $0.76655+C3_5$, $0.809317+C3_6$, $0.850817+C3_7$, and $0.8894+C3_8$, where values of $C3_1$ to $C3_8$ are greater than or equal to $-0.02$ and less than or equal to $0.02$. According to the foregoing technical solution, the wireless transmission device may select an appropriate MCS level for modulation and coding, to fully use a channel.

With reference to the second possible implementation of the first aspect, in a seventh possible implementation of the first aspect, $d_1$ of the $N_1$ MCS levels respectively correspond to $d_1$ of the following 12 code rates, where $d_1$ is a positive integer greater than or equal to 1 and less than or equal to $N_1$: $0.1164+D1_1$, $0.1464+D1_2$, $0.1808+D1_3$, $0.21985+D1_4$, $0.26605+D1_5$, $0.31815+D1_6$, $0.3807+D1_7$, $0.4466+D1_8$, $0.5188+D1_9$, $0.5989+D1_{10}$, $0.6811+D1_{11}$, and $0.7543+D1_{12}$, where values of $D1_1$ to $D1_{12}$ are greater than or equal to $-0.02$ and less than or equal to $0.02$; $d_2$ of the $N_2$ MCS levels respectively correspond to $d_2$ of the following nine code rates, where $d_2$ is a positive integer greater than or equal to 1 and less than or equal to 9: $0.37715+D2_1$, $0.432575+D2_2$, $0.4931+D2_3$, $0.553125+D2_4$, $0.619125+D2_5$, $0.686175+D2_6$, $0.746675+D2_7$, $0.803675+D2_8$, and $0.856475+D2_9$, where values of $D2_1$ to $D2_9$ are greater than or equal to $-0.02$ and less than or equal to $0.02$; and $d_3$ of the $N_3$ MCS levels respectively correspond to $d_3$ of the following eight code rates, where $d_3$ is a positive integer greater than or equal to 1 and less than or equal to 8: $0.570983+D3_1$, $0.620917+D3_2$, $0.671933+D3_3$, $0.722083+D3_4$, $0.76655+D3_5$, $0.809317+D3_6$, $0.850817+D3_7$, and $0.8894+D3_8$, where values of $D3_1$ to $D3_8$ are greater than or equal to $-0.02$ and less than or equal to $0.02$. According to the foregoing technical solution, the wireless transmission device may select an appropriate MCS level for modulation and coding, to fully use a channel.

With reference to the second possible implementation of the first aspect, in an eighth possible implementation of the first aspect, $e_1$ of the $N_1$ MCS levels respectively correspond to $e_1$ of the following 12 code rates, where $e_1$ is a positive integer greater than or equal to 1 and less than or equal to $N_1$: $0.11645+E1_1$, $0.14015+E1_2$, $0.17095+E1_3$, $0.2123+E1_4$, $0.25+E1_5$, $0.3017+E1_6$, $0.36235+E1_7$, $0.42695+E1_8$, $0.4979+E1_9$, $0.5748+E1_{10}$, $0.65355+E1_{11}$, and $0.7275+E1_{12}$, where values of $E1_1$ to $E1_{12}$ are greater than or equal to $-0.02$ and less than or equal to $0.02$; $e_2$ of the $N_2$ MCS levels respectively correspond to $e_2$ of the following nine code rates, where $e_2$ is a positive integer greater than or equal to 1 and less than or equal to 9: $0.36375+E2_1$, $0.421625+E2_2$, $0.479975+E2_3$, $0.542775+E2_4$, $0.606525+E2_5$, $0.669625+E2_6$, $0.72885+E2_7$, $0.7921+E2_8$, and $0.850275+E2_9$, where values of $E2_1$ to $E2_9$ are greater than or equal to $-0.02$ and less than or equal to $0.02$; and $e_3$ of the $N_3$ MCS levels respectively correspond to $e_3$ of the following eight code rates, where $e_3$ is a positive integer greater than or equal to 1 and less than or equal to 8: $0.56685+E3_1$, $0.616967+E3_2$, $0.666683+E3_3$, $0.721733+E3_4$, $0.781917+E3_5$, $0.840433+E3_6$, $0.887467+E3_7$, and $0.9258+E3_8$, where values of $E3_1$ to $E3_8$ are greater than or equal to $-0.02$ and less than or equal to $0.02$. According to the foregoing technical solution, the wireless transmission device may select an appropriate MCS level for modulation and coding, to fully use a channel.

With reference to the third possible implementation of the first aspect, in a ninth possible implementation of the first aspect, $f_1$ of the $M_1$ MCS levels respectively correspond to $f_1$ of the following 10 code rates, where $f_1$ is a positive integer greater than or equal to 1 and less than or equal to 10: $0.07615+F1_1$, $0.1038+F1_2$, $0.1385+F1_3$, $0.1916+F1_4$, $0.25+F1_5$, $0.33505+F1_6$, $0.4337+F1_7$, $0.5477+F1_8$, $0.67+F1_9$, and $0.7275+F1_{10}$, where values of $F1_1$ to $F1_{10}$ are greater than or equal to $-0.02$ and less than or equal to $0.02$; $f_2$ of the $M_2$ MCS levels respectively correspond to $f_2$ of the following six code rates, where $f_2$ is a positive integer greater than or equal to 1 and less than or equal to 6: $0.36375+F2_1$, $0.46505+F2_2$, $0.566+F2_3$, $0.67+F2_4$, $0.76105+F2_5$, and $0.850275+F2_6$, where values of $F2_1$ to $F2_6$ are greater than or equal to $-0.02$ and less than or equal to $0.02$; $f_3$ of the $M_3$ MCS levels respectively correspond to $f_3$ of the following six code rates, where $f_3$ is a positive integer greater than or equal to 1 and less than or equal to 6: $0.56685+F3_1$, $0.618567+F3_2$, $0.67+F3_3$, $0.737517+F3_4$, $0.809533+F3_5$, and $0.889833+F3_6$, where values of $F3_1$ to $F3_6$ are greater than or equal to $-0.02$ and less than or equal to $0.02$; and $f_4$ of the $M_4$ MCS levels respectively correspond to $f_4$ of the following six code rates, where $f_3$ is a positive integer greater than or equal to 1 and less than or equal to $M_4$: $0.667375+F4_1$, $0.720725+F4_2$, $0.7804+F4_3$, $0.837413+F4_4$, $0.885388+F4_5$, and $0.925788+F4_6$, where values of $F4_1$ to $F4_6$ are greater than or equal to $-0.02$ and less than or equal to $0.02$. According to the foregoing technical solution, the wireless transmission device may select an appropriate MCS level for modulation and coding, to fully use a channel.

With reference to the second possible implementation of the first aspect, in a tenth possible implementation of the first aspect, $g_1$ of the $N_1$ MCS levels respectively correspond to $g_1$ of the following 12 code rates, where $g_1$ is a positive integer greater than or equal to 1 and less than or equal to $N_1$: $0.11645+G1_1$, $0.14015+G1_2$, $0.17095+G1_3$, $0.2123+G1_4$, $0.25+G1_5$, $0.3017+G1_6$, $0.36235+G1_7$, $0.42695+G1_8$, $0.4979+G1_9$, $0.5748+G1_{10}$, $0.65355+G1_{11}$, and $0.7275+$ $G1_{12}$, where values of $G1_1$ to $G1_{12}$ are greater than or equal to −0.02 and less than or equal to 0.02; $g_2$ of the $N_2$ MCS levels respectively correspond to $g_2$ of the following nine code rates, where $g_2$ is a positive integer greater than or equal to 1 and less than or equal to 9: $0.36375+G2_1$, $0.421625+G2_2$, $0.479975+G2_3$, $0.542775+G2_4$, $0.606525+G2_5$, $0.669625+G2_6$, $0.72885+G2_7$, $0.7921+G2_8$, and $0.850275+G2_9$, where values of $G2_1$ to $G2_9$ are greater than or equal to −0.02 and less than or equal to 0.02; and $g_3$ of the $N_3$ MCS levels respectively correspond to $g_3$ of the following eight code rates, where $g_3$ is a positive integer greater than or equal to 1 and less than or equal to 8: $0.56685+G3_1$, $0.6254+G3_2$, $0.68335+G3_3$, $0.7352+G3_4$, $0.79195+G3_5$, $0.845983+G3_6$, $0.889833+G3_7$, and $0.9258+G3_8$, where values of $G3_1$ to $G3_8$ are greater than or equal to −0.02 and less than or equal to 0.02. According to the foregoing technical solution, the wireless transmission device may select an appropriate MCS level for modulation and coding, to fully use a channel.

With reference to the third possible implementation of the first aspect, in an eleventh possible implementation of the first aspect, $h_1$ of the $M_1$ MCS levels respectively correspond to $h_1$ of the following 10 code rates, where $h_1$ is a positive integer greater than or equal to 1 and less than or equal to 10: $0.07615+H1_1$, $0.1038+H1_2$, $0.1385+H1_3$, $0.1916+H1_4$, $0.25+H1_5$, $0.3259+H1_6$, $0.4135+H1_7$, $0.51365+H1_8$, $0.6225+H1_9$, and $0.7275+H1_{10}$, where values of $H1_1$ to $H1_{10}$ are greater than or equal to −0.02 and less than or equal to 0.02; $h_2$ of the $M_2$ MCS levels respectively correspond to $h_2$ of the following six code rates, where $h_2$ is a positive integer greater than or equal to 1 and less than or equal to 6: $0.36375+H2_1$, $0.4564+H2_2$, $0.5548+H2_3$, $0.656825+H2_4$, $0.75455+H2_5$, and $0.850275+H2_6$, where values of $H2_1$ to $H2_6$ are greater than or equal to −0.02 and less than or equal to 0.02; $h_3$ of the $M_3$ MCS levels respectively correspond to $h_3$ of the following six code rates, where $h_3$ is a positive integer greater than or equal to 1 and less than or equal to 6: $0.56685+H3_1$, $0.637167+H3_2$, $0.6998+H3_3$, $0.769117+H3_4$, $0.836+H3_5$, and $0.889833+H3_6$, where values of $H3_1$ to $H3_6$ are greater than or equal to −0.02 and less than or equal to 0.02; and $h_4$ of the $M_4$ MCS levels respectively correspond to $h_4$ of the following six code rates, where $h_3$ is a positive integer greater than or equal to 1 and less than or equal to $M_4$: $0.667375+H4_1$, $0.720725+H4_2$, $0.7804+H4_3$, $0.837413+H4_4$, $0.885388+H4_5$, and $0.925788+H4_6$, where values of $H4_1$ to $H4_6$ are greater than or equal to −0.02 and less than or equal to 0.02. According to the foregoing technical solution, the wireless transmission device may select an appropriate MCS level for modulation and coding, to fully use a channel.

With reference to the second possible implementation of the first aspect, in a twelfth possible implementation of the first aspect, $i_1$ of the $N_1$ MCS levels respectively correspond to $i_1$ of the following 13 code rates, where $i_1$ is a positive integer greater than or equal to 1 and less than or equal to $N_1$: $0.1164+I1_1$, $0.14395+I1_2$, $0.17495+I1_3$, $0.209+I1_4$, $0.25+I1_5$, $0.30165+I1_6$, $0.3646+I1_7$, $0.4314+I1_8$, $0.50725+I1_9$, $0.58645+I1_{10}$, $0.6687+I1_{11}$, and $0.7486+I1_{12}$, and $0.8153+I1_{13}$, where values of $I1_1$ to $I1_{13}$ are greater than or equal to −0.02 and less than or equal to 0.02; $i_2$ of the $N_2$ MCS levels respectively correspond to $i_2$ of the following eight code rates, where $i_2$ is a positive integer greater than or equal to 1 and less than or equal to 8: $0.40765+I2_1$, $0.4721+I2_2$, $0.548525+I2_3$, $0.621775+I2_4$, $0.679175+I2_5$, $0.7482+I2_6$, $0.807325+I2_7$, and $0.8516+I2_8$, where values of $I2_1$ to $I2_8$ are greater than or equal to −0.02 and less than or equal to 0.02; and $i_3$ of the $N_3$ MCS levels respectively correspond to $i_3$ of the following eight code rates, where $i_3$ is a positive integer greater than or equal to 1 and less than or equal to 8: $0.567733+I3_1$, $0.64035+I3_2$, $0.6909+I3_3$, $0.736917+I3_4$, $0.7964+I3_5$, $0.840233+I3_6$, $0.8746+I3_7$, and $0.9258+I3_8$, where values of $I3_1$ to $I3_8$ are greater than or equal to −0.02 and less than or equal to 0.02. According to the foregoing technical solution, the wireless transmission device may select an appropriate MCS level for modulation and coding, to fully use a channel.

With reference to the third possible implementation of the first aspect, in a thirteenth possible implementation of the first aspect, $j_1$ of the $M_1$ MCS levels respectively correspond to $j_1$ of the following 10 code rates, where $j_1$ is a positive integer greater than or equal to 1 and less than or equal to 10: $0.07615+J1_1$, $0.10385+J1_2$, $0.14265+J1_3$, $0.19055+J1_4$, $0.25+J1_5$, $0.33785+J1_6$, $0.44605+J1_7$, $0.56845+J1_8$, $0.7032+J1_9$, and $0.8153+J1_{10}$, where values of $J1_1$ to $J1_{10}$ are greater than or equal to −0.02 and is less than or equal to 0.02; $j_2$ of the $M_2$ MCS levels respectively correspond to $j_2$ of the following six code rates, where $j_2$ is a positive integer greater than or equal to 1 and less than or equal to 6: $0.40765+J2_1$, $0.5061+J2_2$, $0.60705+J2_3$, $0.69265+J2_4$, $0.786075+J2_5$, and $0.8516+J2_6$, where values of $J2_1$ to $J2_6$ are greater than or equal to −0.02 and less than or equal to 0.02; $j_3$ of the $M_3$ MCS levels respectively correspond to $j_3$ of the following six code rates, where $j_3$ is a positive integer greater than or equal to 1 and less than or equal to 6: $0.5677333+J3_1$, $0.6500667+J3_2$, $0.7232333+J3_3$, $0.8008333+J3_4$, $0.8519333+J3_5$, and $0.9049+J3_6$, where values of $J3_1$ to $J3_6$ are greater than or equal to −0.02 and less than or equal to 0.02; and $j_4$ of the $M_4$ MCS levels respectively correspond to $j_4$ of the following six code rates, where $j_3$ is a positive integer greater than or equal to 1 and less than or equal to $M_4$: $0.678675+J4_1$, $0.7476625+J4_2$, $0.8062625+J4_3$, $0.8406875+J4_4$, $0.90445+J4_5$, and $0.9257875+J4_6$, where values of $J4_1$ to $J4_6$ are greater than or equal to −0.02 and less than or equal to 0.02. According to the foregoing technical solution, the wireless transmission device may select an appropriate MCS level for modulation and coding, to fully use a channel.

With reference to the second possible implementation of the first aspect, in a fourteenth possible implementation of the first aspect, $k_1$ of the $N_1$ MCS levels respectively correspond to $k_1$ of the following 13 code rates, where $k_1$ is a positive integer greater than or equal to 1 and less than or equal to $N_1$: $0.1164+K1_1$, $0.14645+K1_2$, $0.1804+K1_3$, $0.21875+K1_4$, $0.2648+K1_5$, $0.31645+K1_6$, $0.3782+K1_7$, $0.4451+K1_8$, $0.51705+K1_9$, $0.5971+K1_{10}$, $0.6748+K1_{11}$, $0.75135+K1_{12}$, and $0.8153+K1_{13}$, where values of $K1_1$ to $K1_{13}$ are greater than or equal to −0.02 and less than or equal to 0.02; $k_2$ of the $N_2$ MCS levels respectively correspond to $k_2$ of the following eight code rates, where $k_2$ is a positive integer greater than or equal to 1 and less than or equal to 8: $0.40765+K2_1$, $0.4721+K2_2$, $0.548525+K2_3$, $0.621775+K2_4$, $0.679175+K2_5$, $0.7482+K2_6$, $0.807325+K2_7$, and $0.8516+K2_8$, where values of $K2_1$ to $K2_8$ are greater than or equal to −0.02 and less than or equal to 0.02; and $k_3$ of the $N_3$ MCS levels respectively correspond to $k_3$ of the following eight code rates, where $k_3$ is a positive integer greater than or equal to 1 and less than or equal to 8: $0.567733+K3_1$, $0.64035+K3_2$, $0.6909+K3_3$, $0.736917+K3_4$, $0.7964+K3_5$, $0.840233+K3_6$, $0.8746+K3_7$, and $0.9258+K3_8$, where values of $K3_1$ to $K3_8$ are greater than or equal to −0.02 and less than or equal to 0.02. According to the foregoing technical solution, the wireless transmission device may select an appropriate MCS level for modulation and coding, to fully use a channel.

With reference to the third possible implementation of the first aspect, in a fifteenth possible implementation of the first aspect, $o_1$ of the $M_1$ MCS levels respectively correspond to $o_1$ of the following 10 code rates, where $o_1$ is a positive integer greater than or equal to 1 and less than or equal to 10: $0.07615+O1_1$, $0.1073+O1_2$, $0.15195+O1_3$, $0.20685+O1_4$, $0.2785+O1_5$, $0.36715+O1_6$, $0.4707+O1_7$, $0.58845+O1_8$, $0.7134+O1_9$, and $0.8153+O1_{10}$, where values of $O1_1$ to $O1_{10}$ are greater than or equal to −0.02 and less than or equal to 0.02; $o_2$ of the $M_2$ MCS levels respectively correspond to $o_2$ of the following six code rates, where $o_2$ is a positive integer greater than or equal to 1 and less than or equal to 6: $0.40765+O2_1$, $0.5061+O2_2$, $0.60705+O2_3$, $0.69265+O2_4$, $0.786075+O2_5$, and $0.8516+O2_6$, where values of $O2_1$ to $O2_6$ are greater than or equal to −0.02 and less than or equal to 0.02; $o_3$ of the $M_3$ MCS levels respectively correspond to $o_3$ of the following six code rates, where $o_3$ is a positive integer greater than or equal to 1 and less than or equal to 6: $0.5677333+O3_1$, $0.6500667+O3_2$, $0.7232333+O3_3$, $0.8008333+O3_4$, $0.8519333+O3_5$, and $0.9049+O3_6$, where values of $O3_1$ to $O3_6$ are greater than or equal to −0.02 and less than or equal to 0.02; and $o_4$ of the $M_4$ MCS levels respectively correspond to $o_4$ of the following six code rates, where $o_3$ is a positive integer greater than or equal to 1 and less than or equal to $M_4$: $0.678675+O4_1$, $0.7476625+O4_2$, $0.8062625+O4_3$, $0.8406875+O4_4$, $0.90445+O4_5$, and $0.9257875+O4_6$, where values of $O4_1$ to $O4_6$ are greater than or equal to −0.02 and less than or equal to 0.02. According to the foregoing technical solution, the wireless transmission device may select an appropriate MCS level for modulation and coding, to fully use a channel.

With reference to the second possible implementation of the first aspect, in a sixteenth possible implementation of the first aspect, $p_1$ of the $N_1$ MCS levels respectively correspond to $p_1$ of the following 13 code rates, where $p_1$ is a positive integer greater than or equal to 1 and less than or equal to $N_1$: $0.11645+P1_1$, $0.1403+P1_2$, $0.17085+P1_3$, $0.21215+P1_4$, $0.25+P1_5$, $0.3031+P1_6$, $0.3659+P1_7$, $0.43295+P1_8$, $0.50625+P1_9$, $0.5862+P1_{10}$, $0.6667+P1_{11}$, $0.732+P1_{12}$, and $0.79885+P1_{13}$, where values of $P1_1$ to $P1_{13}$ are greater than or equal to −0.02 and less than or equal to 0.02; $p_2$ of the $N_2$ MCS levels respectively correspond to $p_2$ of the following eight code rates, where $p_2$ is a positive integer greater than or equal to 1 and less than or equal to 8: $0.399425+P2_1$, $0.469975+P2_2$, $0.535125+P2_3$, $0.602675+P2_4$, $0.6667+P2_5$, $0.730975+P2_6$, $0.802475+P2_7$, and $0.86225+P2_8$, where values of $P2_1$ to $P2_8$ are greater than or equal to −0.02 and less than or equal to 0.02; and $p_3$ of the $N_3$ MCS levels respectively correspond to $p_3$ of the following eight code rates, where $p_3$ is a positive integer greater than or equal to 1 and less than or equal to 8: $0.574833+P3_1$, $0.61845+P3_2$, $0.6667+P3_3$, $0.7207+P3_4$, $0.787767+P3_5$, $0.8409+P3_6$, $0.888517+P3_7$, and $0.9258+P3_8$, where values of $P3_1$ to $P3_8$ are greater than or equal to −0.02 and less than or equal to 0.02. According to the foregoing technical solution, the wireless transmission device may select an appropriate MCS level for modulation and coding, to fully use a channel.

With reference to the third possible implementation of the first aspect, in a seventeenth possible implementation of the first aspect, $q_1$ of the $M_1$ MCS levels respectively correspond to $q_1$ of the following 10 code rates, where $q_1$ is a positive integer greater than or equal to 1 and less than or equal to 10: $0.07615+Q1_1$, $0.10475+Q1_2$, $0.1393+Q1_3$, $0.1921+Q1_4$, $0.25+Q1_5$, $0.33475+Q1_6$, $0.43295+Q1_7$, $0.54555+Q1_8$, $0.67+Q1_9$, and $0.79885+Q1_{10}$, where values of $Q1_1$ to $Q1_{10}$ are greater than or equal to −0.02 and less than or equal to 0.02; $q_2$ of the $M_2$ MCS levels respectively correspond to $q_2$ of the following six code rates, where $q_2$ is a positive integer greater than or equal to 1 and less than or equal to 6: $0.399425+Q2_1$, $0.48785+Q2_2$, $0.5824+Q2_3$, $0.67+Q2_4$, $0.767675+Q2_5$, and $0.86225+Q2_6$, where values of $Q2_1$ to $Q2_6$ are greater than or equal to −0.02 and less than or equal to 0.02; $q_3$ of the $M_3$ MCS levels respectively correspond to $q_3$ of the following six code rates, where $q_3$ is a positive integer greater than or equal to 1 and less than or equal to 6: $0.574833+Q3_1$, $0.61845+Q3_2$, $0.66685+Q3_3$, $0.760367+Q3_4$, $0.843017+Q3_5$, and $0.910917+Q3_6$, where values of $Q3_1$ to $Q3_6$ are greater than or equal to −0.02 and less than or equal to 0.02; and $q_4$ of the $M_4$ MCS levels respectively correspond to $q_4$ of the following six code rates, where $q_3$ is a positive integer greater than or equal to 1 and less than or equal to $M_4$: $0.683188+Q4_1$, $0.735625+Q4_2$, $0.788138+Q4_3$, $0.845675+Q4_4$, $0.888875+Q4_5$, and $0.925788+Q4_6$, where values of $Q4_1$ to $Q4_6$ are greater than or equal to −0.02 and less than or equal to 0.02. According to the foregoing technical solution, the wireless transmission device may select an appropriate MCS level for modulation and coding, to fully use a channel.

With reference to the second possible implementation of the first aspect, in an eighteenth possible implementation of the first aspect, $r_1$ of the $N_1$ MCS levels respectively correspond to $r_1$ of the following 13 code rates, where $r_1$ is a positive integer greater than or equal to 1 and less than or equal to $N_1$: $0.11645+R1_1$, $0.1422+R1_2$, $0.17705+R1_3$, $0.2198+R1_4$, $0.26205+R1_5$, $0.3147+R1_6$, $0.3736+R1_7$, $0.43735+R1_8$, $0.50625+R1_9$, $0.58105+R1_{10}$, $0.6564+R1_{11}$, $0.7266+R1_{12}$, and $0.79885+R1_{13}$, where values of $R1_1$ to $R1_{13}$ are greater than or equal to −0.02 and less than or equal to 0.02; $r_2$ of the $N_2$ MCS levels respectively correspond to $r_2$ of the following eight code rates, where $r_2$ is a positive integer greater than or equal to 1 and less than or equal to 8: $0.399425+R2_1$, $0.472+R2_2$, $0.539875+R2_3$, $0.608825+R2_4$, $0.675125+R2_5$, $0.737775+R2_6$, $0.8053+R2_7$, and $0.86225+R2_8$, where values of $R2_1$ to $R2_8$ are greater than or equal to −0.02 and less than or equal to 0.02; and $r_3$ of the $N_3$ MCS levels respectively correspond to $r_3$ of the following eight code rates, where $r_3$ is a positive integer greater than or equal to 1 and less than or equal to 8: $0.574833+R3_1$, $0.637317+R3_2$, $0.6877+R3_3$, $0.739083+R3_4$, $0.7997+R3_5$, $0.848233+R3_6$, $0.891567+R3_7$, and $0.9258+R3_8$, where values of $R3_1$ to $R3_8$ are greater than or equal to −0.02 and less than or equal to 0.02. According to the foregoing technical solution, the wireless transmission device may select an appropriate MCS level for modulation and coding, to fully use a channel.

With reference to the third possible implementation of the first aspect, in a nineteenth possible implementation of the first aspect, $s_1$ of the $M_1$ MCS levels respectively correspond to $s_1$ of the following 10 code rates, where $s_1$ is a positive integer greater than or equal to 1 and less than or equal to 10: $0.07615+S1_1$, $0.1077+S1_2$, $0.14665+S1_3$, $0.2087+S1_4$, $0.27505+S1_5$, $0.3624+S1_6$, $0.46065+S1_7$, $0.5734+S1_8$, $0.6907+S1_9$, and $0.79885+S1_{10}$, where values of $S1_1$ to $S1_{10}$ are greater than or equal to −0.02 and less than or equal to 0.02; $s_2$ of the $M_2$ MCS levels respectively correspond to $s_2$ of the following six code rates, where $s_2$ is a positive integer greater than or equal to 1 and less than or equal to 6: $0.399425+S2_1$, $0.493975+S2_2$, $0.596975+S2_3$, $0.687375+S2_4$, $0.7766+S2_5$, and $0.86225+S2_6$, where values of $S2_1$ to $S2_6$ are greater than or equal to −0.02 and less than or equal to 0.02; $s_3$ of the $M_3$ MCS levels respectively correspond to $s_3$ of the following six code rates, where $s_3$ is a positive integer greater than or equal to 1 and less than or equal to 6: $0.574833+S3_1$, $0.651383+S3_2$, $0.714517+S3_3$, $0.79505+S3_4$, $0.8592+S3_5$, and $0.910917+S3_6$, where values of $S3_1$ to $S3_6$ are greater than or equal to −0.02 and less than or equal to 0.02; and $s_4$ of the $M_4$ MCS levels respectively correspond to $s_4$ of the following six code rates, where $s_3$ is a positive integer greater than or equal to 1 and less than or equal to $M_4$: $0.683188+S4_1$, $0.735625+S4_2$, $0.788138+S4_3$, $0.845675+S4_4$, $0.888875+S4_5$, and $0.925788+S4_6$, where values of $S4_1$ to $S4_6$ are greater than or equal to −0.02 and less than or equal to 0.02. According to the foregoing technical solution, the wireless transmission device may select an appropriate MCS level for modulation and coding, to fully use a channel.

With reference to the second possible implementation of the first aspect, in a twentieth possible implementation of the first aspect, $t_1$ of the $N_1$ MCS levels respectively correspond to $t_1$ of the following 13 code rates, where $t_1$ is a positive integer greater than or equal to 1 and less than or equal to $N_1$: $0.11645+T1_1$, $0.1403+T1_2$, $0.17085+T1_3$, $0.21215+T1_4$, $0.25+T1_5$, $0.7618+T1_6$, $0.281+T1_7$, $0.35345+T1_8$, $0.4122+T1_9$, $0.48055+T1_{10}$, $0.55045+T1_{11}$, $0.6178+T1_{12}$, and $0.68925+T1_{13}$, where values of $T1_1$ to $T1_{13}$ are greater than or equal to −0.02 and less than or equal to 0.02; $t_2$ of the $N_2$ MCS levels respectively correspond to $t_2$ of the following eight code rates, where $t_2$ is a positive integer greater than or equal to 1 and less than or equal to $N_2$: $0.3809+T2_1$, $0.4402+T2_2$, $0.511875+T2_3$, $0.587525+T2_4$, $0.658975+T2_5$, $0.7279+T2_6$, $0.8002+T2_7$, and $0.861525+T2_8$, where values of $T2_1$ to $T2_8$ are greater than or equal to −0.02 and less than or equal to 0.02; and $t_3$ of the $N_3$ MCS levels respectively correspond to $t_3$ of the following two code rates, where $t_3$ is a positive integer greater than or equal to 1 and less than or equal to $N_3$: $0.57435+T3_1$, $0.627567+T3_2$, $0.686883+T3_3$, $0.738683+T3_4$, $0.799033+T3_5$, $0.84815+T3_6$, $0.8919+T3_7$, and $0.9258+T3_8$, where values of $T3_1$ to $T3_8$ are greater than or equal to −0.02 and less than or equal to 0.02. According to the foregoing technical solution, the wireless transmission device may select an appropriate MCS level for modulation and coding, to fully use a channel.

With reference to the third possible implementation of the first aspect, in a twenty-first possible implementation of the first aspect, $u_1$ of the $M_1$ MCS levels respectively correspond to $u_1$ of the following 10 code rates, where $u_1$ is a positive integer greater than or equal to 1 and less than or equal to 10: $0.07615+U1_1$, $0.10475+U1_2$, $0.1393+U1_3$, $0.1921+U1_4$, $0.25+U1_5$, $0.33195+U1_6$, $0.4248+U1_7$, $0.5363+U1_8$, $0.6476+U1_9$, and $0.7618+U1_{10}$, where values of $U1_1$ to $U1_{10}$ are greater than or equal to −0.02 and less than or equal to 0.02; $u_2$ of the $M_2$ MCS levels respectively correspond to $u_2$ of the following six code rates, where $u_2$ is a positive integer greater than or equal to 1 and less than or equal to 6: $0.3809+U2_1$, $0.473575+U2_2$, $0.57265+U2_3$, $0.6707+U2_4$, $0.7707+U2_5$, and $0.8612+U2_6$, where values of $U2_1$ to $U2_6$ are greater than or equal to −0.02 and less than or equal to 0.02; $u_3$ of the $M_3$ MCS levels respectively correspond to $u_3$ of the following six code rates, where $u_3$ is a positive integer greater than or equal to 1 and less than or equal to 6: $0.574133+U3_1$, $0.650117+U3_2$, $0.7294+U3_3$, $0.80615+U3_4$, $0.87275+U3_5$, and $0.9225+U3_6$, where values of $U3_1$ to $U3_6$ are greater than or equal to −0.02 and less than or equal to 0.02; and $u_4$ of the $M_4$ MCS levels respectively correspond to $u_4$ of the following six code rates, where $u_3$ is a positive integer greater than or equal to 1 and less than or equal to $M_4$: $0.691875+U4_1$, $0.745525+U4_2$, $0.797338+U4_3$, $0.851438+U4_4$, $0.89085+U4_5$, and $0.925788+U4_6$, where values of $U4_1$ to $U4_6$ are greater than or equal to −0.02 and less than or equal to 0.02. According to the foregoing technical solution, the wireless transmission device may select an appropriate MCS level for modulation and coding, to fully use a channel.

With reference to the second possible implementation of the first aspect, in a twenty-second possible implementation of the first aspect, $t_1$ of the $N_1$ MCS levels respectively correspond to $v_1$ of the following 12 code rates, where $v_1$ is a positive integer greater than or equal to 1 and less than or equal to $N_1$: $0.07615+V1_1$, $0.1172+V1_2$, $0.1885+V1_3$, $0.24015+V1_4$, $0.3008+V1_5$, $0.3671+V1_6$, $0.4385+V1_7$, $0.5103+V1_8$, $0.5879+V1_9$, $0.66345+V1_{10}$, $0.7383+V1_{11}$, and $0.79885+V1_{12}$, where values of $V1_1$ to $V1_{12}$ are greater than or equal to −0.02 and less than or equal to 0.02; $v_2$ of the $N_2$ MCS levels respectively correspond to $v_2$ of the following nine code rates, where $v_2$ is a positive integer greater than or equal to 1 and less than or equal to $N_2$: $0.399425+V2_1$, $0.478525+V2_2$, $0.5397+V2_3$, $0.601575+V2_4$, $0.643275+V2_5$, $0.682625+V2_6$, $0.7632+V2_7$, $0.830575+V2_8$, and $0.86225+V2_9$, where values of $V2_1$ to $V2_9$ are greater than or equal to −0.02 and less than or equal to 0.02; and $v_3$ of the $N_3$ MCS levels respectively correspond to $v_3$ of the following eight code rates, where $v_3$ is a positive integer greater than or equal to 1 and less than or equal to $N_3$: $0.574833+V3_1$, $0.650383+V3_2$, $0.69205+V3_3$, $0.7539+V3_4$, $0.808917+V3_5$, $0.852533+V3_6$, $0.897067+V3_7$, and $0.925783+V3_8$, where values of $V3_1$ to $V3_8$ are greater than or equal to −0.02 and less than or equal to 0.02. According to the foregoing technical solution, the wireless transmission device may select an appropriate MCS level for modulation and coding, to fully use a channel.

With reference to the third possible implementation of the first aspect, in a twenty-third possible implementation of the first aspect, $w_1$ of the $M_1$ MCS levels respectively correspond to $w_1$ of the following six code rates, where $w_1$ is a positive integer greater than or equal to 1 and less than or equal to 6: $0.07615+W1_1$, $0.1885+W1_2$, $0.3008+W1_3$, $0.4385+W1_4$, $0.5879+W1_5$, and $0.7383+W1_6$, where values of $B1_1$ to $B1_6$ are greater than or equal to −0.02 and less than or equal to 0.02; $w_2$ of the $M_2$ MCS levels respectively correspond to $w_2$ of the following seven code rates, where $w_2$ is a positive integer greater than or equal to 1 and less than or equal to 7: $0.478525+W2_1$, $0.5397+W2_2$, $0.601575+W2_3$, $0.643275+W2_4$, $0.682625+W2_5$, $0.7632+W2_6$, and $0.830575+W2_7$, where values of $W2_1$ to $W2_7$ are greater than or equal to −0.02 and less than or equal to 0.02; $w_3$ of the $M_3$ MCS levels respectively correspond to $w_3$ of the following five code rates, where $w_3$ is a positive integer greater than or equal to 1 and less than or equal to 5: $0.650383+W3_1$, $0.69205+W3_2$, $0.7539+W3_3$, $0.808917+W3_4$, and $0.852533+W3_5$, where values of $W3_1$ to $W3_5$ are greater than or equal to −0.02 and less than or equal to 0.02; and $w_4$ of the $M_4$ MCS levels respectively correspond to $w_4$ of the following six code rates, where $w_3$ is a positive integer greater than or equal to 1 and less than or equal to $M_4$: $0.694338+W4_1$, $0.723575+W4_2$, $0.748913+W4_3$, $0.778325+W4_4$, $0.804375+W4_5$, $0.838675+W4_6$, $0.864263+W4_7$, $0.88605+W4_8$, $0.907025+W4_9$, and $0.925788+W4_{10}$, where values of $W4_1$ to $W4_{10}$ are greater than or equal to −0.02 and less than or equal to 0.02. According to the foregoing technical solution, the wireless transmission device may select an appropriate MCS level for modulation and coding, to fully use a channel.

According to a second aspect, an embodiment of this application provides an information processing method. The method includes: obtaining a channel quality indicator CQI level; and obtaining a target MCS level based on the CQI level, where the CQI level is one of a plurality of CQI levels defined in a CQI information table, and the CQI information table includes at least a correspondence between the CQI levels and modulation schemes, where the correspondence between the CQI levels and the modulation schemes is a first correspondence or a second correspondence, where the first correspondence includes: modulation schemes corresponding to a CQI level 1 to a CQI level 6 are QPSK, a modulation scheme corresponding to a CQI level 7 is QPSK or 16QAM, modulation schemes corresponding to a CQI level 8 to a CQI level 10 are 16QAM, a modulation scheme corresponding to a CQI level 11 is 16QAM or 64QAM, and a modulation scheme corresponding to a CQI level 12 is 64QAM; and the second correspondence is: modulation schemes corresponding to a CQI level 1 to a CQI level 3 are QPSK, a modulation scheme corresponding to a CQI level 4 is QPSK or 16QAM, a CQI level 5 to a CQI level 7 correspond to 16QAM, a CQI level 8 corresponds to 16QAM or 64QAM, a CQI level 9 to a CQI level 11 correspond to 64QAM, and a CQI level 12 to a CQI level 15 correspond to 256QAM.

In a first implementation of the second aspect, the CQI information table further includes a correspondence among CQI levels, code rates, and spectral efficiency.

With reference to the first possible implementation of the second aspect, in a second possible implementation of the second aspect, the obtaining a target MCS level based on the CQI level includes: determining at least one of a code rate or spectral efficiency based on the CQI level, and obtaining the target MCS level close to the determined code rate or spectral efficiency.

With reference to any one of the second aspect or the possible implementations of the second aspect, in a third possible implementation of the second aspect, the first correspondence includes: a CQI level 0 is out of range, the modulation schemes corresponding to the CQI level 1 to the CQI level 6 are QPSK, the modulation scheme corresponding to the CQI level 7 is QPSK or 16QAM, the modulation schemes corresponding to the CQI level 8 to the CQI level 10 are 16QAM, the modulation scheme corresponding to the CQI level 11 is 16QAM or 64QAM, and the modulation scheme corresponding to the CQI level 12 is 64QAM; and the second correspondence includes: a CQI level 0 is out of range, the modulation schemes corresponding to the CQI level 1 to the CQI level 3 are QPSK, the modulation scheme corresponding to the CQI level 4 is QPSK or 16QAM, the CQI level 5 to the CQI level 7 correspond to 16QAM, the CQI level 8 corresponds to 16QAM or 64QAM, the CQI level 9 to the CQI level 11 correspond to 64QAM, and the CQI level 12 to the CQI level 15 correspond to 256QAM.

According to a third aspect, an embodiment of this application further provides a wireless transmission device. The wireless transmission device includes units configured to implement any one of the first aspect or the possible implementations of the first aspect.

According to a fourth aspect, an embodiment of this application further provides a wireless transmission device. The wireless transmission device includes units configured to implement the second aspect.

According to a fifth aspect, an embodiment of this application provides a wireless transmission device. The wireless transmission device includes a memory, configured to store a program, a correspondence among MCS levels, modulation schemes, and transport block parameters; and a processor, configured to execute the program stored in the memory, where when the program is executed, the processor is configured to perform the method according to any one of the first aspect or the possible implementations of the first aspect. Optionally, the wireless transmission device is a chip or an integrated circuit.

According to a sixth aspect, an embodiment of this application provides a wireless transmission device. The wireless transmission device includes: a memory, configured to store a program and a correspondence between CQI levels and modulation schemes; and a processor, configured to execute the program stored in the memory, where when the program is executed, the processor is configured to perform the method according to the second aspect. Optionally, the switching device is a chip or an integrated circuit.

According to a seventh aspect, an embodiment of this application provides a chip configured to perform the method according to any one of the first aspect or the possible implementations of the first aspect.

According to an eighth aspect, an embodiment of this application provides a chip configured to perform the method according to the second aspect.

According to a ninth aspect, an embodiment of this application provides a computer-readable storage medium. The computer-readable storage medium stores an instruction. When the instruction is run on a computer, the computer is enabled to perform the method according to each of the foregoing aspects.

According to a tenth aspect, an embodiment of this application provides a computer program product including an instruction. When the computer program product is run on a computer, the computer is enabled to perform the method according to each of the foregoing aspects.

DESCRIPTION OF EMBODIMENTS

The following describes technical solutions of this application with reference to accompanying drawings.

It should be understood that the technical solutions of embodiments of this application may be applied to various communications systems in which LDPC coding is used, for example, a 5G communications system and a new radio (NR).

A so-called wireless transmission device in the embodiments of this application may include a terminal device or a network side device, or may be a chip used for a terminal device or a network side device. For example, each processing process may be implemented by one or more processors.

A so-called terminal device in the technical solutions of the embodiments of this application is a device having a communication function, and may include a handheld device having a wireless communication function, a vehicle-mounted device, a wearable device, a computing device, another processing device connected to a wireless modem, or the like. In different networks, a terminal may have different names, for example, an access terminal, user equipment (UE), a subscriber unit, a subscriber station, a mobile station, a mobile console, a remote station, a remote terminal, a mobile device, a user terminal, a terminal, a wireless communications device, a user agent or a user apparatus, a handheld device having a wireless communication function, a computing device or another processing device connected to a wireless modem, a vehicle-mounted device, a wearable device, and a terminal device in a future 5G network. The terminal device may communicate with one or more core networks through a radio access network (RAN), or may access a distributed network in a self-organizing manner or a grant-free manner. The terminal device may alternatively access a wireless network in another manner for communication, or the terminal device may directly perform wireless communication with another terminal device. This is not limited in the embodiments of this application.

A so-called network side device in the embodiments of this application is a device deployed in a radio access network and configured to provide a wireless communication function. In different radio access systems, names of a base station may be different. For example, a base station in a universal mobile telecommunications system (UMTS) network is referred to as a NodeB, a base station in an LTE network is referred to as an evolved NodeB (eNB, or eNodeB), a base station in a new radio (NR) network is referred to as a transmission reception point (TRP) or a next-generation NodeB (gNB), or base stations in other various technology convergence networks or in other various evolved networks may have other names. The present invention is not limited thereto.

Figure 1:
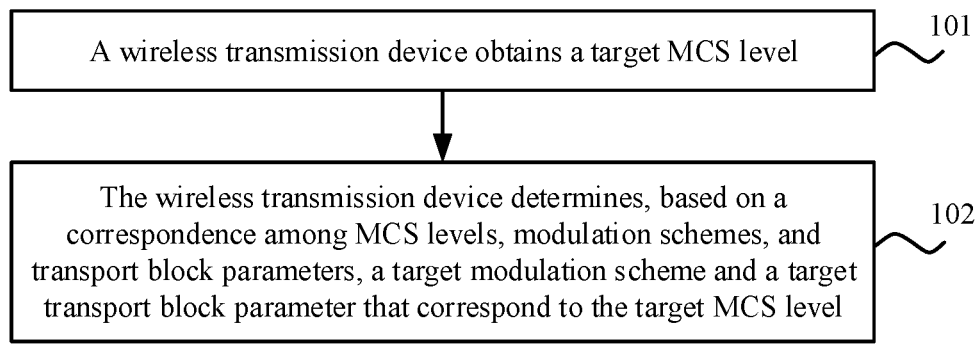
FIG. 1 is a schematic flowchart of an information processing method according to an embodiment of this application.

FIG. 1 is a schematic flowchart of an information processing method according to an embodiment of this application.

101. A wireless transmission device obtains a target MCS level.

The wireless transmission device may obtain the target MCS level in a plurality of manners.

Optionally, in some embodiments, before coding or decoding a transport block, the wireless transmission device may determine the target MCS level based on information state information. Generally, if channel quality is relatively good, a relatively high MCS level may be determined as the target MCS level. For example, the wireless transmission device may determine the target MCS level based on a CQI level.

Optionally, in some other embodiments, the wireless transmission device may obtain the target MCS level from received signaling. For example, data receiving and sending between a terminal device and a network side device are used as an example. The network side device determines the target MCS level based on a CQI level reported by the terminal device, and indicates the target MCS level to the terminal device by using signaling. The terminal device obtains the target MCS level from the signaling.

102. The wireless transmission device determines, based on a correspondence among MCS levels, modulation schemes, and transport block parameters, a target modulation scheme and a target transport block parameter that correspond to the target MCS level.

The target modulation scheme and the target transport block parameter of the target MCS level are used by the wireless transmission device to perform LDPC coding or decoding on the transport block.

In the embodiments of this application, the transport block may be data or control signaling transmitted between wireless transmission devices. For a transmit end device, the transport block is a to-be-coded data block. For a receive end device, the transport block is a to-be-decoded data block.

Optionally, the information processing method may further include the following step: performing, by the wireless transmission device, LDPC coding or decoding on the transport block based on the target modulation scheme and the target transport block parameter of the target MCS level.

The wireless transmission device may code or decode the transport block based on the target transport block parameter and the target modulation scheme. For example, if the target transport block parameter is code rate information, the wireless transmission device may determine, based on the code rate information, a base graph used for coding or decoding, and further obtain a corresponding syndrome parity check matrix (PCM) matrix. The PCM matrix may be used for coding or decoding. The target modulation scheme is used to modulate a coded code block or demodulate the transport block. Then, a demodulated transport block is decoded by using the PCM matrix.

For another example, if the target transport block parameter is LDPC base graph information, the wireless transmission device may obtain a PCM matrix that is based on the base graph. The PCM matrix may be used for coding or decoding. The target modulation scheme is used to modulate a coded code block or demodulate the transport block. Then, a demodulated transport block is decoded by using the PCM matrix.

It should be noted that the foregoing descriptions are all examples for description, and the present invention is not limited hereto.

The method shown in FIG. 1 can be applied to a system in which LDPC code is used. According to the method shown in FIG. 1, a wireless transmission device in a system in which LDPC coding is used may perform LDPC coding and decoding on the transport block.

Optionally, in some embodiments, when the wireless transmission device is a transmit end device, the wireless transmission device performs LDPC coding on the transport block based on the target modulation scheme and the target transport block parameter.

Optionally, in some other quantities, when the wireless transmission device is a receive end device, the wireless transmission device performs LDPC decoding on the to-be-transmitted block based on the target modulation scheme and the target transport block parameter.

Optionally, in some embodiments, the wireless transmission device may alternatively receive a target MCS level sent by another wireless transmission device, or negotiate with another wireless transmission device to determine the target MCS level.

For example, when the wireless transmission device is a receive end device, the receive end device is a terminal device, and a transmit end device corresponding to the wireless transmission device is a network side device, the terminal device may also receive the target MCS level sent by the network device.

Each MCS level corresponds to one modulation order and one code rate, and the modulation order and the code rate jointly determine spectral efficiency corresponding to the MCS level. A higher MCS level usually indicates higher spectral efficiency and a lower anti-noise capability. A lower MCS level usually indicates lower spectral efficiency and a higher anti-noise capability. In a possible implementation, the spectral efficiency, the modulation order, and the code rate may meet the following relationship: Spectral efficiency=modulation order*code rate. That is, the spectral efficiency may be a product of the modulation order and the code rate.

The wireless transmission device indicates current radio channel quality by using channel state information (CQI). Each CQI level includes one corresponding modulation order and code rate, and corresponds to one level of spectral efficiency. Each MCS level also corresponds to one level of spectral efficiency. The wireless transmission device should select an MCS level, closest to spectral efficiency corresponding to a current CQI level, for modulation and coding, to fully utilize a channel.

Optionally, in some embodiments, the transport block parameter may include at least one of the following information: code rate information, quadrature amplitude modulation (QAM) symbol information, and LDPC base graph information.

The code rate information is used as an example. The code rate information may be a specific code rate value, or may be a parameter used to determine a code rate of the transport block. For example, in some embodiments, the code rate may be determined by using the following formula:

$$R = R_I \div R_R,$$  (formula 1.1)

R represents the code rate, $R_I$ represents the code rate information, and $R_R$ is a preset parameter. A value of $R_I$ and a value of $R_R$ may be integers greater than 0.

For example, in some embodiments, the value of $R_R$ may be 1024. For example, $R_I$=120. It may be determined, according to formula 1.1, that the code rate R is equal to 0.1171875. For another example, $R_I$=144. It may be determined, according to formula 1.1, that the code rate R is equal to 0.140625.

For another example, in some embodiments, the preset parameter may be a modulation order. For example, the value of $R_R$ may be 2, 4, 6, or 8. In this case, the code rate information may be coding efficiency. For example, if $R_I$=0.2329, and $R_R$=2, R=0.11645. For another example, if $R_I$=0.2803, and $R_R$=2, R=0.14015.

In addition to the foregoing listed information and/or values corresponding to $R_I$ and $R_R$, $R_I$ and $R_R$ may further correspond to other information and/or values, which are not listed one by one herein.

In addition, in addition to formula 1.1, other formulas and corresponding code rate information may be used to determine the value of the code rate. Details are not listed one by one herein.

The code rate information may alternatively be an identifier corresponding to a code rate or a code rate range that is defined by a system. In this way, after the code rate information (that is, the identifier corresponding to the code rate) is determined, the code rate may be determined based on the identifier corresponding to the code rate.

For another example, in some embodiments, the code rate information may alternatively be a quantization code rate. For example, the quantization code rate is a value obtained by multiplying the code rate by 1024 and rounding up, down, or off. For example, if the code rate is 0.07615, the quantization code rate obtained by multiplying the code rate by 1024 and rounding up is 78. The quantization code rate may alternatively be obtained by quantizing, at a granularity of 0.5, the code rate multiplied by 1024. In an implementation, after the bit rate is multiplied by 1024, if a decimal part is close to 0.5, for example, 0.51 or 0.49, the decimal part is set to 0.5; otherwise, the decimal part is rounded up or down. For example, a code rate is 0.757325, and is 775.5008 after being multiplied by 1024, a decimal part is close to 0.5, and the code rate is 775.5 after being quantized by using 0.5 as a granularity. For another example, a code rate is 0.6665, and is 682.496 after being multiplied by 1024, a decimal part is close to 0.5, and the code rate is 682.5 after being quantized at a granularity of 0.5. For another example, a code rate 0.1172 is multiplied by 1024 to obtain 120.0128, a decimal part is close to 0.0, and the code rate is 120 after being quantized at a granularity of 0.5. It should be noted that only examples are provided herein for description, and this application is not limited thereto.

Optionally, in some embodiments, the QAM symbol information may be a modulation scheme, for example, quadrature phase shift keying (QPSK), 16QAM, 64QAM, or 256QAM.

Optionally, in some other embodiments, the symbol information may be an order (order) of a modulation scheme. The order may also be referred to as a modulation order. For example, an order of QPSK is equal to 2; an order of 16QAM is equal to 4; an order of 64QAM is equal to 6; and an order of 256QAM is equal to 8.

Optionally, the symbol information may further be a parameter used to determine a modulation scheme.

For ease of use, all modulation schemes in the tables listed in this application are represented in a form of modulation orders. It may be understood that modulation orders in the tables may also be replaced with modulation schemes.

The LDPC base graph information may be a base graph index used to perform LDPC coding or decoding on the transport block, or may be information that can be used to determine a base graph used to perform LDPC coding or decoding on the transport block. For example, if a communications system supports both two LDPC base graphs (base graph), which are denoted as a BG 1 and a BG 2 respectively, the LDPC base graph information may be represented as 1 or 2. Each base graph correspondingly includes eight base matrices PCMs. The LDPC base graph information may further be a parameter used to determine a base graph or a base matrix used to code or decode the transport block. Content carried in the transport block may be data, or may be control signaling.

It should be noted that only examples are provided herein for description, and the present invention is not limited thereto.

Optionally, in some embodiments, a correspondence between the MCS levels and the modulation schemes includes: $N_1$ MCS levels correspond to QPSK modulation, $N_2$ MCS levels correspond to 16 quadrature amplitude modulation QAM, and $N_3$ MCS levels correspond to 64QAM, where $N_1$ is equal to 11, 12, or 13, $N_2$ is equal to 8, 9, or 10, and $N_3$ is equal to 7, 8, or 9.

Table 1 shows that 11 MCS levels correspond to QPSK modulation, nine MCS levels correspond to 16QAM, and nine MCS levels correspond to 64QAM modulation.

TABLE 1

| MCS level | Modulation order |
|---|---|
| 0 | 2 |
| 1 | 2 |
| 2 | 2 |
| 3 | 2 |
| 4 | 2 |
| 5 | 2 |
| 6 | 2 |
| 7 | 2 |
| 8 | 2 |
| 9 | 2 |
| 10 | 2 |
| 11 | 2 |
| 12 | 4 |
| 13 | 4 |
| 14 | 4 |
| 15 | 4 |
| 16 | 4 |
| 17 | 4 |
| 18 | 4 |
| 19 | 4 |
| 20 | 4 |
| 21 | 6 |
| 22 | 6 |
| 23 | 6 |
| 24 | 6 |
| 25 | 6 |
| 26 | 6 |
| 27 | 6 |
| 28 | 6 |

The modulation schemes in Table 1 are represented by the modulation orders. To be specific, a modulation order of QPSK modulation is 2, a modulation order of 16QAM is 4, and a modulation order of 64QAM is 6. As shown in Table 1, the MCS levels 0 to 11 correspond to QPSK modulation, the MCS levels 12 to 20 correspond to 16QAM, and the MCS levels 21 to 28 correspond to 64QAM. It may be understood that a column of modulation orders in Table 1 and other tables in this application and corresponding modulation schemes may alternatively be mutually replaced.

Optionally, based on Table 1, one or more reserved MSC levels may be further included, to indicate a modulation order during retransmission, and/or indicate a redundancy version number during retransmission.

Figure 2:
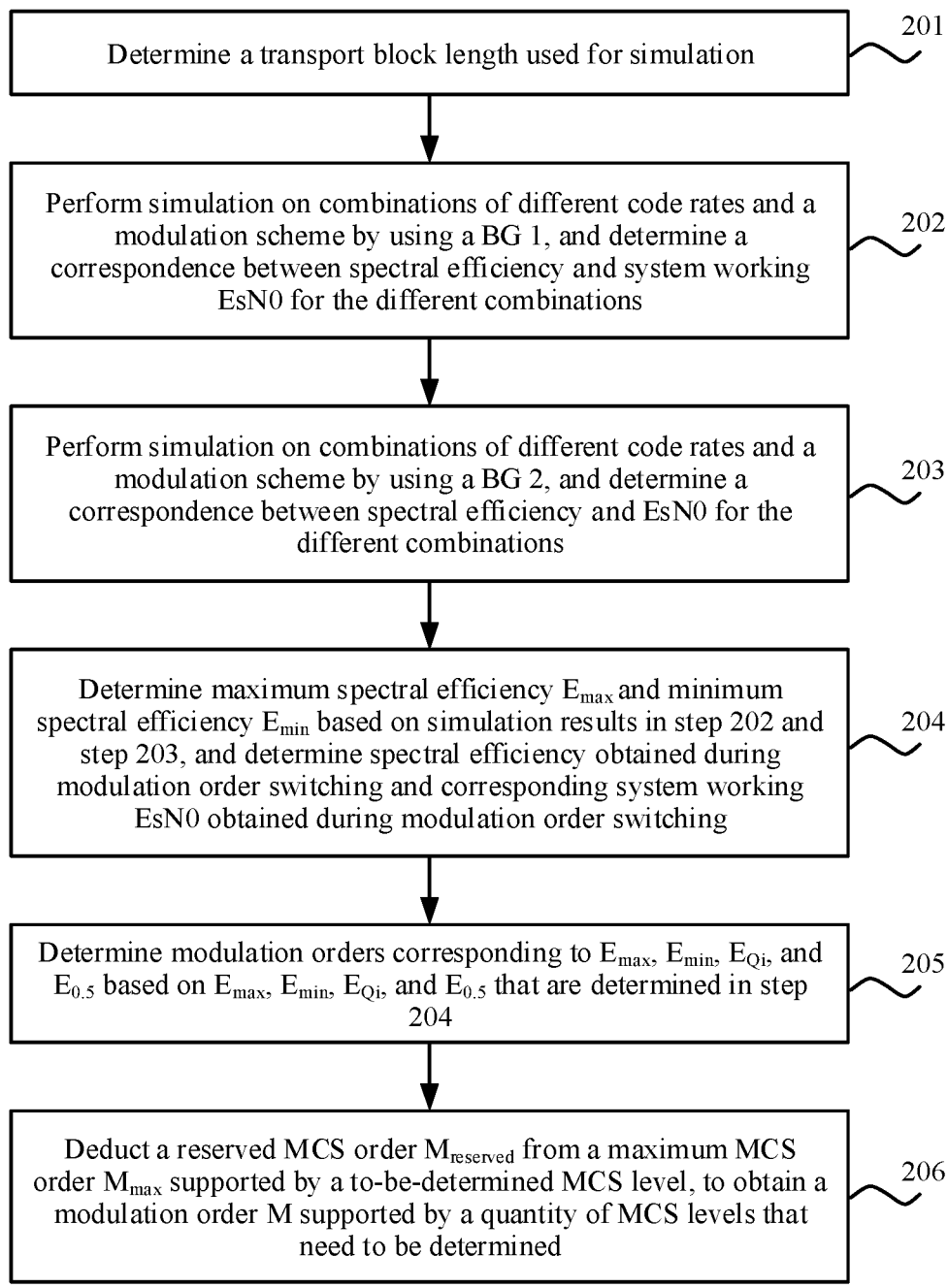
FIG. 2 is a schematic flowchart of determining an MCS level and a modulation scheme according to an embodiment of this application.

A correspondence between the MCS levels and the modulation schemes shown in Table 1 may be determined according to a method shown in FIG. 2.

FIG. 2 is a schematic flowchart of determining an MCS level and a modulation scheme according to an embodiment of this application;

201. Determine a transport block length used for simulation.

202. Perform simulation on combinations of different code rates and a modulation scheme by using a base graph (BG) 1, and determine a correspondence between spectral efficiency and system working EsN0 for the different combinations.

203. Perform simulation on combinations of different code rates and a modulation scheme by using a BG 2, and determine a correspondence between spectral efficiency and EsN0 for the different combinations. EsN0 represents a ratio of a power (Es) per symbol to a noise power (N0).

Modulation schemes used in simulation include QPSK, 16QAM, 64QAM, and 256QAM. In other words, orders used in simulation are 2, 4, 6, and 8.

Figure 3:
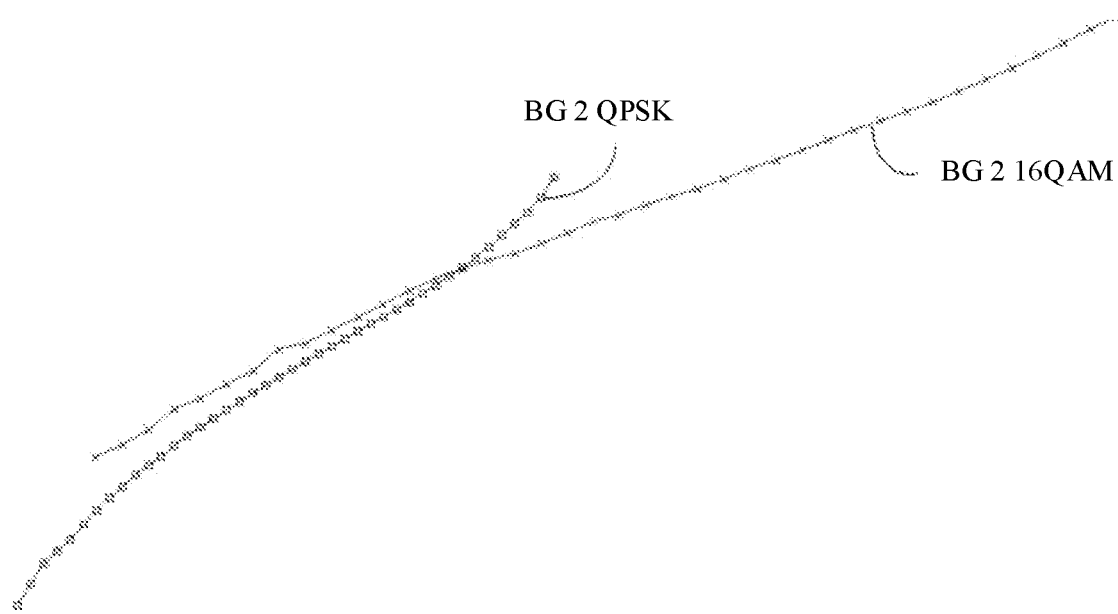
FIG. 3 shows simulation curves obtained by performing simulation on combinations of different code rates and QPSK and combinations of different code rates and 16QAM by using a BG 2 when a transport block length is 3840.

FIG. 3 shows simulation curves obtained by performing simulation on combinations of different code rates and QPSK and combinations of different code rates and 16QAM by using the BG 2 when a transport block length is 3840.

As shown in FIG. 3, a curve (referred to as a QPSK curve below) may be obtained by using the BG 2 and combinations of different code rates and QPSK, and a curve (referred to as a 16QAM curve below) may be obtained by using the BG 2 and combinations of different code rates and 16QAM. As shown in FIG. 3, the QPSK curve and the 16QAM curve have an intersection point. Similarly, as shown in FIG. 3, a curve (referred to as a 64QAM curve below) may be obtained by using the BG 2 and combinations of different code rates and 64QAM, and a curve (referred to as a 256QAM curve below) may be obtained by using the BG2 and combinations of different code rates and 256QAM. Similarly, the 16QAM curve and the 64QAM curve have an intersection point, and the 64QAM curve and the 256QAM curve have an intersection point.

In other words, four curves may be obtained by using the BG 2 and the four different modulation schemes. The four curves have at least three intersection points.

Similarly, four curves may also be obtained by using the BG 1 and combinations of different code rates and four modulation schemes. The four curves also have at least three intersection points.

204. Determine maximum spectral efficiency $E_{max}$ and minimum spectral efficiency $E_{min}$ based on simulation results in step 202 and step 203, and determine spectral efficiency obtained during modulation order switching and corresponding system working EsN0 obtained during modulation order switching.

Specifically, the spectral efficiency obtained during modulation order switching may be an intersection point of different modulation order curves in simulation curves. The spectral efficiency obtained during modulation order switching may be denoted as $E_{Qi}$, which represents spectral efficiency obtained during switching between Qi modulation and Qi+1 modulation. $E_{max}$ and $E_{Qi}$ may be determined based on the simulation result that is obtained by using the BG 1. System working EsN0 corresponding to $E_{min}$ and spectral efficiency ($E_{0.5}$=0.5) corresponding to ¼ code rate QPSK modulation may be determined based on the simulation result that is obtained by using the BG2.

205. Determine modulation orders corresponding to $E_{max}$, $E_{min}$, $E_{Qi}$, and $E_{0.5}$ based on $E_{max}$, $E_{min}$, $E_{Qi}$, and $E_{0.5}$ that are determined in step 204.

Each $E_{Qi}$ corresponds to both two combinations: lower-order modulation plus a higher code rate and higher-order modulation plus a lower code rate. To ensure robustness of a system in different modulation orders/uplink and downlink, two modulation orders may be set to correspond to one $E_{Qi}$ separately. For example, a code rate may be spectral efficiency/a modulation order, so that lower-order modulation corresponds to a higher code rate, and higher-order modulation corresponds to a lower code rate.

206. Deduct a reserved MCS order $M_{reserved}$ from a maximum MCS order $M_{max}$ supported by a to-be-determined MCS level, to obtain a modulation order M supported by a quantity of MCS levels that need to be determined. According to the following formula:

$$\Delta EsN0=(E_{max}-E_{min})/M, \qquad \text{formula (2.1)}.$$

A correspondence between a remaining MCS level and a modulation order may be supplemented, so that working EsN0 corresponding to two adjacent MCS levels is close to ΔEsN0 as much as possible.

In addition, if working EsN0 corresponding to an MCS level can be supported by a plurality of combinations of modulation schemes and code rates, a combination with higher spectral efficiency is selected as a modulation scheme and a code rate that correspond to the MCS level. In addition, an MCS order with spectral efficiency less than the spectral efficiency $E_{0.5}$ corresponding to ¼ code rate QPSK modulation should be calculated by using the simulation result obtained by using the BG 2, and other MCS orders are calculated by using the simulation result obtained by using the BG 1.

The following further describes, with reference to Table 2, the method shown in FIG. 2.

TABLE 2

| MCS level | Modulation order | Code rate | Spectral efficiency | EsN0 | ΔEsN0 | BG |
|---|---|---|---|---|---|---|
| 0 | 2 | 0.11645 | 0.2329 | −6.601 | | 2 |
| 1 | 2 | 0.14015 | 0.2803 | −5.726 | 0.875 | 2 |
| 2 | 2 | 0.17095 | 0.3419 | −4.851 | 0.875 | 2 |
| 3 | 2 | 0.2123 | 0.4246 | −3.976 | 0.875 | 2 |
| 4 | 2 | 0.25 | 0.5 | −3.101 | 0.875 | 2 |
| 5 | 2 | 0.3026 | 0.6052 | −2.08244 | 1.018557 | 1 |
| 6 | 2 | 0.37285 | 0.7457 | −1.06389 | 1.018557 | 1 |
| 7 | 2 | 0.44105 | 0.8821 | −0.04533 | 1.018557 | 1 |
| 8 | 2 | 0.5202 | 1.0404 | 0.973228 | 1.018557 | 1 |
| 9 | 2 | 0.59885 | 1.1977 | 1.991785 | 1.018557 | 1 |
| 10 | 2 | 0.6789 | 1.3578 | 3.010342 | 1.018557 | 1 |
| 11 | 2 | 0.76085 | 1.5217 | 4.0289 | 1.018558 | 1 |
| 12 | 4 | 0.380425 | 1.5217 | 4.0289 | 0 | 1 |
| 13 | 4 | 0.4378 | 1.7512 | 4.9986 | 0.9697 | 1 |
| 14 | 4 | 0.50175 | 2.007 | 5.9683 | 0.9697 | 1 |
| 15 | 4 | 0.56155 | 2.2462 | 6.938 | 0.9697 | 1 |
| 16 | 4 | 0.61965 | 2.4786 | 7.9077 | 0.9697 | 1 |
| 17 | 4 | 0.68145 | 2.7258 | 8.8774 | 0.9697 | 1 |
| 18 | 4 | 0.7455 | 2.982 | 9.8471 | 0.9697 | 1 |
| 19 | 4 | 0.8059 | 3.2236 | 10.8168 | 0.9697 | 1 |
| 20 | 4 | 0.8613 | 3.4452 | 11.7866 | 0.9698 | 1 |
| 21 | 6 | 0.5742 | 3.4452 | 11.7866 | 0 | 1 |
| 22 | 6 | 0.6297 | 3.7782 | 12.87037 | 1.08377 | 1 |
| 23 | 6 | 0.686517 | 4.1191 | 13.95414 | 1.08377 | 1 |
| 24 | 6 | 0.74525 | 4.4715 | 15.03791 | 1.08377 | 1 |
| 25 | 6 | 0.801633 | 4.8098 | 16.12168 | 1.08377 | 1 |
| 26 | 6 | 0.855 | 5.13 | 17.20545 | 1.08377 | 1 |
| 27 | 6 | 0.8976 | 5.3856 | 18.28922 | 1.08377 | 1 |
| 28 | 6 | 0.931883 | 5.5913 | 19.373 | 1.08378 | 1 |
| 29 | | | Reserved | | | |
| 30 | | | Reserved | | | |
| 31 | | | Reserved | | | |

Table 2 is determined based on a simulation result obtained when a transport block length is equal to 8488. After $E_{max}$, $E_{min}$, $E_{Qi}$, and $E_{0.5}$ are determined, modulation orders corresponding to curves at the spectral efficiency are determined by using simulation curves. Modulation orders of $E_{max}$, $E_{min}$, and $E_{0.5}$ are unique. That is, if $E_{Qi} < E < E_{Q(i+1)}$, a modulation order of E is equal to Qi. $E_{Qi}$ corresponds to at least two different modulation orders. In this case, two corresponding modulation orders or only one corresponding modulation order may be reserved discretionarily based on a table size. Then, modulation orders corresponding to other MCS levels in Table 2 may be determined based on an equipartition principle. The code rate may be obtained based on the spectral efficiency and the modulation order. For example, code rate=spectral efficiency/modulation order. In example of tables in this application, description is provided by using an example in which the code rate, the spectral efficiency, and the modulation order meet the following relationship: Code rate=spectral efficiency/modulation order. It should be noted that the tables are not limited thereto.

It may be understood that both the spectral efficiency and EsN0 that are listed in Table 2 may be directly obtained based on the simulation results.

Optionally, in some embodiments, $a_1$ of the $N_1$ MCS levels respectively correspond to $a_1$ of the following 12 code rates, where $a_1$ is a positive integer greater than or equal to 1 and less than or equal to $N_1$: $0.11645+A1_1$, $0.14015+A1_2$, $0.17095+A1_3$, $0.2123+A1_4$, $0.25+A1_5$, $0.3026+A1_6$, $0.37285+A1_7$, $0.44105+A1_8$, $0.5202+A1_9$, $0.59885+A1_{10}$, $0.6789+A1_{11}$, and $0.76085+A1_{12}$, where values of $A1_1$ to $A1_{12}$ are greater than or equal to −0.02 and less than or equal to 0.02; $a_2$ of the $N_2$ MCS levels respectively correspond to $a_2$ of the following nine code rates, where $a_2$ is a positive integer greater than or equal to 1 and less than or equal to 9: $0.380425+A2_1$, $0.4378+A2_2$, $0.50175+A2_3$, $0.56155+A2_4$, $0.61965+A2_5$, $0.68145+A2_6$, $0.7455+A2_7$, $0.8059+A2_8$, and $0.8613+A2_9$, where values of $A2_1$ to $A2_9$ are greater than or equal to −0.02 and less than or equal to 0.02; and $a_3$ of the $N_3$ MCS levels respectively correspond to $a_3$ of the following eight code rates, where $a_3$ is a positive integer greater than or equal to 1 and less than or equal to 8: $0.5742+A3_1$, $0.6297+A3_2$, $0.686517+A3_3$, $0.74525+A3_4$, $0.801633+A3_5$, $0.855+A3_6$, $0.8976+A3_7$, and $0.931883+A3_8$, where values of $A3_1$ to $A3_8$ are greater than or equal to −0.02 and less than or equal to 0.02. In other words, a correspondence between the MCS levels and the code rates may be determined based on Table 2. Specifically, a code rate corresponding to an MCS level may be a sum of a code rate corresponding to an MCS level in Table 2 and an error value.

It may be understood that, in Table 2 and other tables in the embodiments of this application, a column of code rates and quantization code rates corresponding to the code rates may be mutually replaced. For example, the code rates in Table 2 may be replaced with quantization code rates obtained by multiplying the code rates by 1024 and corresponding values.

Optionally, in some other embodiments, a correspondence between the MCS levels and the modulation schemes includes: $M_1$ MCS levels correspond to QPSK modulation, $M_2$ MCS levels correspond to 16 QAM, $M_3$ MCS levels correspond to 64QAM, and $M_4$ MCS levels correspond to 256QAM, where $M_1$ is equal to 6, 9, 10, or 11, $M_2$ is equal to 5, 6, or 7, $M_3$ is equal to 5, 6, or 7, and $M_4$ is equal to 5, 6, 7, or 10.

Table 3 shows that 10 MCS levels correspond to QPSK modulation, six MCS levels correspond to 16QAM, six MCS levels correspond to 64QAM modulation, and six MCS levels correspond to 256QAM modulation.

TABLE 3

| MCS level | Modulation order |
|---|---|
| 0 | 2 |
| 1 | 2 |
| 2 | 2 |
| 3 | 2 |
| 4 | 2 |
| 5 | 2 |
| 6 | 2 |
| 7 | 2 |
| 8 | 2 |
| 9 | 2 |
| 10 | 4 |
| 11 | 4 |
| 12 | 4 |
| 13 | 4 |
| 14 | 4 |
| 15 | 4 |
| 16 | 6 |
| 17 | 6 |
| 18 | 6 |
| 19 | 6 |
| 20 | 6 |
| 21 | 6 |
| 22 | 8 |

TABLE 3-continued

| MCS level | Modulation order |
|---|---|
| 23 | 8 |
| 24 | 8 |
| 25 | 8 |
| 26 | 8 |
| 27 | 8 |

A manner of determining Table 3 is similar to the manner of determining Table 1. That is, Table 3 may be determined according to the method shown in FIG. 2.

Optionally, based on Table 2, one or more reserved MSC levels may be further included, to indicate a modulation order during retransmission, and/or indicate a redundancy version number during retransmission.

Similarly, Table 4 may also be determined according to the method shown in FIG. 2. Table 4 is determined based on the simulation result obtained when the transport block length is equal to 8488.

TABLE 4

| MCS level | Modulation order | Code rate | Spectral efficiency | EsN0 | ΔEsN0 | BG |
|---|---|---|---|---|---|---|
| 0 | 2 | 0.07615 | 0.1523 | −8.47 | | 2 |
| 1 | 2 | 0.1038 | 0.2076 | −7.12775 | 1.34225 | 2 |
| 2 | 2 | 0.1385 | 0.277 | −5.7855 | 1.34225 | 2 |
| 3 | 2 | 0.1916 | 0.3832 | −4.44325 | 1.34225 | 2 |
| 4 | 2 | 0.25 | 0.5 | −3.101 | 1.34225 | 2 |
| 5 | 2 | 0.334 | 0.668 | −1.67502 | 1.42598 | 1 |
| 6 | 2 | 0.4263 | 0.8526 | −0.24904 | 1.42598 | 1 |
| 7 | 2 | 0.53645 | 1.0729 | 1.17694 | 1.42598 | 1 |
| 8 | 2 | 0.6472 | 1.2944 | 2.60292 | 1.42598 | 1 |
| 9 | 2 | 0.76085 | 1.5217 | 4.0289 | 1.42598 | 1 |
| 10 | 4 | 0.380425 | 1.5217 | 4.0289 | 0 | 1 |
| 11 | 4 | 0.475875 | 1.9035 | 5.58044 | 1.55154 | 1 |
| 12 | 4 | 0.57355 | 2.2942 | 7.13198 | 1.55154 | 1 |
| 13 | 4 | 0.669525 | 2.6781 | 8.68352 | 1.55154 | 1 |
| 14 | 4 | 0.769825 | 3.0793 | 10.23506 | 1.55154 | 1 |
| 15 | 4 | 0.8613 | 3.4452 | 11.7866 | 1.55154 | 1 |
| 16 | 6 | 0.5742 | 3.4452 | 11.7866 | 0 | 1 |
| 17 | 6 | 0.646333 | 3.878 | 13.16164 | 1.37504 | 1 |
| 18 | 6 | 0.71735 | 4.3041 | 14.53668 | 1.37504 | 1 |
| 19 | 6 | 0.790617 | 4.7437 | 15.91172 | 1.37504 | 1 |
| 20 | 6 | 0.858633 | 5.1518 | 17.28676 | 1.37504 | 1 |
| 21 | 6 | 0.909883 | 5.4593 | 18.6618 | 1.37504 | 1 |
| 22 | 8 | 0.682413 | 5.4593 | 18.6618 | 0 | 1 |
| 23 | 8 | 0.74005 | 5.9204 | 19.88524 | 1.22344 | 1 |
| 24 | 8 | 0.793138 | 6.3451 | 21.10868 | 1.22344 | 1 |
| 25 | 8 | 0.83415 | 6.6732 | 22.33212 | 1.22344 | 1 |
| 26 | 8 | 0.889425 | 7.1154 | 23.55556 | 1.22344 | 1 |
| 27 | 8 | 0.925788 | 7.4063 | 24.779 | 1.22344 | 1 |
| 28 | | Reserved | | | | |
| 29 | | Reserved | | | | |
| 30 | | Reserved | | | | |
| 31 | | Reserved | | | | |

Optionally, in some embodiments, $b_1$ of the $M_1$ MCS levels respectively correspond to $b_1$ of the following 10 code rates, where $b_1$ is a positive integer greater than or equal to 1 and less than or equal to 10: $0.07615+B1_1$, $0.1038+B1_2$, $0.1385+B1_3$, $0.1916+B1_4$, $0.25+B1_5$, $0.334+B1_6$, $0.4263+B1_7$, $0.53645+B1_8$, $0.6472+B1_9$, and $0.76085+B1_{10}$, where values of $B1_1$ to $B1_{10}$ are greater than or equal to −0.02 and less than or equal to 0.02; $b_2$ of the $M_2$ MCS levels respectively correspond to $b_2$ of the following six code rates, where $b_2$ is a positive integer greater than or equal to 1 and less than or equal to 6: $0.380425+B2_1$, $0.475875+B2_2$, $0.57355+B2_3$, $0.669525+B2_4$, $0.769825+B2_5$, and $0.8613+B2_6$, where values of $B2_1$ to $B2_6$ are greater than or equal to −0.02 and less than or equal to 0.02; $b_3$ of the $M_3$ MCS levels respectively correspond to $b_3$ of the following six code rates, where $b_3$ is a positive integer greater than or equal to 1 and less than or equal to 6: $0.5742+B3_1$, $0.646333+B3_2$, $0.71735+B3_3$, $0.790617+B3_4$, $0.858633+B3_5$, and $0.909883+B3_6$, where values of $B3_1$ to $B3_6$ are greater than or equal to −0.02 and less than or equal to 0.02; and $b_4$ of the $M_4$ MCS levels respectively correspond to $b_4$ of the following six code rates, where $b_3$ is a positive integer greater than or equal to 1 and less than or equal to $M_4$: $0.682413+B4_1$, $0.74005+B4_2$, $0.793138+B4_3$, $0.83415+B4_4$, $0.889425+B4_5$, and $0.925788+B4_6$, where values of $B4_1$ to $B4_6$ are greater than or equal to −0.02 and less than or equal to 0.02. In other words, a correspondence between the MCS levels and the code rates may be determined based on Table 4. Specifically, a code rate corresponding to an MCS level may be a sum of a code rate corresponding to an MCS level in Table 4 and an error value.

Table 5 is determined based on a simulation result obtained when the transport block length is less than or equal to 308. $E_{max}$, $E_{min}$, each $E_{Qi}$, and $E_{0.5}$ are data results obtained based on simulation of the BG 2. In addition, a manner of determining Table 5 is the same as the manner of determining Table 1.

TABLE 5

| MCS level | Modulation order | Code rate | Spectral efficiency | EsN0 | ΔEsN0 | BG |
|---|---|---|---|---|---|---|
| 0 | 2 | 0.1164 | 0.2328 | −6.17 | | 2 |
| 1 | 2 | 0.14355 | 0.2871 | −5.277 | 0.893 | 2 |
| 2 | 2 | 0.1748 | 0.3496 | −4.384 | 0.893 | 2 |
| 3 | 2 | 0.20895 | 0.4179 | −3.491 | 0.893 | 2 |
| 4 | 2 | 0.25 | 0.5 | −2.598 | 0.893 | 2 |
| 5 | 2 | 0.30295 | 0.6059 | −1.5732 | 1.0248 | 2 |
| 6 | 2 | 0.3648 | 0.7296 | −0.5484 | 1.0248 | 2 |
| 7 | 2 | 0.43265 | 0.8653 | 0.4764 | 1.0248 | 2 |
| 8 | 2 | 0.50865 | 1.0173 | 1.5012 | 1.0248 | 2 |
| 9 | 2 | 0.5912 | 1.1824 | 2.526 | 1.0248 | 2 |
| 10 | 2 | 0.67685 | 1.3537 | 3.5508 | 1.0248 | 2 |
| 11 | 2 | 0.7543 | 1.5086 | 4.5759 | 1.0251 | 2 |
| 12 | 4 | 0.37715 | 1.5086 | 4.5759 | 0 | 2 |
| 13 | 4 | 0.432575 | 1.7303 | 5.5774 | 1.0015 | 2 |
| 14 | 4 | 0.4931 | 1.9724 | 6.5789 | 1.0015 | 2 |
| 15 | 4 | 0.553125 | 2.2125 | 7.5804 | 1.0015 | 2 |
| 16 | 4 | 0.619125 | 2.4765 | 8.5819 | 1.0015 | 2 |
| 17 | 4 | 0.686175 | 2.7447 | 9.5834 | 1.0015 | 2 |
| 18 | 4 | 0.746675 | 2.9867 | 10.5849 | 1.0015 | 2 |
| 19 | 4 | 0.803675 | 3.2147 | 11.5864 | 1.0015 | 2 |
| 20 | 4 | 0.856475 | 3.4259 | 12.5881 | 1.0017 | 2 |
| 21 | 6 | 0.570983 | 3.4259 | 12.5881 | 0 | 2 |
| 22 | 6 | 0.620917 | 3.7255 | 13.5133 | 0.9252 | 2 |
| 23 | 6 | 0.671933 | 4.0316 | 14.4385 | 0.9252 | 2 |
| 24 | 6 | 0.722083 | 4.3325 | 15.3637 | 0.9252 | 2 |
| 25 | 6 | 0.76655 | 4.5993 | 16.2889 | 0.9252 | 2 |
| 26 | 6 | 0.809317 | 4.8559 | 17.2141 | 0.9252 | 2 |
| 27 | 6 | 0.850817 | 5.1049 | 18.1393 | 0.9252 | 2 |
| 28 | 6 | 0.8894 | 5.3364 | 19.0645 | 0.9252 | 2 |
| 29 | | Reserved | | | | |
| 30 | | Reserved | | | | |
| 31 | | Reserved | | | | |

Optionally, in some embodiments, $c_1$ of the $N_1$ MCS levels respectively correspond to $c_1$ of the following 12 code rates, where $c_1$ is a positive integer greater than or equal to 1 and less than or equal to $N_1$: $0.1164+C1_1$, $0.14355+C1_2$, $0.1748+C1_3$, $0.20895+C1_4$, $0.25+C1_5$, $0.30295+C1_6$, $0.3648+C1_7$, $0.43265+C1_8$, $0.50865+C1_9$, $0.5912+C1_{10}$, $0.67685+C1_{11}$, and $0.7543+C1_{12}$, where values of $C1_1$ to $C1_{12}$ are greater than or equal to −0.02 and less than or equal to 0.02; $c_2$ of the $N_2$ MCS levels respectively correspond to $c_2$ of the following nine code rates, where $c_2$ is a positive integer greater than or equal to 1 and less than or equal to 9:

0.37715+C$2_1$, 0.432575+C$2_2$, 0.4931+C$2_3$, 0.553125+C$2_4$, 0.619125+C$2_5$, 0.686175+C$2_6$, 0.746675+C$2_7$, 0.803675+C$2_8$, and 0.856475+C$2_9$, where values of C$2_1$ to C$2_9$ are greater than or equal to −0.02 and less than or equal to 0.02; and $c_3$ of the N$_3$ MCS levels respectively correspond to $c_3$ of the following eight code rates, where $c_3$ is a positive integer greater than or equal to 1 and less than or equal to 8: 0.570983+C$3_1$, 0.620917+C$3_2$, 0.671933+C$3_3$, 0.722083+C$3_4$, 0.76655+C$3_5$, 0.809317+C$3_6$, 0.850817+C$3_7$, and 0.8894+C$3_8$, where values of C$3_1$ to C$3_8$ are greater than or equal to −0.02 and less than or equal to 0.02. In other words, a correspondence between the MCS levels and the code rates may be determined based on Table 5. Specifically, a code rate corresponding to an MCS level may be a sum of a code rate corresponding to an MCS level in Table 5 and an error value.

Table 6 is determined based on the simulation result obtained when the transport block length is less than or equal to 308. However, in a process of determining Table 6, a modulation order corresponding to $E_{0.5}$=0.5 is set no longer. In other words, in a process of determining Table 6 by using the method shown in FIG. 2, only modulation orders corresponding to $E_{max}$, $E_{min}$, and $E_{Qi}$ need to be determined based on $E_{max}$, $E_{min}$, and $E_{Qi}$ in step 205. In addition, a manner of determining Table 6 is the same as the manner of determining Table 1.

TABLE 6

| MCS level | Modulation order | Code rate | Spectral efficiency | EsN0 | ΔEsN0 | BG |
|---|---|---|---|---|---|---|
| 0 | 2 | 0.1164 | 0.2328 | −6.17 | | 2 |
| 1 | 2 | 0.1464 | 0.2928 | −5.1931 | 0.9769 | 2 |
| 2 | 2 | 0.1808 | 0.3616 | −4.2162 | 0.9769 | 2 |
| 3 | 2 | 0.21985 | 0.4397 | −3.2393 | 0.9769 | 2 |
| 4 | 2 | 0.26605 | 0.5321 | −2.2624 | 0.9769 | 2 |
| 5 | 2 | 0.31815 | 0.6363 | −1.2855 | 0.9769 | 2 |
| 6 | 2 | 0.3807 | 0.7614 | −0.3086 | 0.9769 | 2 |
| 7 | 2 | 0.4466 | 0.8932 | 0.6683 | 0.9769 | 2 |
| 8 | 2 | 0.5188 | 1.0376 | 1.6452 | 0.9769 | 2 |
| 9 | 2 | 0.5989 | 1.1978 | 2.6221 | 0.9769 | 2 |
| 10 | 2 | 0.6811 | 1.3622 | 3.599 | 0.9769 | 2 |
| 11 | 2 | 0.7543 | 1.5086 | 4.5759 | 0.9769 | 2 |
| 12 | 4 | 0.37715 | 1.5086 | 4.5759 | 0 | 2 |
| 13 | 4 | 0.432575 | 1.7303 | 5.5774 | 1.0015 | 2 |
| 14 | 4 | 0.4931 | 1.9724 | 6.5789 | 1.0015 | 2 |
| 15 | 4 | 0.553125 | 2.2125 | 7.5804 | 1.0015 | 2 |
| 16 | 4 | 0.619125 | 2.4765 | 8.5819 | 1.0015 | 2 |
| 17 | 4 | 0.686175 | 2.7447 | 9.5834 | 1.0015 | 2 |
| 18 | 4 | 0.746675 | 2.9867 | 10.5849 | 1.0015 | 2 |
| 19 | 4 | 0.803675 | 3.2147 | 11.5864 | 1.0015 | 2 |
| 20 | 4 | 0.856475 | 3.4259 | 12.5881 | 1.0017 | 2 |
| 21 | 6 | 0.570983 | 3.4259 | 12.5881 | 0 | 2 |
| 22 | 6 | 0.620917 | 3.7255 | 13.5133 | 0.9252 | 2 |
| 23 | 6 | 0.671933 | 4.0316 | 14.4385 | 0.9252 | 2 |
| 24 | 6 | 0.722083 | 4.3325 | 15.3637 | 0.9252 | 2 |
| 25 | 6 | 0.76655 | 4.5993 | 16.2889 | 0.9252 | 2 |
| 26 | 6 | 0.809317 | 4.8559 | 17.2141 | 0.9252 | 2 |
| 27 | 6 | 0.850817 | 5.1049 | 18.1393 | 0.9252 | 2 |
| 28 | 6 | 0.8894 | 5.3364 | 19.0645 | 0.9252 | 2 |
| 29 | | | Reserved | | | |
| 30 | | | Reserved | | | |
| 31 | | | Reserved | | | |

Optionally, in some embodiments, $d_1$ of the N$_1$ MCS levels respectively correspond to $d_1$ of the following 12 code rates, where $d_1$ is a positive integer greater than or equal to 1 and less than or equal to N$_1$: 0.1164+D$1_1$, 0.1464+D$1_2$, 0.1808+D$1_3$, 0.21985+D$1_4$, 0.26605+D$1_5$, 0.31815+D$1_6$, 0.3807+D$1_7$, 0.4466+D$1_8$, 0.5188+D$1_9$, 0.5989+D$1_{10}$, 0.6811+D$1_{11}$, and 0.7543+D$1_{12}$, where values of D$1_1$ to D$1_{12}$ are greater than or equal to −0.02 and less than or equal to 0.02; $d_2$ of the N$_2$ MCS levels respectively correspond to $d_2$ of the following nine code rates, where $d_2$ is a positive integer greater than or equal to 1 and less than or equal to 9: 0.37715+D$2_1$, 0.432575+D$2_2$, 0.4931+D$2_3$, 0.553125+D$2_4$, 0.619125+D$2_5$, 0.686175+D$2_6$, 0.746675+D$2_7$, 0.803675+D$2_8$, and 0.856475+D$2_9$, where values of D$2_1$ to D$2_9$ are greater than or equal to −0.02 and less than or equal to 0.02; and $d_3$ of the N$_3$ MCS levels respectively correspond to $d_3$ of the following eight code rates, where $d_3$ is a positive integer greater than or equal to 1 and less than or equal to 8: 0.570983+D$3_1$, 0.620917+D$3_2$, 0.671933+D$3_3$, 0.722083+D$3_4$, 0.76655+D$3_5$, 0.809317+D$3_6$, 0.850817+D$3_7$, and 0.8894+D$3_8$, where values of D$3_1$ to D$3_8$ are greater than or equal to −0.02 and less than or equal to 0.02. In other words, a correspondence between the MCS levels and the code rates may be determined based on Table 6. Specifically, a code rate corresponding to an MCS level may be a sum of a code rate corresponding to an MCS level in Table 6 and an error value.

Table 7 is determined based on a simulation result obtained when the transport block is greater than 308 and less than or equal to 3840. In a process of determining Table 7, when the code rate is less than 0.67, the BG2 is used for coding; otherwise, the BG 1 is used for coding. In addition, in addition to $E_{max}$, $E_{min}$, each $E_{Qi}$, and $E_{0.5}$, spectral efficiency that needs to be preferentially determined further includes E=1.34, E=2.68, E=4.02, and E=5.399. E=1.34 is obtained by multiplying a modulation order 2 by 0.67. Similarly, E=2.68 is obtained by multiplying a modulation order 4 by 0.67. E=4.02 is obtained by multiplying a modulation order 6 by 0.67. E=5.399 is obtained by multiplying a modulation order 8 by 0.67.

When the spectral efficiency $E_{Qi}$ during modulation order switching is calculated, a code rate of a corresponding lower-order modulation high code rate is usually greater than 0.67. The BG 1 needs to be used for coding. A code rate of a corresponding higher-order modulation low code rate needs to be less than 0.67, and the BG 2 needs to be used for coding. Therefore, to calculate $E_{Qi}$, intersection points of simulation curves of BG 1 lower-order modulation high code rates and simulation curves of BG 2 higher-order modulation low code rates need to be calculated. Although spectral efficiency is the same at MCS levels corresponding to the intersection points, different coding matrices need to be used.

In addition, a manner of determining Table 7 is the same as the manner of determining Table 1.

TABLE 7

| MCS level | Modulation order | Code rate | Spectral efficiency | EsN0 | ΔEsN0 | BG |
|---|---|---|---|---|---|---|
| 0 | 2 | 0.11645 | 0.2329 | −6.601 | | 2 |
| 1 | 2 | 0.14015 | 0.2803 | −5.726 | 0.875 | 2 |
| 2 | 2 | 0.17095 | 0.3419 | −4.851 | 0.875 | 2 |
| 3 | 2 | 0.2123 | 0.4246 | −3.976 | 0.875 | 2 |
| 4 | 2 | 0.25 | 0.5 | −3.101 | 0.875 | 2 |
| 5 | 2 | 0.3017 | 0.6034 | −2.12514 | 0.975857 | 2 |
| 6 | 2 | 0.36235 | 0.7247 | −1.14929 | 0.975857 | 2 |
| 7 | 2 | 0.42695 | 0.8539 | −0.17343 | 0.975857 | 2 |
| 8 | 2 | 0.4979 | 0.9958 | 0.802429 | 0.975857 | 2 |
| 9 | 2 | 0.5748 | 1.1496 | 1.778286 | 0.975857 | 2 |
| 10 | 2 | 0.65355 | 1.3071 | 2.754143 | 0.975857 | 2 |
| 11 | 2 | 0.7275 | 1.455 | 3.73 | 0.975857 | 1 |
| 12 | 4 | 0.36375 | 1.455 | 3.73 | 0 | 2 |
| 13 | 4 | 0.421625 | 1.6865 | 4.731438 | 1.001438 | 2 |
| 14 | 4 | 0.479975 | 1.9199 | 5.732875 | 1.001438 | 2 |
| 15 | 4 | 0.542775 | 2.1711 | 6.734313 | 1.001438 | 2 |
| 16 | 4 | 0.606525 | 2.4261 | 7.73575 | 1.001438 | 2 |

TABLE 7-continued

| MCS level | Modulation order | Code rate | Spectral efficiency | EsN0 | ΔEsN0 | BG |
|---|---|---|---|---|---|---|
| 17 | 4 | 0.669625 | 2.6785 | 8.737188 | 1.001438 | 2 |
| 18 | 4 | 0.72885 | 2.9154 | 9.738625 | 1.001438 | 1 |
| 19 | 4 | 0.7921 | 3.1684 | 10.74006 | 1.001438 | 1 |
| 20 | 4 | 0.850275 | 3.4011 | 11.7415 | 1.001438 | 1 |
| 21 | 6 | 0.56685 | 3.4011 | 11.7415 | 0 | 2 |
| 22 | 6 | 0.616967 | 3.7018 | 12.67275 | 0.93125 | 2 |
| 23 | 6 | 0.666683 | 4.0001 | 13.604 | 0.93125 | 2 |
| 24 | 6 | 0.721733 | 4.3304 | 14.7578 | 1.1538 | 1 |
| 25 | 6 | 0.781917 | 4.6915 | 15.9116 | 1.1538 | 1 |
| 26 | 6 | 0.840433 | 5.0426 | 17.0654 | 1.1538 | 1 |
| 27 | 6 | 0.887467 | 5.3248 | 18.2192 | 1.1538 | 1 |
| 28 | 6 | 0.9258 | 5.5548 | 19.373 | 1.1538 | 1 |
| 29 | | | Reserved | | | |
| 30 | | | Reserved | | | |
| 31 | | | Reserved | | | |

Optionally, in some embodiments, $e_1$ of the $N_1$ MCS levels respectively correspond to $e_1$ of the following 12 code rates, where $e_1$ is a positive integer greater than or equal to 1 and less than or equal to $N_1$: $0.11645+E1_1$, $0.14015+E1_2$, $0.17095+E1_3$, $0.2123+E1_4$, $0.25+E1_5$, $0.3017+E1_6$, $0.36235+E1_7$, $0.42695+E1_8$, $0.4979+E1_9$, $0.5748+E1_{10}$, $0.65355+E1_{11}$, and $0.7275+E1_{12}$, where values of $E1_1$ to $E1_{12}$ are greater than or equal to −0.02 and less than or equal to 0.02; $e_2$ of the $N_2$ MCS levels respectively correspond to $e_2$ of the following nine code rates, where $e_2$ is a positive integer greater than or equal to 1 and less than or equal to 9: $0.36375+E2_1$, $0.421625+E2_2$, $0.479975+E2_3$, $0.542775+E2_4$, $0.606525+E2_5$, $0.669625+E2_6$, $0.72885+E2_7$, $0.7921+E2_8$, and $0.850275+E2_9$, where values of $E2_1$ to $E2_9$ are greater than or equal to −0.02 and less than or equal to 0.02; and $e_3$ of the $N_3$ MCS levels respectively correspond to $e_3$ of the following eight code rates, where $e_3$ is a positive integer greater than or equal to 1 and less than or equal to 8: $0.56685+E3_1$, $0.616967+E3_2$, $0.666683+E3_3$, $0.721733+E3_4$, $0.781917+E3_5$, $0.840433+E3_6$, $0.887467+E3_7$, and $0.9258+E3_8$, where values of $E3_1$ to $E3_8$ are greater than or equal to −0.02 and less than or equal to 0.02. In other words, a correspondence between the MCS levels and the code rates may be determined based on Table 7. Specifically, a code rate corresponding to an MCS level may be a sum of a code rate corresponding to an MCS level in Table 7 and an error value.

A manner of determining Table 8 is the same as the manner of determining Table 7. A difference lies in that Table 7 supports 64QAM at most, and Table 8 supports 256QAM at most.

TABLE 8

| MCS level | Modulation order | Code rate | Spectral efficiency | EsN0 | ΔEsN0 | BG |
|---|---|---|---|---|---|---|
| 0 | 2 | 0.07615 | 0.1523 | −8.47 | | 2 |
| 1 | 2 | 0.1038 | 0.2076 | −7.12775 | 1.34225 | 2 |
| 2 | 2 | 0.1385 | 0.277 | −5.7855 | 1.34225 | 2 |
| 3 | 2 | 0.1916 | 0.3832 | −4.44325 | 1.34225 | 2 |
| 4 | 2 | 0.25 | 0.5 | −3.101 | 1.34225 | 2 |
| 5 | 2 | 0.33505 | 0.6701 | −1.58763 | 1.513375 | 2 |
| 6 | 2 | 0.4337 | 0.8674 | −0.07425 | 1.513375 | 2 |
| 7 | 2 | 0.5477 | 1.0954 | 1.439125 | 1.513375 | 2 |
| 8 | 2 | 0.67 | 1.34 | 2.9525 | 1.513375 | 2 |
| 9 | 2 | 0.7275 | 1.455 | 3.73 | 0.7775 | 1 |
| 10 | 4 | 0.36375 | 1.455 | 3.73 | 0 | 2 |
| 11 | 4 | 0.46505 | 1.8602 | 5.480267 | 1.750267 | 2 |
| 12 | 4 | 0.566 | 2.264 | 7.111633 | 1.631367 | 2 |
| 13 | 4 | 0.67 | 2.68 | 8.743 | 1.631367 | 2 |
| 14 | 4 | 0.76105 | 3.0442 | 10.24225 | 1.49925 | 1 |

TABLE 8-continued

| MCS level | Modulation order | Code rate | Spectral efficiency | EsN0 | ΔEsN0 | BG |
|---|---|---|---|---|---|---|
| 15 | 4 | 0.850275 | 3.4011 | 11.7415 | 1.49925 | 1 |
| 16 | 6 | 0.56685 | 3.4011 | 11.7415 | 0 | 2 |
| 17 | 6 | 0.618567 | 3.7114 | 12.70385 | 0.96235 | 2 |
| 18 | 6 | 0.67 | 4.02 | 13.6662 | 0.96235 | 2 |
| 19 | 6 | 0.737517 | 4.4251 | 15.05563 | 1.389433 | 1 |
| 20 | 6 | 0.809533 | 4.8572 | 16.44507 | 1.389433 | 1 |
| 21 | 6 | 0.889833 | 5.339 | 18.283 | 1.837933 | 1 |
| 22 | 8 | 0.667375 | 5.339 | 18.283 | 0 | 2 |
| 23 | 8 | 0.720725 | 5.7658 | 19.6284 | 1.3454 | 1 |
| 24 | 8 | 0.7804 | 6.2432 | 20.9738 | 1.3454 | 1 |
| 25 | 8 | 0.837413 | 6.6993 | 22.3192 | 1.3454 | 1 |
| 26 | 8 | 0.885388 | 7.0831 | 23.6646 | 1.3454 | 1 |
| 27 | 8 | 0.925788 | 7.4063 | 25.01 | 1.3454 | 1 |
| 28 | | | Reserved | | | |
| 29 | | | Reserved | | | |
| 30 | | | Reserved | | | |
| 31 | | | Reserved | | | |

Optionally, in some embodiments, $f_1$ of the $M_1$ MCS levels respectively correspond to $f_1$ of the following 10 code rates, where $f_1$ is a positive integer greater than or equal to 1 and less than or equal to 10: $0.07615+F1_1$, $0.1038+F1_2$, $0.1385+F1_3$, $0.1916+F1_4$, $0.25+F1_5$, $0.33505+F1_6$, $0.4337+F1_7$, $0.5477+F1_8$, $0.67+F1_9$, and $0.7275+F1_{10}$, where values of $F1_1$ to $F1_{10}$ are greater than or equal to −0.02 and less than or equal to 0.02; $f_2$ of the $M_2$ MCS levels respectively correspond to $f_2$ of the following six code rates, where $f_2$ is a positive integer greater than or equal to 1 and less than or equal to 6: $0.36375+F2_1$, $0.46505+F2_2$, $0.566+F2_3$, $0.67+F2_4$, $0.76105+F2_5$, and $0.850275+F2_6$, where values of $F2_1$ to $F2_6$ are greater than or equal to −0.02 and less than or equal to 0.02; $f_3$ of the $M_3$ MCS levels respectively correspond to $f_3$ of the following six code rates, where $f_3$ is a positive integer greater than or equal to 1 and less than or equal to 6: $0.56685+F3_1$, $0.618567+F3_2$, $0.67+F3_3$, $0.737517+F3_4$, $0.809533+F3_5$, and $0.889833+F3_6$, where values of $F3_1$ to $F3_6$ are greater than or equal to −0.02 and less than or equal to 0.02; and $f_4$ of the $M_4$ MCS levels respectively correspond to $f_4$ of the following six code rates, where $f_3$ is a positive integer greater than or equal to 1 and less than or equal to $M_4$: $0.667375+F4_1$, $0.720725+F4_2$, $0.7804+F4_3$, $0.837413+F4_4$, $0.885388+F4_5$, and $0.925788+F4_6$, where values of $F4_1$ to $F4_6$ are greater than or equal to −0.02 and less than or equal to 0.02. In other words, a correspondence between the MCS levels and the code rates may be determined based on Table 8. Specifically, a code rate corresponding to an MCS level may be a sum of a code rate corresponding to an MCS level in Table 8 and an error value.

Table 9 is determined based on a simulation result obtained when the transport block is greater than 308 and less than or equal to 3840. In a process of determining Table 9, an MCS level corresponding to a code rate equal to 0.67 is not specially set, and only equipartition is performed based on $E_{Qi}$. An actual code rate is calculated based on equipartition, and a BG is selected.

In addition, a manner of determining Table 9 is the same as the manner of determining Table 1.

TABLE 9

| MCS level | Modulation order | Code rate | Spectral efficiency | EsN0 | ΔEsN0 | BG |
|---|---|---|---|---|---|---|
| 0 | 2 | 0.11645 | 0.2329 | −6.601 | | 2 |
| 1 | 2 | 0.14015 | 0.2803 | −5.726 | 0.875 | 2 |
| 2 | 2 | 0.17095 | 0.3419 | −4.851 | 0.875 | 2 |

TABLE 9-continued

| MCS level | Modulation order | Code rate | Spectral efficiency | EsN0 | ΔEsN0 | BG |
|---|---|---|---|---|---|---|
| 3 | 2 | 0.2123 | 0.4246 | −3.976 | 0.875 | 2 |
| 4 | 2 | 0.25 | 0.5 | −3.101 | 0.875 | 2 |
| 5 | 2 | 0.3017 | 0.6034 | −2.12514 | 0.975857 | 2 |
| 6 | 2 | 0.36235 | 0.7247 | −1.14929 | 0.975857 | 2 |
| 7 | 2 | 0.42695 | 0.8539 | −0.17343 | 0.975857 | 2 |
| 8 | 2 | 0.4979 | 0.9958 | 0.802429 | 0.975857 | 2 |
| 9 | 2 | 0.5748 | 1.1496 | 1.778286 | 0.975857 | 2 |
| 10 | 2 | 0.65355 | 1.3071 | 2.754143 | 0.975857 | 2 |
| 11 | 2 | 0.7275 | 1.455 | 3.73 | 0.975857 | 1 |
| 12 | 4 | 0.36375 | 1.455 | 3.73 | 0 | 2 |
| 13 | 4 | 0.421625 | 1.6865 | 4.731438 | 1.001438 | 2 |
| 14 | 4 | 0.479975 | 1.9199 | 5.732875 | 1.001438 | 2 |
| 15 | 4 | 0.542775 | 2.1711 | 6.734313 | 1.001438 | 2 |
| 16 | 4 | 0.606525 | 2.4261 | 7.73575 | 1.001438 | 2 |
| 17 | 4 | 0.669625 | 2.6785 | 8.737188 | 1.001438 | 2 |
| 18 | 4 | 0.72885 | 2.9154 | 9.738625 | 1.001438 | 1 |
| 19 | 4 | 0.7921 | 3.1684 | 10.74006 | 1.001438 | 1 |
| 20 | 4 | 0.850275 | 3.4011 | 11.7415 | 1.001438 | 1 |
| 21 | 6 | 0.56685 | 3.4011 | 11.7415 | 0 | 2 |
| 22 | 6 | 0.6254 | 3.7524 | 12.83171 | 1.090214 | 2 |
| 23 | 6 | 0.68335 | 4.1001 | 13.92193 | 1.090214 | 2 |
| 24 | 6 | 0.7352 | 4.4112 | 15.01214 | 1.090214 | 1 |
| 25 | 6 | 0.79195 | 4.7517 | 16.10236 | 1.090214 | 1 |
| 26 | 6 | 0.845983 | 5.0759 | 17.19257 | 1.090214 | 1 |
| 27 | 6 | 0.889833 | 5.339 | 18.28279 | 1.090214 | 1 |
| 28 | 6 | 0.9258 | 5.5548 | 19.373 | 1.090214 | 1 |
| 29 | | | Reserved | | | |
| 30 | | | Reserved | | | |
| 31 | | | Reserved | | | |

Optionally, in some embodiments, $g_1$ of the $N_1$ MCS levels respectively correspond to $g_1$ of the following 12 code rates, where $g_1$ is a positive integer greater than or equal to 1 and less than or equal to $N_1$: $0.11645+G1_1$, $0.14015+G1_2$, $0.17095+G1_3$, $0.2123+G1_4$, $0.25+G1_5$, $0.3017+G1_6$, $0.36235+G1_7$, $0.42695+G1_8$, $0.4979+G1_9$, $0.5748+G1_{10}$, $0.65355+G1_{11}$, and $0.7275+G1_{12}$, where values of $G1_1$ to $G1_{12}$ are greater than or equal to −0.02 and less than or equal to 0.02; $g_2$ of the $N_2$ MCS levels respectively correspond to $g_2$ of the following nine code rates, where $g_2$ is a positive integer greater than or equal to 1 and less than or equal to 9: $0.36375+G2_1$, $0.421625+G2_2$, $0.479975+G2_3$, $0.542775+G2_4$, $0.606525+G2_5$, $0.669625+G2_6$, $0.72885+G2_7$, $0.7921+G2_8$, and $0.850275+G2_9$, where values of $G2_1$ to $G2_9$ are greater than or equal to −0.02 and less than or equal to 0.02; and $g_3$ of the $N_3$ MCS levels respectively correspond to $g_3$ of the following eight code rates, where $g_3$ is a positive integer greater than or equal to 1 and less than or equal to 8: $0.56685+G3_1$, $0.6254+G3_2$, $0.68335+G3_3$, $0.7352+G3_4$, $0.79195+G3_5$, $0.845983+G3_6$, $0.889833+G3_7$, and $0.9258+G3_8$, where values of $G3_1$ to $G3_8$ are greater than or equal to −0.02 and less than or equal to 0.02. In other words, a correspondence between the MCS levels and the code rates may be determined based on Table 9. Specifically, a code rate corresponding to an MCS level may be a sum of a code rate corresponding to an MCS level in Table 9 and an error value.

A manner of determining Table 10 is the same as the manner of determining Table 9. A difference lies in that Table 9 supports 64QAM at most, and Table 10 supports 256QAM at most.

TABLE 10

| MCS level | Modulation order | Code rate | Spectral efficiency | EsN0 | ΔEsN0 | BG |
|---|---|---|---|---|---|---|
| 0 | 2 | 0.07615 | 0.1523 | −8.47 | | 2 |
| 1 | 2 | 0.1038 | 0.2076 | −7.1277 | 1.34225 | 2 |

TABLE 10-continued

| MCS level | Modulation order | Code rate | Spectral efficiency | EsN0 | ΔEsN0 | BG |
|---|---|---|---|---|---|---|
| 2 | 2 | 0.1385 | 0.277 | −5.7855 | 1.34225 | 2 |
| 3 | 2 | 0.1916 | 0.3832 | −4.4432 | 1.34225 | 2 |
| 4 | 2 | 0.25 | 0.5 | −3.101 | 1.34225 | 2 |
| 5 | 2 | 0.3259 | 0.6518 | −1.7348 | 1.3662 | 2 |
| 6 | 2 | 0.4135 | 0.827 | −0.3686 | 1.3662 | 2 |
| 7 | 2 | 0.51365 | 1.0273 | 0.9976 | 1.3662 | 2 |
| 8 | 2 | 0.6225 | 1.245 | 2.3638 | 1.3662 | 2 |
| 9 | 2 | 0.7275 | 1.455 | 3.73 | 1.3662 | 1 |
| 10 | 4 | 0.36375 | 1.455 | 3.73 | 0 | 2 |
| 11 | 4 | 0.4564 | 1.8256 | 5.3323 | 1.6023 | 2 |
| 12 | 4 | 0.5548 | 2.2192 | 6.9346 | 1.6023 | 2 |
| 13 | 4 | 0.656825 | 2.6273 | 8.5369 | 1.6023 | 2 |
| 14 | 4 | 0.75455 | 3.0182 | 10.1392 | 1.6023 | 1 |
| 15 | 4 | 0.850275 | 3.4011 | 11.7415 | 1.6023 | 1 |
| 16 | 6 | 0.56685 | 3.4011 | 11.7415 | 0 | 2 |
| 17 | 6 | 0.637167 | 3.823 | 13.0498 | 1.3083 | 2 |
| 18 | 6 | 0.6998 | 4.1988 | 14.3581 | 1.3083 | 1 |
| 19 | 6 | 0.769117 | 4.6147 | 15.6664 | 1.3083 | 1 |
| 20 | 6 | 0.836 | 5.016 | 16.9747 | 1.3083 | 1 |
| 21 | 6 | 0.889833 | 5.339 | 18.283 | 1.3083 | 1 |
| 22 | 8 | 0.667375 | 5.339 | 18.283 | 0 | 2 |
| 23 | 8 | 0.720725 | 5.7658 | 19.6284 | 1.3454 | 1 |
| 24 | 8 | 0.7804 | 6.2432 | 20.9738 | 1.3454 | 1 |
| 25 | 8 | 0.837413 | 6.6993 | 22.3192 | 1.3454 | 1 |
| 26 | 8 | 0.885388 | 7.0831 | 23.6646 | 1.3454 | 1 |
| 27 | 8 | 0.925788 | 7.4063 | 25.01 | 1.3454 | 1 |
| 28 | | | Reserved | | | |
| 29 | | | Reserved | | | |
| 30 | | | Reserved | | | |
| 31 | | | Reserved | | | |

Optionally, in some embodiments, $h_1$ of the $M_1$ MCS levels respectively correspond to $h_1$ of the following 10 code rates, where $h_1$ is a positive integer greater than or equal to 1 and less than or equal to 10: $0.07615+H1_1$, $0.1038+H1_2$, $0.1385+H1_3$, $0.1916+H1_4$, $0.25+H1_5$, $0.3259+H1_6$, $0.4135+H1_7$, $0.51365+H1_8$, $0.6225+H1_9$, and $0.7275+H1_{10}$, where values of $H1_1$ to $H1_{10}$ are greater than or equal to −0.02 and less than or equal to 0.02; $h_2$ of the $M_2$ MCS levels respectively correspond to $h_2$ of the following six code rates, where $h_2$ is a positive integer greater than or equal to 1 and less than or equal to 6: $0.36375+H2_1$, $0.4564+H2_2$, $0.5548+H2_3$, $0.656825+H2_4$, $0.75455+H2_5$, and $0.850275+H2_6$, where values of $H2_1$ to $H2_6$ are greater than or equal to −0.02 and less than or equal to 0.02; $h_3$ of the $M_3$ MCS levels respectively correspond to $h_3$ of the following six code rates, where $h_3$ is a positive integer greater than or equal to 1 and less than or equal to 6: $0.56685+H3_1$, $0.637167+H3_2$, $0.6998+H3_3$, $0.769117+H3_4$, $0.836+H3_5$, and $0.889833+H3_6$, where values of $H3_1$ to $H3_6$ are greater than or equal to −0.02 and less than or equal to 0.02; and $h_4$ of the $M_4$ MCS levels respectively correspond to $h_4$ of the following six code rates, where $h_3$ is a positive integer greater than or equal to 1 and less than or equal to $M_4$: $0.667375+H4_1$, $0.720725+H4_2$, $0.7804+H4_3$, $0.837413+H4_4$, $0.885388+H4_5$, and $0.925788+H4_6$, where values of $H4_1$ to $H4_6$ are greater than or equal to −0.02 and less than or equal to 0.02. In other words, a correspondence between the MCS levels and the code rates may be determined based on Table 10. Specifically, a code rate corresponding to an MCS level may be a sum of a code rate corresponding to an MCS level in Table 10 and an error value.

Table 11 is determined by the simulation result obtained when the transport block length is equal to 3840, and a row-column interleaver is added during simulation. In a process of determining Table 11, an MCS level corresponding to a code rate equal to 0.5 is specially set.

In addition, a manner of determining Table 11 is the same as the manner of determining Table 1.

TABLE 11

| MCS level | Modulation order | Code rate | Spectral efficiency | EsN0 | ΔEsN0 | BG |
|---|---|---|---|---|---|---|
| 0 | 2 | 0.1164 | 0.2328 | −6.13 |  | 2 |
| 1 | 2 | 0.14395 | 0.2879 | −5.23375 | 0.89625 | 2 |
| 2 | 2 | 0.17495 | 0.3499 | −4.3375 | 0.89625 | 2 |
| 3 | 2 | 0.209 | 0.418 | −3.44125 | 0.89625 | 2 |
| 4 | 2 | 0.25 | 0.5 | −2.545 | 0.89625 | 2 |
| 5 | 2 | 0.30165 | 0.6033 | −1.53566 | 1.009338 | 2 |
| 6 | 2 | 0.3646 | 0.7292 | −0.52633 | 1.009338 | 2 |
| 7 | 2 | 0.4314 | 0.8628 | 0.483013 | 1.009338 | 2 |
| 8 | 2 | 0.50725 | 1.0145 | 1.49235 | 1.009338 | 2 |
| 9 | 2 | 0.58645 | 1.1729 | 2.501688 | 1.009338 | 2 |
| 10 | 2 | 0.6687 | 1.3374 | 3.511025 | 1.009338 | 2 |
| 11 | 2 | 0.7486 | 1.4972 | 4.520363 | 1.009338 | 2 |
| 12 | 2 | 0.8153 | 1.6306 | 5.5297 | 1.009338 | 2 |
| 13 | 4 | 0.40765 | 1.6306 | 5.5297 | 0 | 2 |
| 14 | 4 | 0.4721 | 1.8884 | 6.556843 | 1.027143 | 2 |
| 15 | 4 | 0.548525 | 2.1941 | 7.583986 | 1.027143 | 2 |
| 16 | 4 | 0.621775 | 2.4871 | 8.611129 | 1.027143 | 2 |
| 17 | 4 | 0.679175 | 2.7167 | 9.638271 | 1.027143 | 2 |
| 18 | 4 | 0.7482 | 2.9928 | 10.66541 | 1.027143 | 2 |
| 19 | 4 | 0.807325 | 3.2293 | 11.69256 | 1.027143 | 2 |
| 20 | 4 | 0.8516 | 3.4064 | 12.7197 | 1.027143 | 2 |
| 21 | 6 | 0.567733 | 3.4064 | 12.7197 | 0 | 2 |
| 22 | 6 | 0.64035 | 3.8421 | 13.76471 | 1.045014 | 2 |
| 23 | 6 | 0.6909 | 4.1454 | 14.80973 | 1.045014 | 2 |
| 24 | 6 | 0.736917 | 4.4215 | 15.85474 | 1.045014 | 2 |
| 25 | 6 | 0.7964 | 4.7784 | 16.89976 | 1.045014 | 2 |
| 26 | 6 | 0.840233 | 5.0414 | 17.94477 | 1.045014 | 2 |
| 27 | 6 | 0.8746 | 5.2476 | 18.98979 | 1.045014 | 2 |
| 28 | 6 | 0.9258 | 5.5548 | 20.0348 | 1.045014 | 2 |
| 29 |  |  | Reserved |  |  |  |
| 30 |  |  | Reserved |  |  |  |
| 31 |  |  | Reserved |  |  |  |

Optionally, in some embodiments, $i_1$ of the $N_1$ MCS levels respectively correspond to $i_1$ of the following 13 code rates, where $i_1$ is a positive integer greater than or equal to 1 and less than or equal to $N_1$: $0.1164+I1_1$, $0.14395+I1_2$, $0.17495+I1_3$, $0.209+I1_4$, $0.25+I1_5$, $0.30165+I1_6$, $0.3646+I1_7$, $0.4314+I1_8$, $0.50725+I1_9$, $0.58645+I1_{10}$, $0.6687+I1_{11}$, and $0.7486+I1_{12}$, and $0.8153+I1_{13}$, where values of $I1_1$ to $I1_{13}$ are greater than or equal to −0.02 and less than or equal to 0.02; $i_2$ of the $N_2$ MCS levels respectively correspond to $i_2$ of the following eight code rates, where $i_2$ is a positive integer greater than or equal to 1 and less than or equal to 8: $0.40765+I2_1$, $0.4721+I2_2$, $0.548525+I2_3$, $0.621775+I2_4$, $0.679175+I2_5$, $0.7482+I2_6$, $0.807325+I2_7$, and $0.8516+I2_8$, where values of $I2_1$ to $I2_8$ are greater than or equal to −0.02 and less than or equal to 0.02; and $i_3$ of the $N_3$ MCS levels respectively correspond to $i_3$ of the following eight code rates, where $i_3$ is a positive integer greater than or equal to 1 and less than or equal to 8: $0.567733+I3_1$, $0.64035+I3_2$, $0.6909+I3_3$, $0.736917+I3_4$, $0.7964+I3_5$, $0.840233+I3_6$, $0.8746+I3_7$, and $0.9258+I3_8$, where values of $I3_1$ to $I3_8$ are greater than or equal to −0.02 and less than or equal to 0.02. In other words, a correspondence between the MCS levels and the code rates may be determined based on Table 11. Specifically, a code rate corresponding to an MCS level may be a sum of a code rate corresponding to an MCS level in Table 11 and an error value.

A manner of determining Table 12 is the same as the manner of determining Table 11. A difference lies in that Table 11 supports 64QAM at most, and Table 12 supports 256QAM at most.

TABLE 12

| MCS level | Modulation order | Code rate | Spectral efficiency | EsN0 | ΔEsN0 | BG |
|---|---|---|---|---|---|---|
| 0 | 2 | 0.07615 | 0.1523 | −8 |  | 2 |
| 1 | 2 | 0.10385 | 0.2077 | −6.63625 | 1.36375 | 2 |
| 2 | 2 | 0.14265 | 0.2853 | −5.2725 | 1.36375 | 2 |
| 3 | 2 | 0.19055 | 0.3811 | −3.90875 | 1.36375 | 2 |
| 4 | 2 | 0.25 | 0.5 | −2.545 | 1.36375 | 2 |
| 5 | 2 | 0.33785 | 0.6757 | −0.93006 | 1.61494 | 2 |
| 6 | 2 | 0.44605 | 0.8921 | 0.68488 | 1.61494 | 2 |
| 7 | 2 | 0.56845 | 1.1369 | 2.29982 | 1.61494 | 2 |
| 8 | 2 | 0.7032 | 1.4064 | 3.91476 | 1.61494 | 2 |
| 9 | 2 | 0.8153 | 1.6306 | 5.5297 | 1.61494 | 2 |
| 10 | 4 | 0.40765 | 1.6306 | 5.5297 | 0 | 2 |
| 11 | 4 | 0.5061 | 2.0244 | 6.9677 | 1.438 | 2 |
| 12 | 4 | 0.60705 | 2.4282 | 8.4057 | 1.438 | 2 |
| 13 | 4 | 0.69265 | 2.7706 | 9.8437 | 1.438 | 2 |
| 14 | 4 | 0.786075 | 3.1443 | 11.2817 | 1.438 | 2 |
| 15 | 4 | 0.8516 | 3.4064 | 12.7197 | 1.438 | 2 |
| 16 | 6 | 0.5677333 | 3.4064 | 12.7197 | 0 | 2 |
| 17 | 6 | 0.6500667 | 3.9004 | 14.13954 | 1.41984 | 2 |
| 18 | 6 | 0.7232333 | 4.3394 | 15.55938 | 1.41984 | 2 |
| 19 | 6 | 0.8008333 | 4.805 | 16.97922 | 1.41984 | 2 |
| 20 | 6 | 0.8519333 | 5.1116 | 18.39906 | 1.41984 | 2 |
| 21 | 6 | 0.9049 | 5.4294 | 19.8189 | 1.41984 | 2 |
| 22 | 8 | 0.678675 | 5.4294 | 19.8189 | 0 | 2 |
| 23 | 8 | 0.7476625 | 5.9813 | 21.17912 | 1.36022 | 2 |
| 24 | 8 | 0.8062625 | 6.4501 | 22.53934 | 1.36022 | 2 |
| 25 | 8 | 0.8406875 | 6.7255 | 23.89956 | 1.36022 | 2 |
| 26 | 8 | 0.90445 | 7.2356 | 25.25978 | 1.36022 | 2 |
| 27 | 8 | 0.9257875 | 7.4063 | 26.62 | 1.36022 | 2 |
| 28 |  |  | Reserved |  |  |  |
| 29 |  |  | Reserved |  |  |  |
| 30 |  |  | Reserved |  |  |  |
| 31 |  |  | Reserved. |  |  |  |

Optionally, in some embodiments, $j_1$ of the $M_1$ MCS levels respectively correspond to $j_1$ of the following 10 code rates, where $j_1$ is a positive integer greater than or equal to 1 and less than or equal to 10: $0.07615+J1_1$, $0.10385+J1_2$, $0.14265+J1_3$, $0.19055+J1_4$, $0.25+J1_5$, $0.33785+J1_6$, $0.44605+J1_7$, $0.56845+J1_8$, $0.7032+J1_9$, and $0.8153+J1_{10}$, where values of $J1_1$ to $J1_{10}$ are greater than or equal to −0.02 and is less than or equal to 0.02; $j_2$ of the $M_2$ MCS levels respectively correspond to $j_2$ of the following six code rates, where $j_2$ is a positive integer greater than or equal to 1 and less than or equal to 6: $0.40765+J2_1$, $0.5061+J2_2$, $0.60705+J2_3$, $0.69265+J2_4$, $0.786075+J2_5$, and $0.8516+J2_6$, where values of $J2_1$ to $J2_6$ are greater than or equal to −0.02 and less than or equal to 0.02; $j_3$ of the $M_3$ MCS levels respectively correspond to $j_3$ of the following six code rates, where $j_3$ is a positive integer greater than or equal to 1 and less than or equal to 6: $0.5677333+J3_1$, $0.6500667+J3_2$, $0.7232333+J3_3$, $0.8008333+J3_4$, $0.8519333+J3_5$, and $0.9049+J3_6$, where values of $J3_1$ to $J3_6$ are greater than or equal to −0.02 and less than or equal to 0.02; and $j_4$ of the $M_4$ MCS levels respectively correspond to $j_4$ of the following six code rates, where $j_3$ is a positive integer greater than or equal to 1 and less than or equal to $M_4$: $0.678675+J4_1$, $0.7476625+J4_2$, $0.8062625+J4_3$, $0.8406875+J4_4$, $0.90445+J4_5$, and $0.9257875+J4_6$, where values of $J4_1$ to $J4_6$ are greater than or equal to −0.02 and less than or equal to 0.02. In other words, a correspondence between the MCS levels and the code rates may be determined based on Table 12. Specifically, a code rate corresponding to an MCS level may be a sum of a code rate corresponding to an MCS level in Table 12 and an error value.

Table 13 is determined by the simulation result obtained when the transport block length is equal to 3840, and a row-column interleaver is added during simulation. In a process of determining Table 11, the MCS level corresponding to the code rate equal to 0.5 is not specially set.

In addition, a manner of determining Table 13 is the same as the manner of determining Table 1.

TABLE 13

| MCS level | Modulation order | Code rate | Spectral efficiency | EsN0 | ΔEsN0 | BG |
|---|---|---|---|---|---|---|
| 0 | 2 | 0.1164 | 0.2328 | −6.13 | | 2 |
| 1 | 2 | 0.14645 | 0.2929 | −5.15836 | 0.971642 | 2 |
| 2 | 2 | 0.1804 | 0.3608 | −4.18672 | 0.971642 | 2 |
| 3 | 2 | 0.21875 | 0.4375 | −3.21508 | 0.971642 | 2 |
| 4 | 2 | 0.2648 | 0.5296 | −2.24343 | 0.971642 | 2 |
| 5 | 2 | 0.31645 | 0.6329 | −1.27179 | 0.971642 | 2 |
| 6 | 2 | 0.3782 | 0.7564 | −0.30015 | 0.971642 | 2 |
| 7 | 2 | 0.4451 | 0.8902 | 0.671492 | 0.971642 | 2 |
| 8 | 2 | 0.51705 | 1.0341 | 1.643133 | 0.971642 | 2 |
| 9 | 2 | 0.5971 | 1.1942 | 2.614775 | 0.971642 | 2 |
| 10 | 2 | 0.6748 | 1.3496 | 3.586417 | 0.971642 | 2 |
| 11 | 2 | 0.75135 | 1.5027 | 4.558058 | 0.971642 | 2 |
| 12 | 2 | 0.8153 | 1.6306 | 5.5297 | 0.971642 | 2 |
| 13 | 4 | 0.40765 | 1.6306 | 5.5297 | 0 | 2 |
| 14 | 4 | 0.4721 | 1.8884 | 6.556843 | 1.027143 | 2 |
| 15 | 4 | 0.548525 | 2.1941 | 7.583986 | 1.027143 | 2 |
| 16 | 4 | 0.621775 | 2.4871 | 8.611129 | 1.027143 | 2 |
| 17 | 4 | 0.679175 | 2.7167 | 9.638271 | 1.027143 | 2 |
| 18 | 4 | 0.7482 | 2.9928 | 10.66541 | 1.027143 | 2 |
| 19 | 4 | 0.807325 | 3.2293 | 11.69256 | 1.027143 | 2 |
| 20 | 4 | 0.8516 | 3.4064 | 12.7197 | 1.027143 | 2 |
| 21 | 6 | 0.567733 | 3.4064 | 12.7197 | 0 | 2 |
| 22 | 6 | 0.64035 | 3.8421 | 13.76471 | 1.045014 | 2 |
| 23 | 6 | 0.6909 | 4.1454 | 14.80973 | 1.045014 | 2 |
| 24 | 6 | 0.736917 | 4.4215 | 15.85474 | 1.045014 | 2 |
| 25 | 6 | 0.7964 | 4.7784 | 16.89976 | 1.045014 | 2 |
| 26 | 6 | 0.840233 | 5.0414 | 17.94477 | 1.045014 | 2 |
| 27 | 6 | 0.8746 | 5.2476 | 18.98979 | 1.045014 | 2 |
| 28 | 6 | 0.9258 | 5.5548 | 20.0348 | 1.045014 | 2 |
| 29 | | | Reserved | | | |
| 30 | | | Reserved | | | |
| 31 | | | Reserved | | | |

Optionally, in some embodiments, $k_1$ of the $N_1$ MCS levels respectively correspond to $k_1$ of the following 13 code rates, where $k_1$ is a positive integer greater than or equal to 1 and less than or equal to $N_1$: $0.1164+K1_1$, $0.14645+K1_2$, $0.1804+K1_3$, $0.21875+K1_4$, $0.2648+K1_5$, $0.31645+K1_6$, $0.3782+K1_7$, $0.4451+K1_8$, $0.51705+K1_9$, $0.5971+K1_{10}$, $0.6748+K1_{11}$, $0.75135+K1_{12}$, and $0.8153+K1_{13}$, where values of $K1_1$ to $K1_{13}$ are greater than or equal to −0.02 and less than or equal to 0.02; $k_2$ of the $N_2$ MCS levels respectively correspond to $k_2$ of the following eight code rates, where $k_2$ is a positive integer greater than or equal to 1 and less than or equal to 8: $0.40765+K2_1$, $0.4721+K2_2$, $0.548525+K2_3$, $0.621775+K2_4$, $0.679175+K2_5$, $0.7482+K2_6$, $0.807325+K2_7$, and $0.8516+K2_8$, where values of $K2_1$ to $K2_8$ are greater than or equal to −0.02 and less than or equal to 0.02; and $k_3$ of the $N_3$ MCS levels respectively correspond to $k_3$ of the following eight code rates, where $k_3$ is a positive integer greater than or equal to 1 and less than or equal to 8: $0.567733+K3_1$, $0.64035+K3_2$, $0.6909+K3_3$, $0.736917+K3_4$, $0.7964+K3_5$, $0.840233+K3_6$, $0.8746+K3_7$, and $0.9258+K3_8$, where values of $K3_1$ to $K3_8$ are greater than or equal to −0.02 and less than or equal to 0.02. In other words, a correspondence between the MCS levels and the code rates may be determined based on Table 13. Specifically, a code rate corresponding to an MCS level may be a sum of a code rate corresponding to an MCS level in Table 13 and an error value.

A manner of determining Table 14 is the same as the manner of determining Table 13. A difference lies in that Table 13 supports 64QAM at most, and Table 14 supports 256QAM at most.

TABLE 14

| MCS level | Modulation order | Code rate | Spectral efficiency | EsN0 | ΔEsN0 | BG |
|---|---|---|---|---|---|---|
| 0 | 2 | 0.07615 | 0.1523 | −8 | | 2 |
| 1 | 2 | 0.1073 | 0.2146 | −6.4967 | 1.5033 | 2 |
| 2 | 2 | 0.15195 | 0.3039 | −4.9934 | 1.5033 | 2 |
| 3 | 2 | 0.20685 | 0.4137 | −3.4901 | 1.5033 | 2 |
| 4 | 2 | 0.2785 | 0.557 | −1.9868 | 1.5033 | 2 |
| 5 | 2 | 0.36715 | 0.7343 | −0.4835 | 1.5033 | 2 |
| 6 | 2 | 0.4707 | 0.9414 | 1.0198 | 1.5033 | 2 |
| 7 | 2 | 0.58845 | 1.1769 | 2.5231 | 1.5033 | 2 |
| 8 | 2 | 0.7134 | 1.4268 | 4.0264 | 1.5033 | 2 |
| 9 | 2 | 0.8153 | 1.6306 | 5.5297 | 1.5033 | 2 |
| 10 | 4 | 0.40765 | 1.6306 | 5.5297 | 0 | 2 |
| 11 | 4 | 0.5061 | 2.0244 | 6.9677 | 1.438 | 2 |
| 12 | 4 | 0.60705 | 2.4282 | 8.4057 | 1.438 | 2 |
| 13 | 4 | 0.69265 | 2.7706 | 9.8437 | 1.438 | 2 |
| 14 | 4 | 0.786075 | 3.1443 | 11.2817 | 1.438 | 2 |
| 15 | 4 | 0.8516 | 3.4064 | 12.7197 | 1.438 | 2 |
| 16 | 6 | 0.5677333 | 3.4064 | 12.7197 | 0 | 2 |
| 17 | 6 | 0.6500667 | 3.9004 | 14.13954 | 1.41984 | 2 |
| 18 | 6 | 0.7232333 | 4.3394 | 15.55938 | 1.41984 | 2 |
| 19 | 6 | 0.8008333 | 4.805 | 16.97922 | 1.41984 | 2 |
| 20 | 6 | 0.8519333 | 5.1116 | 18.39906 | 1.41984 | 2 |
| 21 | 6 | 0.9049 | 5.4294 | 19.8189 | 1.41984 | 2 |
| 22 | 8 | 0.678675 | 5.4294 | 19.8189 | 0 | 2 |
| 23 | 8 | 0.7476625 | 5.9813 | 21.17912 | 1.36022 | 2 |
| 24 | 8 | 0.8062625 | 6.4501 | 22.53934 | 1.36022 | 2 |
| 25 | 8 | 0.8406875 | 6.7255 | 23.89956 | 1.36022 | 2 |
| 26 | 8 | 0.90445 | 7.2356 | 25.25978 | 1.36022 | 2 |
| 27 | 8 | 0.9257875 | 7.4063 | 26.62 | 1.36022 | 2 |
| 28 | | | Reserved | | | |
| 29 | | | Reserved | | | |
| 30 | | | Reserved | | | |
| 31 | | | Reserved | | | |

Optionally, in some embodiments, $o_1$ of the $M_1$ MCS levels respectively correspond to $o_1$ of the following 10 code rates, where $o_1$ is a positive integer greater than or equal to 1 and less than or equal to 10: $0.07615+O1_1$, $0.1073+O1_2$, $0.15195+O1_3$, $0.20685+O1_4$, $0.2785+O1_5$, $0.36715+O1_6$, $0.4707+O1_7$, $0.58845+O1_8$, $0.7134+O1_9$, and $0.8153+O1_{10}$, where values of $O1_1$ to $O1_{10}$ are greater than or equal to −0.02 and less than or equal to 0.02; $o_2$ of the $M_2$ MCS levels respectively correspond to $o_2$ of the following six code rates, where $o_2$ is a positive integer greater than or equal to 1 and less than or equal to 6: $0.40765+O2_1$, $0.5061+O2_2$, $0.60705+O2_3$, $0.69265+O2_4$, $0.786075+O2_5$, and $0.8516+O2_6$, where values of $O2_1$ to $O2_6$ are greater than or equal to −0.02 and less than or equal to 0.02; $o_3$ of the $M_3$ MCS levels respectively correspond to $o_3$ of the following six code rates, where $o_3$ is a positive integer greater than or equal to 1 and less than or equal to 6: $0.5677333+O3_1$, $0.6500667+O3_2$, $0.7232333+O3_3$, $0.8008333+O3_4$, $0.8519333+O3_5$, and $0.9049+O3_6$, where values of $O3_1$ to $O3_6$ are greater than or equal to −0.02 and less than or equal to 0.02; and $o_4$ of the $M_4$ MCS levels respectively correspond to $o_4$ of the following six code rates, where $o_3$ is a positive integer greater than or equal to 1 and less than or equal to $M_4$: $0.678675+O4_1$, $0.7476625+O4_2$, $0.8062625+O4_3$, $0.8406875+O4_4$, $0.90445+O4_5$, and $0.9257875+O4_6$, where values of $O4_1$ to $O4_6$ are greater than or equal to −0.02 and less than or equal to 0.02. In other words, a correspondence between the MCS levels and the code rates may be determined based on Table 14. Specifically, a code rate corresponding to an MCS level may be a sum of a code rate corresponding to an MCS level in Table 14 and an error value.

Table 15 is determined by the simulation result obtained when the transport block length is equal to 3840, and a row-column interleaver is added during simulation. In a process of determining Table 15, the MCS level corresponding to the code rate equal to 0.5 is specially set, and an MCS level is specifically set for a switching code rate 0.67 of the BG 2 and the BG 1.

In addition, a manner of determining Table 15 is the same as the manner of determining Table 1.

TABLE 15

| MCS level | Modulation order | Code rate | Spectral efficiency | EsN0 | ΔEsN0 | BG |
|---|---|---|---|---|---|---|
| 0 | 2 | 0.11645 | 0.2329 | −6.648 | | 2 |
| 1 | 2 | 0.1403 | 0.2806 | −5.77225 | 0.87575 | 2 |
| 2 | 2 | 0.17085 | 0.3417 | −4.8965 | 0.87575 | 2 |
| 3 | 2 | 0.21215 | 0.4243 | −4.02075 | 0.87575 | 2 |
| 4 | 2 | 0.25 | 0.5 | −3.145 | 0.87575 | 2 |
| 5 | 2 | 0.3031 | 0.6062 | −2.14267 | 1.002333 | 2 |
| 6 | 2 | 0.3659 | 0.7318 | −1.14033 | 1.002333 | 2 |
| 7 | 2 | 0.43295 | 0.8659 | −0.138 | 1.002333 | 2 |
| 8 | 2 | 0.50625 | 1.0125 | 0.864333 | 1.002333 | 2 |
| 9 | 2 | 0.5862 | 1.1724 | 1.866667 | 1.002333 | 2 |
| 10 | 2 | 0.6667 | 1.3334 | 2.869 | 1.002333 | 2 |
| 11 | 2 | 0.732 | 1.464 | 3.7445 | 0.8755 | 1 |
| 12 | 2 | 0.79885 | 1.5977 | 4.62 | 0.8755 | 1 |
| 13 | 4 | 0.399425 | 1.5977 | 4.62 | 0 | 2 |
| 14 | 4 | 0.469975 | 1.8799 | 5.6245 | 1.0045 | 2 |
| 15 | 4 | 0.535125 | 2.1405 | 6.629 | 1.0045 | 2 |
| 16 | 4 | 0.602675 | 2.4107 | 7.6335 | 1.0045 | 2 |
| 17 | 4 | 0.6667 | 2.6668 | 8.638 | 1.0045 | 2 |
| 18 | 4 | 0.730975 | 2.9239 | 9.728667 | 1.090667 | 1 |
| 19 | 4 | 0.802475 | 3.2099 | 10.81933 | 1.090667 | 1 |
| 20 | 4 | 0.86225 | 3.449 | 11.91 | 1.090667 | 1 |
| 21 | 6 | 0.574833 | 3.449 | 11.91 | 0 | 2 |
| 22 | 6 | 0.61845 | 3.7107 | 12.7725 | 0.8625 | 2 |
| 23 | 6 | 0.6667 | 4.0002 | 13.635 | 0.8625 | 2 |
| 24 | 6 | 0.7207 | 4.3242 | 14.7662 | 1.1312 | 1 |
| 25 | 6 | 0.787767 | 4.7266 | 15.8974 | 1.1312 | 1 |
| 26 | 6 | 0.8409 | 5.0454 | 17.0286 | 1.1312 | 1 |
| 27 | 6 | 0.888517 | 5.3311 | 18.1598 | 1.1312 | 1 |
| 28 | 6 | 0.9258 | 5.5548 | 19.291 | 1.1312 | 1 |
| 29 | | | Reserved | | | |
| 30 | | | Reserved | | | |
| 31 | | | Reserved | | | |

Optionally, in some embodiments, $p_1$ of the $N_1$ MCS levels respectively correspond to $p_1$ of the following 13 code rates, where $p_1$ is a positive integer greater than or equal to 1 and less than or equal to $N_1$: $0.11645+P1_1$, $0.1403+P1_2$, $0.17085+P1_3$, $0.21215+P1_4$, $0.25+P1_5$, $0.3031+P1_6$, $0.3659+P1_7$, $0.43295+P1_8$, $0.50625+P1_9$, $0.5862+P1_{10}$, $0.6667+P1_{11}$, $0.732+P1_{12}$, and $0.79885+P1_{13}$, where values of $P1_1$ to $P1_{13}$ are greater than or equal to −0.02 and less than or equal to 0.02; $p_2$ of the $N_2$ MCS levels respectively correspond to $p_2$ of the following eight code rates, where $p_2$ is a positive integer greater than or equal to 1 and less than or equal to 8: $0.399425+P2_1$, $0.469975+P2_2$, $0.535125+P2_3$, $0.602675+P2_4$, $0.6667+P2_5$, $0.730975+P2_6$, $0.802475+P2_7$, and $0.86225+P2_8$, where values of $P2_1$ to $P2_8$ are greater than or equal to −0.02 and less than or equal to 0.02; and $p_3$ of the $N_3$ MCS levels respectively correspond to $p_3$ of the following eight code rates, where $p_3$ is a positive integer greater than or equal to 1 and less than or equal to 8: $0.574833+P3_1$, $0.61845+P3_2$, $0.6667+P3_3$, $0.7207+P3_4$, $0.787767+P3_5$, $0.8409+P3_6$, $0.888517+P3_7$, and $0.9258+P3_8$, where values of $P3_1$ to $P3_8$ are greater than or equal to −0.02 and less than or equal to 0.02. In other words, a correspondence between the MCS levels and the code rates may be determined based on Table 15. Specifically, a code rate corresponding to an MCS level may be a sum of a code rate corresponding to an MCS level in Table 15 and an error value.

A manner of determining Table 16 is the same as the manner of determining Table 15. A difference lies in that Table 15 supports 64QAM at most, and Table 16 supports 256QAM at most.

TABLE 16

| MCS level | Modulation order | Code rate | Spectral efficiency | EsN0 | ΔEsN0 | BG |
|---|---|---|---|---|---|---|
| 0 | 2 | 0.07615 | 0.1523 | −8.47 | | 2 |
| 1 | 2 | 0.10475 | 0.2095 | −7.13875 | 1.33125 | 2 |
| 2 | 2 | 0.1393 | 0.2786 | −5.8075 | 1.33125 | 2 |
| 3 | 2 | 0.1921 | 0.3842 | −4.47625 | 1.33125 | 2 |
| 4 | 2 | 0.25 | 0.5 | −3.145 | 1.33125 | 2 |
| 5 | 2 | 0.33475 | 0.6695 | −1.6415 | 1.5035 | 2 |
| 6 | 2 | 0.43295 | 0.8659 | −0.138 | 1.5035 | 2 |
| 7 | 2 | 0.54555 | 1.0911 | 1.3655 | 1.5035 | 2 |
| 8 | 2 | 0.67 | 1.34 | 2.869 | 1.5035 | 2 |
| 9 | 2 | 0.79885 | 1.5977 | 4.62 | 1.751 | 1 |
| 10 | 4 | 0.399425 | 1.5977 | 4.62 | 0 | 2 |
| 11 | 4 | 0.48785 | 1.9514 | 5.959333 | 1.339333 | 2 |
| 12 | 4 | 0.5824 | 2.3296 | 7.298667 | 1.339333 | 2 |
| 13 | 4 | 0.67 | 2.68 | 8.638 | 1.339333 | 2 |
| 14 | 4 | 0.767675 | 3.0707 | 10.274 | 1.636 | 1 |
| 15 | 4 | 0.86225 | 3.449 | 11.91 | 1.636 | 1 |
| 16 | 6 | 0.574833 | 3.449 | 11.91 | 0 | 2 |
| 17 | 6 | 0.61845 | 3.7107 | 12.7725 | 0.8625 | 2 |
| 18 | 6 | 0.66685 | 4.0011 | 13.635 | 0.8625 | 2 |
| 19 | 6 | 0.760367 | 4.5622 | 15.35333 | 1.718333 | 1 |
| 20 | 6 | 0.843017 | 5.0581 | 17.07167 | 1.718333 | 1 |
| 21 | 6 | 0.910917 | 5.4655 | 18.79 | 1.718333 | 1 |
| 22 | 8 | 0.683188 | 5.4655 | 18.79 | 0 | 2 |
| 23 | 8 | 0.735625 | 5.885 | 20.0239 | 1.2339 | 1 |
| 24 | 8 | 0.788138 | 6.3051 | 21.2578 | 1.2339 | 1 |
| 25 | 8 | 0.845675 | 6.7654 | 22.4917 | 1.2339 | 1 |
| 26 | 8 | 0.888875 | 7.111 | 23.7256 | 1.2339 | 1 |
| 27 | 8 | 0.925788 | 7.4063 | 24.9595 | 1.2339 | 1 |
| 28 | | | Reserved | | | |
| 29 | | | Reserved | | | |
| 30 | | | Reserved | | | |
| 31 | | | Reserved | | | |

Optionally, in some embodiments, $q_1$ of the $M_1$ MCS levels respectively correspond to $q_1$ of the following 10 code rates, where $q_1$ is a positive integer greater than or equal to 1 and less than or equal to 10: $0.07615+Q1_1$, $0.10475+Q1_2$, $0.1393+Q1_3$, $0.1921+Q1_4$, $0.25+Q1_5$, $0.33475+Q1_6$, $0.43295+Q1_7$, $0.54555+Q1_8$, $0.67+Q1_9$, and $0.79885+Q1_{10}$, where values of $Q1_1$ to $Q1_{10}$ are greater than or equal to −0.02 and less than or equal to 0.02; $q_2$ of the $M_2$ MCS levels respectively correspond to $q_2$ of the following six code rates, where $q_2$ is a positive integer greater than or equal to 1 and less than or equal to 6: $0.399425+Q2_1$, $0.48785+Q2_2$, $0.5824+Q2_3$, $0.67+Q2_4$, $0.767675+Q2_5$, and $0.86225+Q2_6$, where values of $Q2_1$ to $Q2_6$ are greater than or equal to −0.02 and less than or equal to 0.02; $q_3$ of the $M_3$ MCS levels respectively correspond to $q_3$ of the following six code rates, where $q_3$ is a positive integer greater than or equal to 1 and less than or equal to 6: $0.574833+Q3_1$, $0.61845+Q3_2$, $0.66685+Q3_3$, $0.760367+Q3_4$, $0.843017+Q3_5$, and $0.910917+Q3_6$, where values of $Q3_1$ to $Q3_6$ are greater than or equal to −0.02 and less than or equal to 0.02; and $q_4$ of the $M_4$ MCS levels respectively correspond to $q_4$ of the following six code rates, where $q_3$ is a positive integer greater than or equal to 1 and less than or equal to $M_4$: $0.683188+Q4_1$, $0.735625+Q4_2$, $0.788138+Q4_3$, $0.845675+Q4_4$, $0.888875+Q4_5$, and $0.925788+Q4_6$, where values of $Q4_1$ to $Q4_6$ are greater than or equal to −0.02 and less than or equal to 0.02. In other words, a correspondence between the MCS levels and the code rates may be determined based on Table 16. Specifically, a code rate corresponding to an MCS level may be a sum of a code rate corresponding to an MCS level in Table 16 and an error value.

Table 17 is determined by the simulation result obtained when the transport block length is equal to 3840, and a row-column interleaver is added during simulation. In a process of determining Table 17, the MCS level corresponding to the code rate equal to 0.5 is not specially set, and an MCS level is not specifically set for the switching code rate 0.67 of the BG 2 and the BG 1.

In addition, a manner of determining Table 17 is the same as the manner of determining Table 1.

TABLE 17

| MCS level | Modulation order | Code rate | Spectral efficiency | EsN0 | ΔEsN0 | BG |
|---|---|---|---|---|---|---|
| 0 | 2 | 0.11645 | 0.2329 | −6.648 | | 2 |
| 1 | 2 | 0.1422 | 0.2844 | −5.709 | 0.939 | 2 |
| 2 | 2 | 0.17705 | 0.3541 | −4.77 | 0.939 | 2 |
| 3 | 2 | 0.2198 | 0.4396 | −3.831 | 0.939 | 2 |
| 4 | 2 | 0.26205 | 0.5241 | −2.892 | 0.939 | 2 |
| 5 | 2 | 0.3147 | 0.6294 | −1.953 | 0.939 | 2 |
| 6 | 2 | 0.3736 | 0.7472 | −1.014 | 0.939 | 2 |
| 7 | 2 | 0.43735 | 0.8747 | −0.075 | 0.939 | 2 |
| 8 | 2 | 0.50625 | 1.0125 | 0.864 | 0.939 | 2 |
| 9 | 2 | 0.58105 | 1.1621 | 1.803 | 0.939 | 2 |
| 10 | 2 | 0.6564 | 1.3128 | 2.742 | 0.939 | 2 |
| 11 | 2 | 0.7266 | 1.4532 | 3.681 | 0.939 | 1 |
| 12 | 2 | 0.79885 | 1.5977 | 4.62 | 0.939 | 1 |
| 13 | 4 | 0.399425 | 1.5977 | 4.62 | 0 | 2 |
| 14 | 4 | 0.472 | 1.888 | 5.661429 | 1.041429 | 2 |
| 15 | 4 | 0.539875 | 2.1595 | 6.702857 | 1.041429 | 2 |
| 16 | 4 | 0.608825 | 2.4353 | 7.744286 | 1.041429 | 2 |
| 17 | 4 | 0.675125 | 2.7005 | 8.785714 | 1.041429 | 2 |
| 18 | 4 | 0.737775 | 2.9511 | 9.827143 | 1.041429 | 1 |
| 19 | 4 | 0.8053 | 3.2212 | 10.86857 | 1.041429 | 1 |
| 20 | 4 | 0.86225 | 3.449 | 11.91 | 1.041429 | 1 |
| 21 | 6 | 0.574833 | 3.449 | 11.91 | 0 | 2 |
| 22 | 6 | 0.637317 | 3.8239 | 12.96443 | 1.054429 | 2 |
| 23 | 6 | 0.6877 | 4.1262 | 14.01886 | 1.054429 | 2 |
| 24 | 6 | 0.739083 | 4.4345 | 15.07329 | 1.054429 | 1 |
| 25 | 6 | 0.7997 | 4.7982 | 16.12771 | 1.054429 | 1 |
| 26 | 6 | 0.848233 | 5.0894 | 17.18214 | 1.054429 | 1 |
| 27 | 6 | 0.891567 | 5.3494 | 18.23657 | 1.054429 | 1 |
| 28 | 6 | 0.9258 | 5.5548 | 19.291 | 1.054429 | 1 |
| 29 | | | Reserved | | | |
| 30 | | | Reserved | | | |
| 31 | | | Reserved | | | |

Optionally, in some embodiments, $r_1$ of the $N_1$ MCS levels respectively correspond to $r_1$ of the following 13 code rates, where $r_1$ is a positive integer greater than or equal to 1 and less than or equal to $N_1$: $0.11645+R1_1$, $0.1422+R1_2$, $0.17705+R1_3$, $0.2198+R1_4$, $0.26205+R1_5$, $0.3147+R1_6$, $0.3736+R1_7$, $0.43735+R1_8$, $0.50625+R1_9$, $0.58105+R1_{10}$, $0.6564+R1_{11}$, $0.7266+R1_{12}$, and $0.79885+R1_{13}$, where values of $R1_1$ to $R1_{13}$ are greater than or equal to −0.02 and less than or equal to 0.02; $r_2$ of the $N_2$ MCS levels respectively correspond to $r_2$ of the following eight code rates, where $r_2$ is a positive integer greater than or equal to 1 and less than or equal to 8: $0.399425+R2_1$, $0.472+R2_2$, $0.539875+R2_3$, $0.608825+R2_4$, $0.675125+R2_5$, $0.737775+R2_6$, $0.8053+R2_7$, and $0.86225+R2_8$, where values of $R2_1$ to $R2_8$ are greater than or equal to −0.02 and less than or equal to 0.02; and $r_3$ of the $N_3$ MCS levels respectively correspond to $r_3$ of the following eight code rates, where $r_3$ is a positive integer greater than or equal to 1 and less than or equal to 8: $0.574833+R3_1$, $0.637317+R3_2$, $0.6877+R3_3$, $0.739083+R3_4$, $0.7997+R3_5$, $0.848233+R3_6$, $0.891567+R3_7$, and $0.9258+R3_8$, where values of $R3_1$ to $R3_8$ are greater than or equal to −0.02 and less than or equal to 0.02. In other words, a correspondence between the MCS levels and the code rates may be determined based on Table 17. Specifically, a code rate corresponding to an MCS level may be a sum of a code rate corresponding to an MCS level in Table 17 and an error value.

A manner of determining Table 18 is the same as the manner of determining Table 17. A difference lies in that Table 17 supports 64QAM at most, and Table 18 supports 256QAM at most.

TABLE 18

| MCS level | Modulation order | Code rate | Spectral efficiency | EsN0 | ΔEsN0 | BG |
|---|---|---|---|---|---|---|
| 0 | 2 | 0.07615 | 0.1523 | −8.47 | | 2 |
| 1 | 2 | 0.1077 | 0.2154 | −7.01556 | 1.454444 | 2 |
| 2 | 2 | 0.14665 | 0.2933 | −5.56111 | 1.454444 | 2 |
| 3 | 2 | 0.2087 | 0.4174 | −4.10667 | 1.454444 | 2 |
| 4 | 2 | 0.27505 | 0.5501 | −2.65222 | 1.454444 | 2 |
| 5 | 2 | 0.3624 | 0.7248 | −1.19778 | 1.454444 | 2 |
| 6 | 2 | 0.46065 | 0.9213 | 0.256667 | 1.454444 | 2 |
| 7 | 2 | 0.5734 | 1.1468 | 1.711111 | 1.454444 | 2 |
| 8 | 2 | 0.6907 | 1.3814 | 3.165556 | 1.454444 | 2 |
| 9 | 2 | 0.79885 | 1.5977 | 4.62 | 1.454444 | 1 |
| 10 | 4 | 0.399425 | 1.5977 | 4.62 | 0 | 2 |
| 11 | 4 | 0.493975 | 1.9759 | 6.078 | 1.458 | 2 |
| 12 | 4 | 0.596975 | 2.3879 | 7.536 | 1.458 | 2 |
| 13 | 4 | 0.687375 | 2.7495 | 8.994 | 1.458 | 2 |
| 14 | 4 | 0.7766 | 3.1064 | 10.452 | 1.458 | 1 |
| 15 | 4 | 0.86225 | 3.449 | 11.91 | 1.458 | 1 |
| 16 | 6 | 0.574833 | 3.449 | 11.91 | 0 | 2 |
| 17 | 6 | 0.651383 | 3.9083 | 13.286 | 1.376 | 2 |
| 18 | 6 | 0.714517 | 4.2871 | 14.662 | 1.376 | 1 |
| 19 | 6 | 0.79505 | 4.7703 | 16.038 | 1.376 | 1 |
| 20 | 6 | 0.8592 | 5.1552 | 17.414 | 1.376 | 1 |
| 21 | 6 | 0.910917 | 5.4655 | 18.79 | 1.376 | 1 |
| 22 | 8 | 0.683188 | 5.4655 | 18.79 | 0 | 2 |
| 23 | 8 | 0.735625 | 5.885 | 20.0239 | 1.2339 | 1 |
| 24 | 8 | 0.788138 | 6.3051 | 21.2578 | 1.2339 | 1 |
| 25 | 8 | 0.845675 | 6.7654 | 22.4917 | 1.2339 | 1 |
| 26 | 8 | 0.888875 | 7.111 | 23.7256 | 1.2339 | 1 |
| 27 | 8 | 0.925788 | 7.4063 | 24.9595 | 1.2339 | 1 |
| 28 | | | Reserved | | | |
| 29 | | | Reserved | | | |
| 30 | | | Reserved | | | |
| 31 | | | Reserved | | | |

Optionally, in some embodiments, $s_1$ of the $M_1$ MCS levels respectively correspond to $s_1$ of the following 10 code rates, where $s_1$ is a positive integer greater than or equal to 1 and less than or equal to 10: $0.07615+S1_1$, $0.1077+S1_2$, $0.14665+S1_3$, $0.2087+S1_4$, $0.27505+S1_5$, $0.3624+S1_6$, $0.46065+S1_7$, $0.5734+S1_8$, $0.6907+S1_9$, and $0.79885+S1_{10}$, where values of $S1_1$ to $S1_{10}$ are greater than or equal to −0.02 and less than or equal to 0.02; $\Omega$ of the $M_2$ MCS levels respectively correspond to $\Omega$ of the following six code rates, where $\Omega$ is a positive integer greater than or equal to 1 and less than or equal to 6: $0.399425+S2_1$, $0.493975+S2_2$, $0.596975+S2_3$, $0.687375+S2_4$, $0.7766+S2_5$, and $0.86225+S2_6$, where values of $S2_1$ to $S2_6$ are greater than or equal to −0.02 and less than or equal to 0.02; $s_3$ of the $M_3$ MCS levels respectively correspond to $s_3$ of the following six code rates, where $s_3$ is a positive integer greater than or equal to 1 and less than or equal to 6: $0.574833+S3_1$, $0.651383+S3_2$, $0.714517+S3_3$, $0.79505+S3_4$, $0.8592+S3_5$, and $0.910917+S3_6$, where values of $S3_1$ to $S3_6$ are greater than or equal to −0.02 and less than or equal to 0.02; and $s_4$ of the $M_4$ MCS levels respectively correspond to $s_4$ of the following six code rates, where $s_3$ is a positive integer greater than or equal to 1 and less than or equal to $M_4$: $0.683188+S4_1$, $0.735625+S4_2$, $0.788138+S4_3$, $0.845675+S4_4$, $0.888875+S4_5$, and $0.925788+S4_6$, where values of $S4_1$ to $S4_6$ are greater than or equal to −0.02 and less than or equal to 0.02. In other words, a correspondence between the MCS levels and the code rates may be determined based on Table 18. Specifically, a code rate corresponding to an MCS level may be a sum of a code rate corresponding to an MCS level in Table 18 and an error value.

Table 19 is determined by the simulation result obtained when the transport block length is equal to 8448, and a row-column interleaver is added during simulation. In a process of determining Table 19, the MCS level corresponding to the code rate equal to 0.5 is specially set.

In addition, a manner of determining Table 19 is the same as the manner of determining Table 1.

TABLE 19

| MCS level | Modulation order | Code rate | Spectral efficiency | EsN0 | ΔEsN0 | BG |
|---|---|---|---|---|---|---|
| 0 | 2 | 0.11645 | 0.2329 | −6.648 | | 2 |
| 1 | 2 | 0.1403 | 0.2806 | −5.77225 | 0.87575 | 2 |
| 2 | 2 | 0.17085 | 0.3417 | −4.8965 | 0.87575 | 2 |
| 3 | 2 | 0.21215 | 0.4243 | −4.02075 | 0.87575 | 2 |
| 4 | 2 | 0.25 | 0.5 | −3.145 | 0.87575 | 2 |
| 5 | 2 | 0.281 | 0.562 | −2.24668 | 0.898325 | 1 |
| 6 | 2 | 0.35345 | 0.7069 | −1.34835 | 0.898325 | 1 |
| 7 | 2 | 0.4122 | 0.8244 | −0.45003 | 0.898325 | 1 |
| 8 | 2 | 0.48055 | 0.9611 | 0.4483 | 0.898325 | 1 |
| 9 | 2 | 0.55045 | 1.1009 | 1.346625 | 0.898325 | 1 |
| 10 | 2 | 0.6178 | 1.2356 | 2.24495 | 0.898325 | 1 |
| 11 | 2 | 0.68925 | 1.3785 | 3.143275 | 0.898325 | 1 |
| 12 | 2 | 0.7618 | 1.5236 | 4.0416 | 0.898325 | 1 |
| 13 | 4 | 0.3809 | 1.5236 | 4.0416 | 0 | 1 |
| 14 | 4 | 0.4402 | 1.7608 | 5.148214 | 1.106614 | 1 |
| 15 | 4 | 0.511875 | 2.0475 | 6.254829 | 1.106614 | 1 |
| 16 | 4 | 0.587525 | 2.3501 | 7.361443 | 1.106614 | 1 |
| 17 | 4 | 0.658975 | 2.6359 | 8.468057 | 1.106614 | 1 |
| 18 | 4 | 0.7279 | 2.9116 | 9.574671 | 1.106614 | 1 |
| 19 | 4 | 0.8002 | 3.2008 | 10.68129 | 1.106614 | 1 |
| 20 | 4 | 0.861525 | 3.4461 | 11.7879 | 1.106614 | 1 |
| 21 | 6 | 0.57435 | 3.4461 | 11.7879 | 0 | 1 |
| 22 | 6 | 0.627567 | 3.7654 | 12.84413 | 1.056229 | 1 |
| 23 | 6 | 0.686883 | 4.1213 | 13.90036 | 1.056229 | 1 |
| 24 | 6 | 0.738683 | 4.4321 | 14.95659 | 1.056229 | 1 |
| 25 | 6 | 0.799033 | 4.7942 | 16.01281 | 1.056229 | 1 |
| 26 | 6 | 0.84815 | 5.0889 | 17.06904 | 1.056229 | 1 |
| 27 | 6 | 0.8919 | 5.3514 | 18.12527 | 1.056229 | 1 |
| 28 | 6 | 0.9258 | 5.5548 | 19.1815 | 1.056229 | 1 |
| 29 | | | Reserved | | | |
| 30 | | | Reserved | | | |
| 31 | | | Reserved | | | |

Optionally, in some embodiments, $t_1$ of the $N_1$ MCS levels respectively correspond to $t_1$ of the following 13 code rates, where $t_1$ is a positive integer greater than or equal to 1 and less than or equal to $N_1$: $0.11645+T1_1$, $0.1403+T1_2$, $0.17085+T1_3$, $0.21215+T1_4$, $0.25+T1_5$, $0.7618+T1_6$, $0.281+T1_7$, $0.35345+T1_8$, $0.4122+T1_9$, $0.48055+T1_{10}$, $0.55045+T1_{11}$, $0.6178+T1_{12}$, and $0.68925+T1_{13}$, where values of $T1_1$ to $T1_{13}$ are greater than or equal to −0.02 and less than or equal to 0.02; $t_2$ of the $N_2$ MCS levels respectively correspond to $t_2$ of the following eight code rates, where $t_2$ is a positive integer greater than or equal to 1 and less than or equal to $N_2$: $0.3809+T2_1$, $0.4402+T2_2$, $0.511875+T2_3$, $0.587525+T2_4$, $0.658975+T2_5$, $0.7279+T2_6$, $0.8002+T2_7$, and $0.861525+T2_8$, where values of $T2_1$ to $T2_8$ are greater than or equal to −0.02 and less than or equal to 0.02; and $t_3$ of the $N_3$ MCS levels respectively correspond to $t_3$ of the following two code rates, where $t_3$ is a positive integer greater than or equal to 1 and less than or equal to $N_3$: $0.57435+T3_1$, $0.627567+T3_2$, $0.686883+T3_3$, $0.738683+T3_4$, $0.799033+T3_5$, $0.84815+T3_6$, $0.8919+T3_7$, and $0.9258+T3_8$, where values of $T3_1$ to $T3_8$ are greater than or equal to −0.02 and less than or equal to 0.02. In other words, a correspondence between the MCS levels and the code rates may be determined based on Table 19. Specifically, a code rate corresponding to an MCS level may be a sum of a code rate corresponding to an MCS level in Table 19 and an error value.

A manner of determining Table 20 is the same as the manner of determining Table 19. A difference lies in that Table 19 supports 64QAM at most, and Table 20 supports 256QAM at most.

TABLE 20

| MCS level | Modulation order | Code rate | Spectral efficiency | EsN0 | ΔEsN0 | BG |
|---|---|---|---|---|---|---|
| 0 | 2 | 0.07615 | 0.1523 | −8.47 | | 2 |
| 1 | 2 | 0.10475 | 0.2095 | −7.13875 | 1.33125 | 2 |
| 2 | 2 | 0.1393 | 0.2786 | −5.8075 | 1.33125 | 2 |
| 3 | 2 | 0.1921 | 0.3842 | −4.47625 | 1.33125 | 2 |
| 4 | 2 | 0.25 | 0.5 | −3.145 | 1.33125 | 2 |
| 5 | 2 | 0.33195 | 0.6639 | −1.70768 | 1.43732 | 1 |
| 6 | 2 | 0.4248 | 0.8496 | −0.27036 | 1.43732 | 1 |
| 7 | 2 | 0.5363 | 1.0726 | 1.16696 | 1.43732 | 1 |
| 8 | 2 | 0.6476 | 1.2952 | 2.60428 | 1.43732 | 1 |
| 9 | 2 | 0.7618 | 1.5236 | 4.0416 | 1.43732 | 1 |
| 10 | 4 | 0.3809 | 1.5236 | 4.0416 | 0 | 1 |
| 11 | 4 | 0.473575 | 1.8943 | 5.59086 | 1.54926 | 1 |
| 12 | 4 | 0.57265 | 2.2906 | 7.14012 | 1.54926 | 1 |
| 13 | 4 | 0.6707 | 2.6828 | 8.68938 | 1.54926 | 1 |
| 14 | 4 | 0.7707 | 3.0828 | 10.23864 | 1.54926 | 1 |
| 15 | 4 | 0.8612 | 3.4448 | 11.7879 | 1.54926 | 1 |
| 16 | 6 | 0.574133 | 3.4448 | 11.7879 | 0 | 1 |
| 17 | 6 | 0.650117 | 3.9007 | 13.24398 | 1.45608 | 1 |
| 18 | 6 | 0.7294 | 4.3764 | 14.70006 | 1.45608 | 1 |
| 19 | 6 | 0.80615 | 4.8369 | 16.15614 | 1.45608 | 1 |
| 20 | 6 | 0.87275 | 5.2365 | 17.61222 | 1.45608 | 1 |
| 21 | 6 | 0.9225 | 5.535 | 19.0683 | 1.45608 | 1 |
| 22 | 8 | 0.691875 | 5.535 | 19.0683 | 0 | 1 |
| 23 | 8 | 0.745525 | 5.9642 | 20.21994 | 1.15164 | 1 |
| 24 | 8 | 0.797338 | 6.3787 | 21.37158 | 1.15164 | 1 |
| 25 | 8 | 0.851438 | 6.8115 | 22.52322 | 1.15164 | 1 |
| 26 | 8 | 0.89085 | 7.1268 | 23.67486 | 1.15164 | 1 |
| 27 | 8 | 0.925788 | 7.4063 | 24.8265 | 1.15164 | 1 |
| 28 | | | Reserved | | | |
| 29 | | | Reserved | | | |
| 30 | | | Reserved | | | |
| 31 | | | Reserved | | | |

Optionally, in some embodiments, $u_1$ of the $M_1$ MCS levels respectively correspond to $u_1$ of the following 10 code rates, where $u_1$ is a positive integer greater than or equal to 1 and less than or equal to 10: $0.07615+U1_1$, $0.10475+U1_2$, $0.1393+U1_3$, $0.1921+U1_4$, $0.25+U1_5$, $0.33195+U1_6$, $0.4248+U1_7$, $0.5363+U1_8$, $0.6476+U1_9$, and $0.7618+U1_{10}$, where values of $U1_1$ to $U1_{10}$ are greater than or equal to −0.02 and less than or equal to 0.02; $u_2$ of the $M_2$ MCS levels respectively correspond to $u_2$ of the following six code rates, where $u_2$ is a positive integer greater than or equal to 1 and less than or equal to 6: $0.3809+U2_1$, $0.473575+U2_2$, $0.57265+U2_3$, $0.6707+U2_4$, $0.7707+U2_5$, and $0.8612+U2_6$, where values of $U2_1$ to $U2_6$ are greater than or equal to −0.02 and less than or equal to 0.02; $u_3$ of the $M_3$ MCS levels respectively correspond to $u_3$ of the following six code rates, where $u_3$ is a positive integer greater than or equal to 1 and less than or equal to 6: $0.574133+U3_1$, $0.650117+U3_2$, $0.7294+U3_3$, $0.80615+U3_4$, $0.87275+U3_5$, and $0.9225+U3_6$, where values of $U3_1$ to $U3_6$ are greater than or equal to −0.02 and less than or equal to 0.02; and $u_4$ of the $M_4$ MCS levels respectively correspond to $u_4$ of the following six code rates, where $u_3$ is a positive integer greater than or equal to 1 and less than or equal to $M_4$: $0.691875+U4_1$, $0.745525+U4_2$, $0.797338+U4_3$, $0.851438+U4_4$, $0.89085+U4_5$, and $0.925788+U4_6$, where values of $U4_1$ to $U4_6$ are greater than or equal to −0.02 and less than or equal to 0.02. In other words, a correspondence between the MCS levels and the code rates may be determined based on Table 20. Specifically, a code rate corresponding to an MCS level may be a sum of a code rate corresponding to an MCS level in Table 20 and an error value.

It can be learned from Table 2 and Table 4 to Table 10 that correspondences that are between MCS levels and modulation schemes and that are obtained through simulation by using transport blocks of different lengths are the same.

Therefore, with reference to Table 2 and Table 4 to Table 10, Table 21 can be obtained when 64QAM is supported at most. Table 22 can be obtained when 256QAM is supported at most.

TABLE 21

| MCS level | Modulation order | Transport block length less than or equal to 308 | Transport block length greater than 308 and less than or equal to 3840 | Transport block size greater than 3840 |
|---|---|---|---|---|
| 0 | 2 | 0.1164 | 0.11645 | 0.11645 |
| 1 | 2 | 0.14355 | 0.14015 | 0.14015 |
| 2 | 2 | 0.1748 | 0.17095 | 0.17095 |
| 3 | 2 | 0.20895 | 0.2123 | 0.2123 |
| 4 | 2 | 0.25 | 0.25 | 0.25 |
| 5 | 2 | 0.30295 | 0.3017 | 0.3026 |
| 6 | 2 | 0.3648 | 0.36235 | 0.37285 |
| 7 | 2 | 0.43265 | 0.42695 | 0.44105 |
| 8 | 2 | 0.50865 | 0.4979 | 0.5202 |
| 9 | 2 | 0.5912 | 0.5748 | 0.59885 |
| 10 | 2 | 0.67685 | 0.65355 | 0.6789 |
| 11 | 2 | 0.7543 | 0.7275 | 0.76085 |
| 12 | 4 | 0.37715 | 0.36375 | 0.38043 |
| 13 | 4 | 0.43258 | 0.42163 | 0.4378 |
| 14 | 4 | 0.4931 | 0.47998 | 0.50175 |
| 15 | 4 | 0.55313 | 0.54278 | 0.56155 |
| 16 | 4 | 0.61913 | 0.60653 | 0.61965 |
| 17 | 4 | 0.68618 | 0.66963 | 0.68145 |
| 18 | 4 | 0.74668 | 0.72885 | 0.7455 |
| 19 | 4 | 0.80368 | 0.7921 | 0.8059 |
| 20 | 4 | 0.85648 | 0.85028 | 0.8613 |
| 21 | 6 | 0.57098 | 0.56685 | 0.5742 |
| 22 | 6 | 0.62092 | 0.6254 | 0.6297 |
| 23 | 6 | 0.67193 | 0.68335 | 0.68652 |
| 24 | 6 | 0.72208 | 0.7352 | 0.74525 |
| 25 | 6 | 0.76655 | 0.79195 | 0.80163 |
| 26 | 6 | 0.8093167 | 0.84598 | 0.855 |
| 27 | 6 | 0.8508167 | 0.88983 | 0.8976 |
| 28 | 6 | 0.8894 | 0.9258 | 0.93188 |
| 29 | | Reserved | | |
| 30 | | Reserved | | |
| 31 | | Reserved | | |

Table 21 shows a correspondence among MCS levels, modulation orders, and code rates in different transport block lengths when 64QAM is supported at most.

TABLE 22

| MCS level | Modulation order | Transport block length equal to 308 | Transport block length equal to 2560 | Transport block length greater than 3840 |
|---|---|---|---|---|
| 0 | 2 | | 0.07615 | 0.07615 |
| 1 | 2 | | 0.1038 | 0.1038 |
| 2 | 2 | | 0.1385 | 0.1385 |
| 3 | 2 | | 0.1916 | 0.1916 |
| 4 | 2 | | 0.25 | 0.25 |
| 5 | 2 | | 0.3259 | 0.334 |
| 6 | 2 | | 0.4135 | 0.4263 |
| 7 | 2 | | 0.51365 | 0.53645 |
| 8 | 2 | | 0.6225 | 0.6472 |
| 9 | 2 | | 0.7275 | 0.76085 |
| 10 | 4 | | 0.36375 | 0.38043 |
| 11 | 4 | | 0.4564 | 0.47588 |
| 12 | 4 | | 0.5548 | 0.57355 |
| 13 | 4 | | 0.65683 | 0.66953 |
| 14 | 4 | | 0.75455 | 0.76983 |
| 15 | 4 | | 0.85028 | 0.8613 |
| 16 | 6 | | 0.56685 | 0.5742 |
| 17 | 6 | | 0.63717 | 0.64633 |
| 18 | 6 | | 0.6998 | 0.71735 |
| 19 | 6 | | 0.76912 | 0.79062 |
| 20 | 6 | | 0.836 | 0.85863 |
| 21 | 6 | | 0.88983 | 0.90988 |
| 22 | 8 | | 0.66738 | 0.68241 |
| 23 | 8 | | 0.72073 | 0.74005 |
| 24 | 8 | | 0.7804 | 0.79314 |
| 25 | 8 | | 0.83741 | 0.83415 |
| 26 | 8 | | 0.88539 | 0.88943 |
| 27 | 8 | | 0.92579 | 0.92579 |
| 28 | | Reserved | | |
| 29 | | Reserved | | |
| 30 | | Reserved | | |
| 31 | | Reserved | | |

Table 22 shows a correspondence among MCS levels, modulation orders, and code rates in different transport block lengths when 256QAM is supported at most.

It can be learned from Table 21 and Table 22 that code rate parameters constructed by simulation data in different block lengths are nearly the same. Therefore, a correspondence that is between MCS levels and code rates and that is obtained through simulation in one transport block length may be equivalent to a correspondence between MCS levels and code rate in each transport block length.

Optionally, in some embodiments, the correspondence between the MCS levels and the code rates in each transport block length may be equivalent to a correspondence between MCS levels and code rates in a transport block length used relatively frequently in an actual network.

Optionally, in some other embodiments, values of code rates obtained through simulation by using different transport block lengths may be averaged, to determine the correspondence between MCS levels and code rates as a correspondence between MCS levels and an average code rate.

It should be noted that, in Table 21, code rates corresponding to modulation orders 25 to 28 corresponding to a block length less than or equal to 308 differ from code rates corresponding to the modulation orders 25 to 28 corresponding to other block lengths. However, the MCS levels correspond to higher-order modulation, and in an actual system, a combination of the block length less than or equal to 308 and higher-order modulation rarely occurs. Therefore, when an average code rate is taken, the code rates corresponding to the modulation orders 25 to 28 corresponding to the block length less than or equal to 308 may not participate in average calculation. In other words, when code rates corresponding to the modulation orders 25 to 28 are averaged, only code rates corresponding to the modulation orders 25 to 28 corresponding to a block length greater than 308 and less than or equal to 3840 and code rates corresponding to the modulation orders 25 to 28 corresponding to a block length greater than 3840 need to be averaged.

In another possible embodiment of the present invention, a method for determining a correspondence between the MCS levels and the modulation schemes is: According to an existing CQI information table, each CQI level includes a corresponding spectral efficiency $E_{CQI}$, and all corresponding code rates and modulation schemes are determined first. Table 23 and Table 24 are obtained.

Table 23 is a table that supports 64QAM at most.

TABLE 23

| CQI level | Modulation order | Spectral efficiency | Code rate (represented by a decimal) | Code rate (multiplied by 1024 and rounding) | EsN0 |
|---|---|---|---|---|---|
| 0 | | | Out of range | | |
| 1 | 2 | 0.1523 | 0.07615 | 78 | −8.47 |
| 2 | 2 | 0.2344 | 0.1172 | 120 | −6.617 |
| 3 | 2 | 0.377 | 0.1885 | 193 | −4.54 |
| 4 | 2 | 0.6016 | 0.3008 | 308 | −2.18 |
| 5 | 2 | 0.877 | 0.4385 | 449 | −0.06 |
| 6 | 2 | 1.1758 | 0.5879 | 602 | 1.888 |
| 7 | 2 | 1.4766 | 0.7383 | 756 | 3.82 |
| 8 | 4 | 1.9141 | 0.478525 | 490 | 5.78 |
| 9 | 4 | 2.4063 | 0.601575 | 616 | 7.62 |
| 10 | 4 | 2.7305 | 0.682625 | 699 | 9 |
| 11 | 4 | 3.3223 | 0.830575 | 851 | 11.31 |
| 12 | 6 | 3.9023 | 0.650383 | 666 | 13.26 |
| 13 | 6 | 4.5234 | 0.7539 | 772 | 15.267 |
| 14 | 6 | 5.1152 | 0.852533 | 873 | 17.273 |
| 15 | 6 | 5.5547 | 0.925783 | 948 | 19.29 |

Table 24 is a table that supports 256QAM at most.

TABLE 24

| CQI level | Modulation order | Spectral efficiency | Code rate (represented by a decimal) | Code rate (multiplied by 1024 and rounding) | EsN0 |
|---|---|---|---|---|---|
| 0 | | | Out of range | | |
| 1 | 2 | 0.1523 | 0.07615 | 78 | −8.47 |
| 2 | 2 | 0.377 | 0.1885 | 193 | −4.54 |
| 3 | 2 | 0.877 | 0.4385 | 449 | −0.06 |
| 4 | 2 | 1.4766 | 0.7383 | 756 | 3.82 |
| 5 | 4 | 1.9141 | 0.478525 | 490 | 5.78 |
| 6 | 4 | 2.4063 | 0.601575 | 616 | 7.62 |
| 7 | 4 | 2.7305 | 0.682625 | 699 | 9 |
| 8 | 4 | 3.3223 | 0.830575 | 851 | 11.31 |
| 9 | 6 | 3.9023 | 0.650383 | 666 | 13.26 |
| 10 | 6 | 4.5234 | 0.7539 | 772 | 15.267 |
| 11 | 6 | 5.1152 | 0.852533 | 873 | 17.273 |
| 12 | 8 | 5.5547 | 0.694338 | 711 | 19.156 |
| 13 | 8 | 6.2266 | 0.778325 | 797 | 21.006 |
| 14 | 8 | 6.9141 | 0.864263 | 885 | 22.98 |
| 15 | 8 | 7.4063 | 0.925788 | 948 | 24.96 |

After all the corresponding code rates and modulation schemes are determined, the correspondence between the remaining MCS level and the modulation order is supplemented, so that working EsN0 corresponding to two adjacent MCS levels are close to ΔEsN0 as much as possible. In this way, Table 25 and Table 26 can be obtained. In a 256QAM table, MCS orders corresponding to some modulation order switching points are deleted due to the limitation on a total quantity of MCS orders.

Table 25 is a table that supports 64QAM at most.

TABLE 25

| MCS level | Modulation order | Code rate | Spectral efficiency | EsN0 | ΔEsN0 | BG |
|---|---|---|---|---|---|---|
| 0 | 2 | 0.07615 | 0.1523 | −8.47 | | 2 |
| 1 | 2 | 0.1172 | 0.2344 | −6.617 | 1.853 | 2 |
| 2 | 2 | 0.1885 | 0.377 | −4.54 | 2.077 | 2 |
| 3 | 2 | 0.24015 | 0.4803 | −3.36 | 1.18 | 2 |
| 4 | 2 | 0.3008 | 0.6016 | −2.18 | 1.18 | 2 |
| 5 | 2 | 0.3671 | 0.7342 | −1.12 | 1.06 | 2 |
| 6 | 2 | 0.4385 | 0.877 | −0.06 | 1.06 | 2 |
| 7 | 2 | 0.5103 | 1.0206 | 0.914 | 0.974 | 2 |

TABLE 25-continued

| MCS level | Modulation order | Code rate | Spectral efficiency | EsN0 | ΔEsN0 | BG |
|---|---|---|---|---|---|---|
| 8 | 2 | 0.5879 | 1.1758 | 1.888 | 0.974 | 2 |
| 9 | 2 | 0.66345 | 1.3269 | 2.829 | 0.941 | 2 |
| 10 | 2 | 0.7383 | 1.4766 | 3.77 | 0.941 | 1 |
| 11 | 2 | 0.79885 | 1.5977 | 4.62 | 0.85 | 1 |
| 12 | 4 | 0.399425 | 1.5977 | 4.62 | 0 | 2 |
| 13 | 4 | 0.478525 | 1.9141 | 5.78 | 1.16 | 2 |
| 14 | 4 | 0.5397 | 2.1588 | 6.7 | 0.92 | 2 |
| 15 | 4 | 0.601575 | 2.4063 | 7.62 | 0.92 | 2 |
| 16 | 4 | 0.643275 | 2.5731 | 8.27 | 0.65 | 2 |
| 17 | 4 | 0.682625 | 2.7305 | 8.92 | 0.65 | 1 |
| 18 | 4 | 0.7632 | 3.0528 | 10.185 | 1.265 | 1 |
| 19 | 4 | 0.830575 | 3.3223 | 11.45 | 1.265 | 1 |
| 20 | 4 | 0.86225 | 3.449 | 11.91 | 0.46 | 1 |
| 21 | 6 | 0.574833 | 3.449 | 11.91 | 0 | 2 |
| 22 | 6 | 0.650383 | 3.9023 | 13.26 | 1.35 | 2 |
| 23 | 6 | 0.69205 | 4.1523 | 14.25 | 0.99 | 1 |
| 24 | 6 | 0.7539 | 4.5234 | 15.24 | 0.99 | 1 |
| 25 | 6 | 0.808917 | 4.8535 | 16.35 | 1.11 | 1 |
| 26 | 6 | 0.852533 | 5.1152 | 17.46 | 1.11 | 1 |
| 27 | 6 | 0.897067 | 5.3824 | 18.375 | 0.915 | 1 |
| 28 | 6 | 0.925783 | 5.5547 | 19.29 | 0.915 | 1 |
| 29 | | | Reserved | | | |
| 30 | | | Reserved | | | |
| 31 | | | Reserved | | | |

Optionally, in some embodiments, $v_1$ of the $N_1$ MCS levels respectively correspond to $v_1$ of the following 12 code rates, where $v_1$ is a positive integer greater than or equal to 1 and less than or equal to $N_1$: $0.07615+V1_1$, $0.1172+V1_2$, $0.1885+V1_3$, $0.24015+V1_4$, $0.3008+V1_5$, $0.3671+V1_6$, $0.4385+V1_7$, $0.5103+V1_8$, $0.5879+V1_9$, $0.66345+V1_{10}$, $0.7383+V1_{11}$, and $0.79885+V1_{12}$, where values of $V1_1$ to $V1_{12}$ are greater than or equal to −0.02 and less than or equal to 0.02; $v_2$ of the $N_2$ MCS levels respectively correspond to $v_2$ of the following nine code rates, where $v_2$ is a positive integer greater than or equal to 1 and less than or equal to $N_2$: $0.399425+V2_1$, $0.478525+V2_2$, $0.5397+V2_3$, $0.601575+V2_4$, $0.643275+V2_5$, $0.682625+V2_6$, $0.7632+V2_7$, $0.830575+V2_8$, and $0.86225+V2_9$, where values of $V2_1$ to $V2_9$ are greater than or equal to −0.02 and less than or equal to 0.02; and $v_3$ of the $N_3$ MCS levels respectively correspond to $v_3$ of the following eight code rates, where $v_3$ is a positive integer greater than or equal to 1 and less than or equal to $N_3$: $0.574833+V3_1$, $0.650383+V3_2$, $0.69205+V3_3$, $0.7539+V3_4$, $0.808917+V3_5$, $0.852533+V3_6$, $0.897067+V3_7$, and $0.925783+V3_8$, where values of $V3_1$ to $V3_8$ are greater than or equal to −0.02 and less than or equal to 0.02. In other words, the correspondence between the MCS levels and the code rates may be determined based on Table 25. Specifically, a code rate corresponding to an MCS level may be a sum of a code rate corresponding to an MCS level in Table 25 and an error value.

Table 26 is a table that supports 256QAM at most.

TABLE 26

| MCS level | Modulation order | Code rate | Spectral efficiency | EsN0 | ΔEsN0 | BG |
|---|---|---|---|---|---|---|
| 0 | 2 | 0.07615 | 0.1523 | −8.47 | | 2 |
| 1 | 2 | 0.1885 | 0.377 | −4.54 | 3.93 | 2 |
| 2 | 2 | 0.3008 | 0.6016 | −2.18 | 2.36 | 2 |
| 3 | 2 | 0.4385 | 0.877 | −0.06 | 2.12 | 2 |
| 4 | 2 | 0.5879 | 1.1758 | 1.888 | 1.948 | 2 |
| 5 | 2 | 0.7383 | 1.4766 | 3.77 | 1.882 | 2 |
| 6 | 4 | 0.478525 | 1.9141 | 5.78 | 2.01 | 1 |
| 7 | 4 | 0.5397 | 2.1588 | 6.7 | 0.92 | 1 |
| 8 | 4 | 0.601575 | 2.4063 | 7.62 | 0.92 | 2 |

TABLE 26-continued

| MCS level | Modulation order | Code rate | Spectral efficiency | EsN0 | ΔEsN0 | BG |
|---|---|---|---|---|---|---|
| 9 | 4 | 0.643275 | 2.5731 | 8.27 | 0.65 | 2 |
| 10 | 4 | 0.682625 | 2.7305 | 8.92 | 0.65 | 1 |
| 11 | 4 | 0.7632 | 3.0528 | 10.185 | 1.265 | 1 |
| 12 | 4 | 0.830575 | 3.3223 | 11.45 | 1.265 | 1 |
| 13 | 6 | 0.650383 | 3.9023 | 13.26 | 1.81 | 2 |
| 14 | 6 | 0.69205 | 4.1523 | 14.25 | 0.99 | 1 |
| 15 | 6 | 0.7539 | 4.5234 | 15.24 | 0.99 | 1 |
| 16 | 6 | 0.808917 | 4.8535 | 16.35 | 1.11 | 1 |
| 17 | 6 | 0.852533 | 5.1152 | 17.46 | 1.11 | 1 |
| 18 | 8 | 0.694338 | 5.5547 | 19.156 | 1.696 | 1 |
| 19 | 8 | 0.723575 | 5.7886 | 19.77267 | 0.616667 | 1 |
| 20 | 8 | 0.748913 | 5.9913 | 20.38933 | 0.616667 | 1 |
| 21 | 8 | 0.778325 | 6.2266 | 21.006 | 0.616667 | 1 |
| 22 | 8 | 0.804375 | 6.435 | 21.664 | 0.658 | 1 |
| 23 | 8 | 0.838675 | 6.7094 | 22.322 | 0.658 | 1 |
| 24 | 8 | 0.864263 | 6.9141 | 22.98 | 0.658 | 1 |
| 25 | 8 | 0.88605 | 7.0884 | 23.64 | 0.66 | 1 |
| 26 | 8 | 0.907025 | 7.2562 | 24.3 | 0.66 | 1 |
| 27 | 8 | 0.925788 | 7.4063 | 24.96 | 0.66 | 1 |
| 28 | | | Reserved | | | |
| 29 | | | Reserved | | | |
| 30 | | | Reserved | | | |
| 31 | | | Reserved | | | |

Optionally, in some embodiments, $w_1$ of the $M_1$ MCS levels respectively correspond to $w_1$ of the following six code rates, where $w_1$ is a positive integer greater than or equal to 1 and less than or equal to 6: $0.07615+W1_1$, $0.1885+W1_2$, $0.3008+W1_3$, $0.4385+W1_4$, $0.5879+W1_5$, and $0.7383+W1_6$, where values of $B1_1$ to $B1_6$ are greater than or equal to −0.02 and less than or equal to 0.02; $w_2$ of the $M_2$ MCS levels respectively correspond to $w_2$ of the following seven code rates, where $w_2$ is a positive integer greater than or equal to 1 and less than or equal to 7: $0.478525+W2_1$, $0.5397+W2_2$, $0.601575+W2_3$, $0.643275+W2_4$, $0.682625+W2_5$, $0.7632+W2_6$, and $0.830575+W2_7$, where values of $W2_1$ to $W2_7$ are greater than or equal to −0.02 and less than or equal to 0.02; $w_3$ of the $M_3$ MCS levels respectively correspond to $w_3$ of the following five code rates, where $w_3$ is a positive integer greater than or equal to 1 and less than or equal to 5: $0.650383+W3_1$, $0.69205+W3_2$, $0.7539+W3_3$, $0.808917+W3_4$, and $0.852533+W3_5$, where values of $W3_1$ to $W3_5$ are greater than or equal to −0.02 and less than or equal to 0.02; and $w_4$ of the $M_4$ MCS levels respectively correspond to $w_4$ of the following six code rates, where $w_3$ is a positive integer greater than or equal to 1 and less than or equal to $M_4$: $0.694338+W4_1$, $0.723575+W4_2$, $0.748913+W4_3$, $0.778325+W4_4$, $0.804375+W4_5$, $0.838675+W4_6$, $0.864263+W4_7$, $0.88605+W4_8$, $0.907025+W4_9$, and $0.925788+W4_{10}$, where values of $W4_1$ to $W4_{10}$ are greater than or equal to −0.02 and less than or equal to 0.02. In other words, the correspondence between the MCS levels and the code rates may be determined based on Table 26. Specifically, a code rate corresponding to an MCS level may be a sum of a code rate corresponding to an MCS level in Table 26 and an error value.

Table 27 and Table 28 illustrate code rates obtained by multiplying code rate information by 1024 and rounding, that is, quantization code rates. An MCS level 0 in Table 27 is used as an example. A code rate corresponding to the MCS level 0 is equal to 0.07617. The code rate 78 corresponding to the MCS level 0 in Table 27 is obtained by multiplying 0.07617 by 1024 and rounding up. Table 27 is a table that supports 64QAM at most. Table 28 is a table that supports 256QAM at most.

TABLE 27

| MCS level | Modulation order | Code rate (*1024) | Spectral efficiency | EsN0 | ΔEsN0 | BG |
|---|---|---|---|---|---|---|
| 0 | 2 | 78 | 0.1523 | −8.47 | | 2 |
| 1 | 2 | 120 | 0.2344 | −6.617 | 1.853 | 2 |
| 2 | 2 | 193 | 0.377 | −4.54 | 2.077 | 2 |
| 3 | 2 | 246 | 0.4803 | −3.36 | 1.18 | 2 |
| 4 | 2 | 308 | 0.6016 | −2.18 | 1.18 | 2 |
| 5 | 2 | 376 | 0.7342 | −1.12 | 1.06 | 2 |
| 6 | 2 | 449 | 0.877 | −0.06 | 1.06 | 2 |
| 7 | 2 | 523 | 1.0206 | 0.914 | 0.974 | 2 |
| 8 | 2 | 602 | 1.1758 | 1.888 | 0.974 | 2 |
| 9 | 2 | 679 | 1.3269 | 2.829 | 0.941 | 2 |
| 10 | 2 | 756 | 1.4766 | 3.77 | 0.941 | 1 |
| 11 | 2 | 818 | 1.5977 | 4.62 | 0.85 | 1 |
| 12 | 4 | 409 | 1.5977 | 4.62 | 0 | 2 |
| 13 | 4 | 490 | 1.9141 | 5.78 | 1.16 | 2 |
| 14 | 4 | 553 | 2.1588 | 6.7 | 0.92 | 2 |
| 15 | 4 | 616 | 2.4063 | 7.62 | 0.92 | 2 |
| 16 | 4 | 659 | 2.5731 | 8.27 | 0.65 | 2 |
| 17 | 4 | 699 | 2.7305 | 8.92 | 0.65 | 1 |
| 18 | 4 | 782 | 3.0528 | 10.185 | 1.265 | 1 |
| 19 | 4 | 851 | 3.3223 | 11.45 | 1.265 | 1 |
| 20 | 4 | 883 | 3.449 | 11.91 | 0.46 | 1 |
| 21 | 6 | 589 | 3.449 | 11.91 | 0 | 2 |
| 22 | 6 | 666 | 3.9023 | 13.26 | 1.35 | 2 |
| 23 | 6 | 709 | 4.1523 | 14.25 | 0.99 | 1 |
| 24 | 6 | 772 | 4.5234 | 15.24 | 0.99 | 1 |
| 25 | 6 | 828 | 4.8535 | 16.35 | 1.11 | 1 |
| 26 | 6 | 873 | 5.1152 | 17.46 | 1.11 | 1 |
| 27 | 6 | 919 | 5.3824 | 18.375 | 0.915 | 1 |
| 28 | 6 | 948 | 5.5547 | 19.29 | 0.915 | 1 |
| 29 | | | Reserved | | | |
| 30 | | | Reserved | | | |
| 31 | | | Reserved | | | |

TABLE 28

| MCS level | Modulation order | Code rate (*1024) | Spectral efficiency | EsN0 | ΔEsN0 | BG |
|---|---|---|---|---|---|---|
| 0 | 2 | 78 | 0.1523 | −8.47 | | 2 |
| 1 | 2 | 193 | 0.377 | −4.54 | 3.93 | 2 |
| 2 | 2 | 308 | 0.6016 | −2.18 | 2.36 | 2 |
| 3 | 2 | 449 | 0.877 | −0.06 | 2.12 | 2 |
| 4 | 2 | 602 | 1.1758 | 1.888 | 1.948 | 2 |
| 5 | 2 | 756 | 1.4766 | 3.77 | 1.882 | 2 |
| 6 | 4 | 490 | 1.9141 | 5.78 | 2.01 | 1 |
| 7 | 4 | 553 | 2.1588 | 6.7 | 0.92 | 1 |
| 8 | 4 | 616 | 2.4063 | 7.62 | 0.92 | 2 |
| 9 | 4 | 659 | 2.5731 | 8.27 | 0.65 | 2 |
| 10 | 4 | 699 | 2.7305 | 8.92 | 0.65 | 1 |
| 11 | 4 | 782 | 3.0528 | 10.185 | 1.265 | 1 |
| 12 | 4 | 851 | 3.3223 | 11.45 | 1.265 | 1 |
| 13 | 6 | 666 | 3.9023 | 13.26 | 1.81 | 2 |
| 14 | 6 | 709 | 4.1523 | 14.25 | 0.99 | 1 |
| 15 | 6 | 772 | 4.5234 | 15.24 | 0.99 | 1 |
| 16 | 6 | 828 | 4.8535 | 16.35 | 1.11 | 1 |
| 17 | 6 | 873 | 5.1152 | 17.46 | 1.11 | 1 |
| 18 | 8 | 711 | 5.5547 | 19.156 | 1.696 | 1 |
| 19 | 8 | 741 | 5.7886 | 19.77267 | 0.616667 | 1 |
| 20 | 8 | 767 | 5.9913 | 20.38933 | 0.616667 | 1 |
| 21 | 8 | 797 | 6.2266 | 21.006 | 0.616667 | 1 |
| 22 | 8 | 824 | 6.435 | 21.664 | 0.658 | 1 |
| 23 | 8 | 859 | 6.7094 | 22.322 | 0.658 | 1 |
| 24 | 8 | 885 | 6.9141 | 22.98 | 0.658 | 1 |
| 25 | 8 | 907 | 7.0884 | 23.64 | 0.66 | 1 |
| 26 | 8 | 929 | 7.2562 | 24.3 | 0.66 | 1 |
| 27 | 8 | 948 | 7.4063 | 24.96 | 0.66 | 1 |
| 28 | | | Reserved | | | |
| 29 | | | Reserved | | | |
| 30 | | | Reserved | | | |
| 31 | | | Reserved | | | |

It may be understood that a value of a code rate needs to meet maximum precision supported by a wireless transmission device. Assuming that the maximum precision supported by the wireless transmission device is Qn, and a code rate corresponding to an MCS level needs to be quantized. A quantized code rate corresponding to each MCS level meets the following formula:

$$R_Y = opt(R_X * 2^{Qn})/2^{Qn}.$$

$R_Y$ represents a quantized code rate, Rx represents a code rate before quantization, and Qn is a positive integer greater than or equal to 1. opt(X) represents performing a rounding operation on X. The rounding operation may be rounding off, rounding up, rounding down, or another rounding manner.

Optionally, in some other embodiments, a code rate may be quantized without calculating a denominator but calculating only a numerator value of the code rate in specified quantization precision. A quantized code rate corresponding to each MCS level meets the following formula:

$$R_Y = opt(R_X * 2^{Qn}).$$

$R_Y$ represents a quantized code rate, $R_X$ represents a code rate before quantization, and Qn is a positive integer greater than or equal to 1. opt(X) represents performing a rounding operation on X. The rounding operation may be rounding off, rounding up, rounding down, or another rounding manner. For example, Qn=10, and $R_Y$ is a quantization code rate obtained by multiplying Rx by 1024 and rounding. The another rounding manner may be quantizing by rounding up, rounding down, or rounding off at a granularity of 0.5. Refer to the foregoing implementation. Details are not described herein again. It should be noted that only examples are provided herein. The present invention is not limited thereto.

Figure 4:
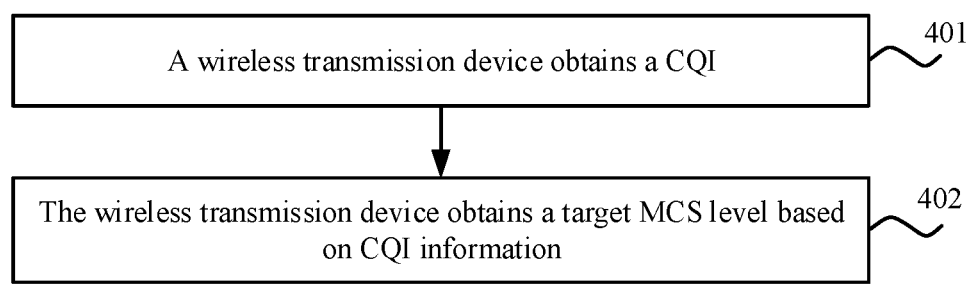
FIG. 4 is a schematic flowchart of an information processing method according to an embodiment of this application.

FIG. 4 is a schematic flowchart of an information processing method according to an embodiment of this application, and may be applied to step 101 in the foregoing method, to determine the target MCS level.

401. A wireless transmission device obtains a channel quality indicator (channel quality indication, CQI) level.

The CQI level is a CQI information table, for example, one of a plurality of CQI levels defined in Table 23 or Table 24 in the foregoing method embodiment, and is usually 0 to 15, or may be classified into more levels, for example, 0 to 31. The present invention is not limited thereto. The CQI level reflects channel quality. A larger value indicates better channel quality.

In a communications system, the CQI level is usually obtained by a terminal device through measurement and reported to a network side device, and the network side device may obtain the CQI level from received signaling.

In a possible implementation, the terminal device measures a pilot SINR and quantizes a measurement result to obtain the CQI level, and sends the CQI level to the network side device by using signaling. The network side device may obtain the CQI level from the received signaling.

402. The wireless transmission device obtains a target MCS level based on the CQI level.

The CQI information table includes at least a correspondence between the CQI levels and modulation schemes.

Table 29 shows a correspondence between CQI levels and modulation schemes, and may be used for a system to support a highest order of 64QAM. Table 30 shows another correspondence between CQI levels and modulation schemes, and may be used for a system to support a highest order of 256QAM.

TABLE 29

| CQI level | Modulation scheme |
| --- | --- |
| 1 | QPSK |
| 2 | QPSK |
| 3 | QPSK |
| 4 | QPSK |
| 5 | QPSK |
| 6 | QPSK |
| 7 | QPSK or 16QAM |
| 8 | 16QAM |
| 9 | 16QAM |
| 10 | 16QAM |
| 11 | 16QAM or 64QAM |
| 12 | 64QAM |
| 13 | 64QAM |
| 14 | 64QAM |
| 15 | 64QAM |

TABLE 30

| CQI level | Modulation scheme |
| --- | --- |
| 1 | QPSK |
| 2 | QPSK |
| 3 | QPSK |
| 4 | QPSK or 16QAM |
| 5 | 16QAM |
| 6 | 16QAM |
| 7 | 16QAM |
| 8 | 16QAM or 64QAM |
| 9 | 64QAM |
| 10 | 64QAM |
| 11 | 64QAM |
| 12 | 256QAM |
| 13 | 256QAM |
| 14 | 256QAM |
| 15 | 256QAM |

Optionally, a modulation scheme may be determined based on the CQI level and the correspondence between CQI levels and modulation schemes, and an MCS level of a modulation scheme whose order is close to or the same as that of the modulation scheme is selected as the target MCS level.

Optionally, in some embodiments, the order of the modulation scheme corresponding to the target MCS level is less than or equal to the order of the modulation scheme corresponding to the CQI level.

Optionally, in some embodiments, the wireless transmission device may obtain the target MCS level based on the correspondence between the CQI levels and the modulation schemes shown in Table 23 or Table 24 in the foregoing method embodiment and the CQI level.

Optionally, in some other embodiments, the wireless transmission device may obtain the target MCS level based on the correspondence between the CQI levels and the modulation schemes shown in Table 29 or Table 30 and the CQI level.

Table 31 shows another correspondence between CQI levels and modulation schemes, and may be used for a system to support a highest order of 64QAM. The correspondence between the CQI levels and the modulation schemes shown in Table 31 is obtained by adding a modulation scheme corresponding to a CQI level 0 based on Table 29. Table 32 shows another correspondence between CQI levels and modulation schemes, and may be used for a system to support a highest order of 256QAM. The correspondence between the CQI levels and the modulation schemes shown in Table 32 is obtained by adding a modulation scheme corresponding to a CQI level 0 based on Table 30.

TABLE 31

| CQI level | Modulation scheme |
| --- | --- |
| 0 | Out of range |
| 1 | QPSK |
| 2 | QPSK |
| 3 | QPSK |
| 4 | QPSK |
| 5 | QPSK |
| 6 | QPSK |
| 7 | QPSK or 16QAM |
| 8 | 16QAM |
| 9 | 16QAM |
| 10 | 16QAM |
| 11 | 16QAM or 64QAM |
| 12 | 64QAM |
| 13 | 64QAM |
| 14 | 64QAM |
| 15 | 64QAM |

TABLE 32

| CQI level | Modulation scheme |
| --- | --- |
| 0 | Out of range |
| 1 | QPSK |
| 2 | QPSK |
| 3 | QPSK |
| 4 | QPSK or 16QAM |
| 5 | 16QAM |
| 6 | 16QAM |
| 7 | 16QAM |
| 8 | 16QAM or 64QAM |
| 9 | 64QAM |
| 10 | 64QAM |
| 11 | 64QAM |
| 12 | 256QAM |
| 13 | 256QAM |
| 14 | 256QAM |
| 15 | 256QAM |

Optionally, in some other embodiments, the wireless transmission device may obtain the target MCS level based on the correspondence between the CQI levels and the modulation schemes shown in Table 31 or Table 32 and the CQI level.

The CQI level may also be a CQI index (Index). Similarly, an MCS level may alternatively be used as an MCS index.

Optionally, in some embodiments, the CQI information table further includes a correspondence among CQI levels, code rates, and spectral efficiency. As shown in Table 23 or Table 24, a correspondence between CQI levels and modulation schemes, a code rate, and spectral efficiency is included. Table 23 is a possible example of a CQI information table that is based on Table 29 or Table 31 and in which a highest modulation scheme is 64QAM. When a CQI level is 7, a modulation scheme is QPSK, and a modulation order is 2. When a CQI level is 11, a modulation scheme is 16QAM, and a modulation order is 4.

Table 33 is an example of another possible CQI information table based on Table 29 or Table 31. When a CQI level is 7, a modulation scheme is 16QAM, and a modulation order is 4. When a CQI level is 11, a modulation scheme is 16QAM, and a modulation order is 4. Other CQI levels are the same as the corresponding CQI levels in Table 23:

TABLE 33

| CQI level | Modulation order | Spectral efficiency | Code rate (represented by a decimal) | Code rate (multiplied by 1024 and rounding) | EsN0 |
| --- | --- | --- | --- | --- | --- |
| 0 | | | Out of range | | |
| 1 | 2 | 0.1523 | 0.07615 | 78 | −8.47 |
| 2 | 2 | 0.2344 | 0.1172 | 120 | −6.617 |
| 3 | 2 | 0.3770 | 0.1885 | 193 | −4.54 |
| 4 | 2 | 0.6016 | 0.3008 | 308 | −2.18 |
| 5 | 2 | 0.8770 | 0.4385 | 449 | −0.06 |
| 6 | 2 | 1.1758 | 0.5879 | 602 | 1.888 |
| 7 | 4 | 1.4766 | 0.36915 | 378 | 3.82 |
| 8 | 4 | 1.9141 | 0.478525 | 490 | 5.78 |
| 9 | 4 | 2.4063 | 0.601575 | 616 | 7.62 |
| 10 | 4 | 2.7305 | 0.682625 | 699 | 9 |
| 11 | 4 | 3.3223 | 0.830575 | 851 | 11.31 |
| 12 | 6 | 3.9023 | 0.650383 | 666 | 13.26 |
| 13 | 6 | 4.5234 | 0.7539 | 772 | 15.267 |
| 14 | 6 | 5.1152 | 0.852533 | 873 | 17.273 |
| 15 | 6 | 5.5547 | 0.925783 | 948 | 19.29 |

Based on Table 29 or Table 31, when a CQI level is 11, a modulation scheme may alternatively be 64QAM, and a modulation order is 6. Therefore, in the example of the another possible CQI information table in which a highest modulation scheme is 64QAM, when the CQI level is 11, the modulation order is changed to 6. Correspondingly, a code rate is 0.553717, and the code rate multiplied by 1024 is 567. When a CQI level is of another value, a modulation order and a code rate are the same as those in Table 33, as shown in Table 34. The rest may be deduced by analogy, and details are not described one by one.

TABLE 34

| CQI level | Modulation order | Spectral efficiency | Code rate (represented by a decimal) | Code rate (multiplied by 1024 and rounding) | EsN0 |
| --- | --- | --- | --- | --- | --- |
| 0 | | | Out of range | | |
| 1 | 2 | 0.1523 | 0.07615 | 78 | −8.47 |
| 2 | 2 | 0.2344 | 0.1172 | 120 | −6.617 |
| 3 | 2 | 0.3770 | 0.1885 | 193 | −4.54 |
| 4 | 2 | 0.6016 | 0.3008 | 308 | −2.18 |
| 5 | 2 | 0.8770 | 0.4385 | 449 | −0.06 |
| 6 | 2 | 1.1758 | 0.5879 | 602 | 1.888 |
| 7 | 4 | 1.4766 | 0.36915 | 378 | 3.82 |
| 8 | 4 | 1.9141 | 0.478525 | 490 | 5.78 |
| 9 | 4 | 2.4063 | 0.601575 | 616 | 7.62 |
| 10 | 4 | 2.7305 | 0.682625 | 699 | 9 |
| 11 | 6 | 3.3223 | 0.553717 | 567 | 11.31 |
| 12 | 6 | 3.9023 | 0.650383 | 666 | 13.26 |
| 13 | 6 | 4.5234 | 0.7539 | 772 | 15.267 |
| 14 | 6 | 5.1152 | 0.852533 | 873 | 17.273 |
| 15 | 6 | 5.5547 | 0.925783 | 948 | 19.29 |

Table 24 is an example of a possible CQI information table that is based on Table 30 or Table 32 and in which a highest modulation scheme is 256QAM. When a CQI level is 4, a modulation order is 2, and a modulation scheme is QPSK. When a CQI level is 8, a modulation order is 4, and a modulation scheme is 16QAM.

Table 35 is an example of another possible CQI information table that is based on Table 30 or Table 32 and in which a highest modulation scheme is 256QAM. When a CQI level is 4, a modulation order is 4, and a modulation scheme is 16QAM. When a CQI level is 8, a modulation order is 4, and a modulation scheme is 16QAM. Other CQI levels are the same as corresponding levels in Table 24:

TABLE 35

| CQI level | Modulation order | Spectral efficiency | Code rate (represented by a decimal) | Code rate (multiplied by 1024 and rounding) | EsN0 |
|---|---|---|---|---|---|
| 0 | | | Out of range | | |
| 1 | 2 | 0.1523 | 0.07615 | 78 | -8.47 |
| 2 | 2 | 0.377 | 0.1885 | 193 | -4.54 |
| 3 | 2 | 0.877 | 0.4385 | 449 | -0.06 |
| 4 | 4 | 1.4766 | 0.36915 | 378 | 3.82 |
| 5 | 4 | 1.9141 | 0.478525 | 490 | 5.78 |
| 6 | 4 | 2.4063 | 0.601575 | 616 | 7.62 |
| 7 | 4 | 2.7305 | 0.682625 | 699 | 9 |
| 8 | 4 | 3.3223 | 0.830575 | 851 | 11.31 |
| 9 | 6 | 3.9023 | 0.650383 | 666 | 13.26 |
| 10 | 6 | 4.5234 | 0.7539 | 772 | 15.267 |
| 11 | 6 | 5.1152 | 0.852533 | 873 | 17.273 |
| 12 | 8 | 5.5547 | 0.694338 | 711 | 19.156 |
| 13 | 8 | 6.2266 | 0.778325 | 797 | 21.006 |
| 14 | 8 | 6.9141 | 0.864263 | 885 | 22.98 |
| 15 | 8 | 7.4063 | 0.925788 | 948 | 24.96 |

Based on Table 30 or Table 32, when a CQI level is 8, a modulation scheme may alternatively be 64QAM, and a modulation order is 6. Therefore, in an example of another possible CQI information table in which a highest modulation scheme is 256QAM, when a CQI level is 8, a modulation order is 6. Correspondingly, a code rate is 0.553717, and a code rate multiplied by 1024 is 567. When a CQI level is of another value, a modulation order and a code rate are the same as those in Table 35, as shown in Table 36. The rest may be deduced by analogy, and details are not described one by one.

TABLE 36

| CQI level | Modulation order | Spectral efficiency | Code rate (represented by a decimal) | Code rate (multiplied by 1024 and rounding) | EsN0 |
|---|---|---|---|---|---|
| 0 | | | Out of range | | |
| 1 | 2 | 0.1523 | 0.07615 | 78 | -8.47 |
| 2 | 2 | 0.377 | 0.1885 | 193 | -4.54 |
| 3 | 2 | 0.877 | 0.4385 | 449 | -0.06 |
| 4 | 4 | 1.4766 | 0.36915 | 378 | 3.82 |
| 5 | 4 | 1.9141 | 0.478525 | 490 | 5.78 |
| 6 | 4 | 2.4063 | 0.601575 | 616 | 7.62 |
| 7 | 4 | 2.7305 | 0.682625 | 699 | 9 |
| 8 | 6 | 3.3223 | 0.553717 | 567 | 11.31 |
| 9 | 6 | 3.9023 | 0.650383 | 666 | 13.26 |
| 10 | 6 | 4.5234 | 0.7539 | 772 | 15.267 |
| 11 | 6 | 5.1152 | 0.852533 | 873 | 17.273 |
| 12 | 8 | 5.5547 | 0.694338 | 711 | 19.156 |
| 13 | 8 | 6.2266 | 0.778325 | 797 | 21.006 |
| 14 | 8 | 6.9141 | 0.864263 | 885 | 22.98 |
| 15 | 8 | 7.4063 | 0.925788 | 948 | 24.96 |

The wireless transmission device may determine, based on the correspondence between the CQI levels and the modulation schemes, the code rate information, and the spectral efficiency information shown in Table 23 or Table 24 or any one of Table 33 to Table 36 in the foregoing method embodiment and the CQI level, a modulation scheme, code rate information, and spectral efficiency information that correspond to the CQI level. The CQI table shown in Table 23 or Table 24 or any one of Table 33 to Table 36 in the foregoing method embodiment is an example of a correspondence between CQI levels and modulation schemes, code rate information, and spectral efficiency information when a highest-order modulation scheme of a system is 64QAM and 256QAM respectively. It may be understood that, in the example tables in this application document, the modulation schemes and the modulation orders corresponding to the modulation schemes may be mutually replaced, the code rates (multiplied by 1024 and rounding) and actual code rates (represented by decimals) may also be mutually replaced, Es/N0 is an optional column, Es represents a power per symbol, and N0 represents a noise power.

A higher level of a used modulation scheme indicates more carried information a higher probability of a demodulation error after channel transmission. In addition, a higher code rate indicates fewer parity bits and a higher probability of an error correction failure at a receiver. Therefore, to ensure overall spectral efficiency, an MCS and a transport block need to be adjusted, so that a code error rate is maintained at a proper level (a target is a block error ratio (Block Error Ratio, BELR)=10%) when a high rate of information transmission is ensured.

In a possible implementation, the wireless transmission device may match, based on one or more of the modulation scheme, the code rate information, and the spectral efficiency information that correspond to the CQI, an MCS level in the MCS table shown in the foregoing method embodiment, that is, the correspondence among the MCS levels, the modulation schemes, and the transport block parameters, so that a code error rate of the transport block is less than a threshold, for example, 0.1.

In another possible implementation, the wireless transmission device may also adjust the CQI level, and match the MCS level based on the adjusted CQI, so that a code error rate of the transport block is less than a threshold, for example, 0.1.

In another possible implementation, the wireless transmission device may select an MCS level from the MCS table shown in the foregoing method embodiment. A modulation scheme of the MCS level is the same as a modulation scheme corresponding to a CQI level or an adjusted CQI level, and a code rate is close to a code rate corresponding to the CQI level or the adjusted CQI level, or spectral efficiency is close to spectral efficiency corresponding to the CQI level or the adjusted CQI level. If a plurality of MCS levels are close to the code rate corresponding to the CQI level or the adjusted CQI level, an MCS level with a smallest code rate or smallest spectral efficiency may be selected.

Table 37 shows an example of an MCS table in which a highest-order modulation scheme is 64QAM.

TABLE 37

| CQI level | Modulation order | Code rate | Spectral efficiency | Code rate* 1024 |
|---|---|---|---|---|
| 0 | 2 | 0.1172 | 0.2344 | 120 |
| 1 | 2 | 0.1533 | 0.3066 | 157 |
| 2 | 2 | 0.1885 | 0.3770 | 193 |
| 3 | 2 | 0.2451 | 0.4902 | 251 |
| 4 | 2 | 0.3008 | 0.6016 | 308 |
| 5 | 2 | 0.3701 | 0.7402 | 379 |
| 6 | 2 | 0.4385 | 0.8770 | 449 |
| 7 | 2 | 0.51365 | 1.0273 | 526 |
| 8 | 2 | 0.5879 | 1.1758 | 602 |
| 9 | 2 | 0.6631 | 1.3262 | 679 |
| 10 | 4 | 0.332025 | 1.3281 | 340 |
| 11 | 4 | 0.36915 | 1.4766 | 378 |
| 12 | 4 | 0.423825 | 1.6953 | 434 |
| 13 | 4 | 0.478525 | 1.9141 | 490 |
| 14 | 4 | 0.54005 | 2.1602 | 553 |
| 15 | 4 | 0.601575 | 2.4063 | 616 |
| 16 | 4 | 0.642575 | 2.5703 | 658 |
| 17 | 6 | 0.427733 | 2.5664 | 438 |

TABLE 37-continued

| CQI level | Modulation order | Code rate | Spectral efficiency | Code rate* 1024 |
|---|---|---|---|---|
| 18 | 6 | 0.455083 | 2.7305 | 466 |
| 19 | 6 | 0.504883 | 3.0293 | 517 |
| 20 | 6 | 0.553717 | 3.3223 | 567 |
| 21 | 6 | 0.601567 | 3.6094 | 616 |
| 22 | 6 | 0.650383 | 3.9023 | 666 |
| 23 | 6 | 0.70215 | 4.2129 | 719 |
| 24 | 6 | 0.7539 | 4.5234 | 772 |
| 25 | 6 | 0.802733 | 4.8164 | 822 |
| 26 | 6 | 0.852533 | 5.1152 | 873 |
| 27 | 6 | 0.888667 | 5.3320 | 910 |
| 28 | 6 | 0.925783 | 5.5547 | 948 |
| 29 | 2 |  | Reserved |  |
| 30 | 4 |  | Reserved |  |
| 31 | 6 |  | Reserved |  |

In the forgoing examples of the CQI information tables in which the highest modulation scheme is 64QAM, when a CQI level is 7, spectral efficiency is 1.4766, and a corresponding MCS level in Table 37 is 11. When a CQI level is 10, spectral efficiency is 2.7305, and a corresponding MCS level in Table 37 is 18. When a CQI level is 11, spectral efficiency is 3.3223, and a corresponding MCS level in Table 37 is 20.

In a possible implementation, one or more of the MCS levels 17 to 20 in Table 37 may be adjusted, to obtain an MCS table corresponding to Table 33 or Table 34. For example, Table 38 shows an MCS table obtained after the MCS level 17 in Table 37 is adjusted.

TABLE 38

| CQI level | Modulation order | Code rate | Spectral efficiency | Code rate* 1024 |
|---|---|---|---|---|
| 0 | 2 | 0.1172 | 0.2344 | 120 |
| 1 | 2 | 0.1533 | 0.3066 | 157 |
| 2 | 2 | 0.1885 | 0.3770 | 193 |
| 3 | 2 | 0.2451 | 0.4902 | 251 |
| 4 | 2 | 0.3008 | 0.6016 | 308 |
| 5 | 2 | 0.3701 | 0.7402 | 379 |
| 6 | 2 | 0.4385 | 0.8770 | 449 |
| 7 | 2 | 0.51365 | 1.0273 | 526 |
| 8 | 2 | 0.5879 | 1.1758 | 602 |
| 9 | 2 | 0.6631 | 1.3262 | 679 |
| 10 | 4 | 0.332025 | 1.3281 | 340 |
| 11 | 4 | 0.36915 | 1.4766 | 378 |
| 12 | 4 | 0.423825 | 1.6953 | 434 |
| 13 | 4 | 0.478525 | 1.9141 | 490 |
| 14 | 4 | 0.54005 | 2.1602 | 553 |
| 15 | 4 | 0.601575 | 2.4063 | 616 |
| 16 | 4 | 0.642575 | 2.5703 | 658 |
| 17 | 4 | 0.682625 | 2.7305 | 699 |
| 18 | 6 | 0.455083 | 2.7305 | 466 |
| 19 | 6 | 0.504883 | 3.0293 | 517 |
| 20 | 6 | 0.553717 | 3.3223 | 567 |
| 21 | 6 | 0.601567 | 3.6094 | 616 |
| 22 | 6 | 0.650383 | 3.9023 | 666 |
| 23 | 6 | 0.70215 | 4.2129 | 719 |
| 24 | 6 | 0.7539 | 4.5234 | 772 |
| 25 | 6 | 0.802733 | 4.8164 | 822 |
| 26 | 6 | 0.852533 | 5.1152 | 873 |
| 27 | 6 | 0.888667 | 5.3320 | 910 |
| 28 | 6 | 0.925783 | 5.5547 | 948 |
| 29 | 2 |  | Reserved |  |
| 30 | 4 |  | Reserved |  |
| 31 | 6 |  | Reserved |  |

Table 38 may correspond to Table 34. When a highest modulation scheme is 64QAM, a modulation order is 4 when a CQI level in Table 34 is 7, and a modulation order is 4 when an MCS level corresponding to same spectral efficiency 1.4766 in Table 38 as spectral efficiency in Table 34 is 11; a modulation order is 4 when a CQI level in Table 34 is 10, and a modulation order is 4 when an MCS level corresponding to same spectral efficiency 2.7305 in Table 38 as spectral efficiency in Table 34 is 17; and a modulation order is 6 when a CQI level in Table 34 is 11, and a modulation order is 6 when an MCS level corresponding to same spectral efficiency 3.3223 in Table 38 as spectral efficiency in Table 34 is 20.

A wireless transmission device obtains a channel quality indicator (channel quality indication, CQI) level. For example, a CQI level is 10. The wireless transmission device obtains a target MCS level based on the CQI level. Table 34 and Table 38 are used as an example. Other tables are similar to Table 34 and Table 38, and are not described one by one below. When a CQI level is 10, a corresponding modulation scheme in Table 34 is 16QAM, and correspondingly, spectral efficiency is 2.7305. In Table 38, correspondingly, an MCS level corresponding to spectral efficiency close to or same as the spectral efficiency and corresponding to a same modulation scheme, for example, 17, may be used as the target MCS level. Therefore, the wireless transmission device may determine a corresponding code rate based on the target MCS level, and perform low-density parity-check code LDPC coding or decoding on a transport block based on the modulation scheme and the code rate. Other CQI levels are similar to the CQI level 10, and details are not described herein.

In another possible implementation, the MCS level 18 in Table 38 may be adjusted, so that a modulation order may be 4 when spectral efficiency is less than 3.3223. Correspondingly, information corresponding to the MCS level 18 in Table 38 may be as follows:

| 18 | 4 | 0.757325 | 3.0293 | 776, 775.5, or 775 |
|---|---|---|---|---|

In another possible implementation, a difference between Table 33 and Table 34 lies only in that modulation orders are different when a CQI level is 11. In Table 33, a modulation order is 4 when a CQI level is 11. To enable a modulation order to be 4 when spectral efficiency is equal to 3.3223, the MCS levels 18 and 19 in Table 38 may be adjusted, and correspondingly, information about the MCS levels 18 and 19 in Table 38 may be as follows:

| 18 | 4 | 0.757325 | 3.0293 | 776, 775.5, or 775 |
|---|---|---|---|---|
| 19 | 4 | 0.830575 | 3.3223 | 851, 850.5, or 850 |

In another possible implementation, based on adjustment of the MCS levels 18 and 19 in Table 38, the MCS level 20 may be further adjusted, so that spectral efficiency is 3.6094, and when the spectral efficiency is close to 3.3223, a modulation order is also 4. Correspondingly, information about the MCS levels 18, 19, and 20 in Table 38 may be as follows:

| 18 | 4 | 0.757325 | 3.0293 | 776, 775.5, or 775 |
|---|---|---|---|---|
| 19 | 4 | 0.830575 | 3.3223 | 851, 850.5, or 850 |
| 20 | 4 | 0.90235 | 3.6094 | 924 |

It may be understood that an MCS table whose highest modulation scheme is 64QAM may be Table 37 or Table 38, or a table obtained after one or more of the MCS levels 17 to 20 in Table 38 are adjusted in the foregoing manner. An MCS table or a CQI table whose highest modulation scheme is 64QAM may be stored in a wireless transmission device.

Table 39 shows an example of an MCS table in which a highest-order modulation scheme is 256QAM:

TABLE 39

| MCS level | Modulation order | Code rate | Spectral efficiency | Code rate* 1024 |
|---|---|---|---|---|
| 0 | 2 | 0.1172 | 0.2344 | 120 |
| 1 | 2 | 0.1885 | 0.3770 | 193 |
| 2 | 2 | 0.3008 | 0.6016 | 308 |
| 3 | 2 | 0.4385 | 0.8770 | 449 |
| 4 | 2 | 0.5879 | 1.1758 | 602 |
| 5 | 4 | 0.36915 | 1.4766 | 378 |
| 6 | 4 | 0.423825 | 1.6953 | 434 |
| 7 | 4 | 0.478525 | 1.9141 | 490 |
| 8 | 4 | 0.54005 | 2.1602 | 553 |
| 9 | 4 | 0.601575 | 2.4063 | 616 |
| 10 | 4 | 0.642575 | 2.5703 | 658 |
| 11 | 6 | 0.455083 | 2.7305 | 466 |
| 12 | 6 | 0.504883 | 3.0293 | 517 |
| 13 | 6 | 0.553717 | 3.3223 | 567 |
| 14 | 6 | 0.601567 | 3.6094 | 616 |
| 15 | 6 | 0.650383 | 3.9023 | 666 |
| 16 | 6 | 0.70215 | 4.2129 | 719 |
| 17 | 6 | 0.7539 | 4.5234 | 772 |
| 18 | 6 | 0.802733 | 4.8164 | 822 |
| 19 | 6 | 0.852533 | 5.1152 | 873 |
| 20 | 8 | 0.6665 | 5.3320 | 682, 682.5, or 683 |
| 21 | 8 | 0.694338 | 5.5547 | 711 |
| 22 | 8 | 0.736325 | 5.8906 | 754 |
| 23 | 8 | 0.778325 | 6.2266 | 797 |
| 24 | 8 | 0.821288 | 6.5703 | 841 |
| 25 | 8 | 0.864263 | 6.9141 | 885 |
| 26 | 8 | 0.895025 | 7.1602 | 916, 916.5, or 917 |
| 27 | 8 | 0.925788 | 7.4063 | 948 |
| 28 | 2 | | | Reserved |
| 29 | 4 | | | Reserved |
| 30 | 6 | | | Reserved |
| 31 | 8 | | | Reserved |

In the foregoing examples of the CQI information tables whose highest modulation schemes are 256QAM, as shown in Table 24, Table 30, Table 32, Table 35, or Table 36, when a CQI level is 4, spectral efficiency is 1.4766, and a corresponding MCS level in Table 39 is 5. When a CQI level is 7, spectral efficiency is 2.7305, and a corresponding MCS level in Table 39 is 11. When a CQI level is 8, spectral efficiency is 3.3223, and corresponding MCS level in Table 39 is 13.

In a possible implementation, one or more of the MCS levels 11 to 14 in Table 39 may be adjusted to obtain an MCS table corresponding to Table 35 or 36. For example, Table 40 is an MCS table obtained after the MCS level 11 in Table 39 is modulated.

TABLE 40

| MCS level | Modulation order | Code rate | Spectral efficiency | Code rate* 1024 |
|---|---|---|---|---|
| 0 | 2 | 0.1172 | 0.2344 | 120 |
| 1 | 2 | 0.1885 | 0.3770 | 193 |
| 2 | 2 | 0.3008 | 0.6016 | 308 |
| 3 | 2 | 0.4385 | 0.8770 | 449 |
| 4 | 2 | 0.5879 | 1.1758 | 602 |
| 5 | 4 | 0.36915 | 1.4766 | 378 |
| 6 | 4 | 0.423825 | 1.6953 | 434 |
| 7 | 4 | 0.478525 | 1.9141 | 490 |
| 8 | 4 | 0.54005 | 2.1602 | 553 |
| 9 | 4 | 0.601575 | 2.4063 | 616 |
| 10 | 4 | 0.642575 | 2.5703 | 658 |
| 11 | 4 | 0.682625 | 2.7305 | 699 |
| 12 | 6 | 0.504883 | 3.0293 | 517 |

TABLE 40-continued

| MCS level | Modulation order | Code rate | Spectral efficiency | Code rate* 1024 |
|---|---|---|---|---|
| 13 | 6 | 0.553717 | 3.3223 | 567 |
| 14 | 6 | 0.601567 | 3.6094 | 616 |
| 15 | 6 | 0.650383 | 3.9023 | 666 |
| 16 | 6 | 0.70215 | 4.2129 | 719 |
| 17 | 6 | 0.7539 | 4.5234 | 772 |
| 18 | 6 | 0.802733 | 4.8164 | 822 |
| 19 | 6 | 0.852533 | 5.1152 | 873 |
| 20 | 8 | 0.6665 | 5.3320 | 682, 682.5, or 683 |
| 21 | 8 | 0.694338 | 5.5547 | 711 |
| 22 | 8 | 0.736325 | 5.8906 | 754 |
| 23 | 8 | 0.778325 | 6.2266 | 797 |
| 24 | 8 | 0.821288 | 6.5703 | 841 |
| 25 | 8 | 0.864263 | 6.9141 | 885 |
| 26 | 8 | 0.895025 | 7.1602 | 916, 916.5, or 917 |
| 27 | 8 | 0.925788 | 7.4063 | 948 |
| 28 | 2 | | | Reserved |
| 29 | 4 | | | Reserved |
| 30 | 6 | | | Reserved |
| 31 | 8 | | | Reserved |

Table 40 may correspond to Table 36. When a highest modulation scheme is 256QAM, a modulation order is 4 when a CQI level in Table 36 is 4, and a modulation order is 4 when an MCS level corresponding to same spectral efficiency 1.4766 in Table 40 as spectral efficiency in Table 36 is 5; a modulation order is 4 when a CQI level in Table 36 is 4, and a modulation order is 4 when an MCS level corresponding to same spectral efficiency 2.7305 in Table 40 as spectral efficiency in Table 36 is 11; and a modulation order is 6 when a CQI level in Table 36 is 8, and a modulation order is 6 when an MCS level corresponding to same spectral efficiency 3.3223 in Table 40 as spectral efficiency in Table 36 is 13.

A wireless transmission device may obtain a channel quality indicator (channel quality indication, CQI) level. For example, a CQI level is 7. The wireless transmission device obtains a target MCS level based on the CQI level. Table 36 and Table 40 are used as an example. Other tables are similar to Table 36 and Table 40, and are not described one by one below. When a CQI level is 7, a corresponding modulation scheme in Table 36 is 16QAM, and correspondingly, spectral efficiency is 2.7305. In Table 40, an MCS level corresponding to spectral efficiency close to or same as the spectral efficiency and corresponding to a same modulation scheme, for example, 11, may be used as the target MCS level. Therefore, the wireless transmission device may determine a corresponding code rate based on the target MCS level, and perform low-density parity-check code LDPC coding or decoding on a transport block based on the modulation scheme and the code rate. Other CQI levels are similar to the CQI level 7, and details are not described herein.

In another possible implementation, the MCS level 12 in Table 40 may be adjusted, so that a modulation order may be 4 when spectral efficiency is less than 3.3223. Correspondingly, information corresponding to the MCS level 12 in Table 40 may be as follows:

| 12 | 4 | 0.757325 | 3.0293 | 776, 775.5, or 775 |
|---|---|---|---|---|

In another possible implementation, a difference between Table 35 and Table 36 lies only in that modulation orders are different when a CQI level is 8. In Table 35, a modulation order is 4 when a CQI level is 8. To enable a modulation order to be 4 when spectral efficiency is equal to 3.3223, the MCS levels 12 and 13 in Table 40 may be adjusted, and correspondingly, information about the MCS levels 12 and 13 in Table 40 may be as follows:

| | | | | |
|---|---|---|---|---|
| 12 | 4 | 0.757325 | 3.0293 | 776, 775.5, or 775 |
| 13 | 4 | 0.830575 | 3.3223 | 851, 850.5, or 850 |

In another possible implementation, based on adjustment of the MCS levels 12 and 13 in Table 40, the MCS level 14 may be further adjusted, so that spectral efficiency is 3.6094, and when the spectral efficiency is close to 3.3223, a modulation order is also 4. Correspondingly, information about the MCS levels 12, 13, and 14 in Table 40 may be as follows:

| | | | | |
|---|---|---|---|---|
| 12 | 4 | 0.757325 | 3.0293 | 776, 775.5, or 775 |
| 13 | 4 | 0.830575 | 3.3223 | 851, 850.5, or 850 |
| 14 | 4 | 0.90235 | 3.6094 | 924 |

It may be understood that an MCS table whose highest modulation scheme is 256QAM may be Table 39 or Table 40, or a table obtained after one or more of the MCS levels 11 to 14 in Table 40 are adjusted in the foregoing manner. An MCS table or a CQI table whose highest modulation scheme is 256QAM may be stored in a wireless transmission device.

Figure 5:
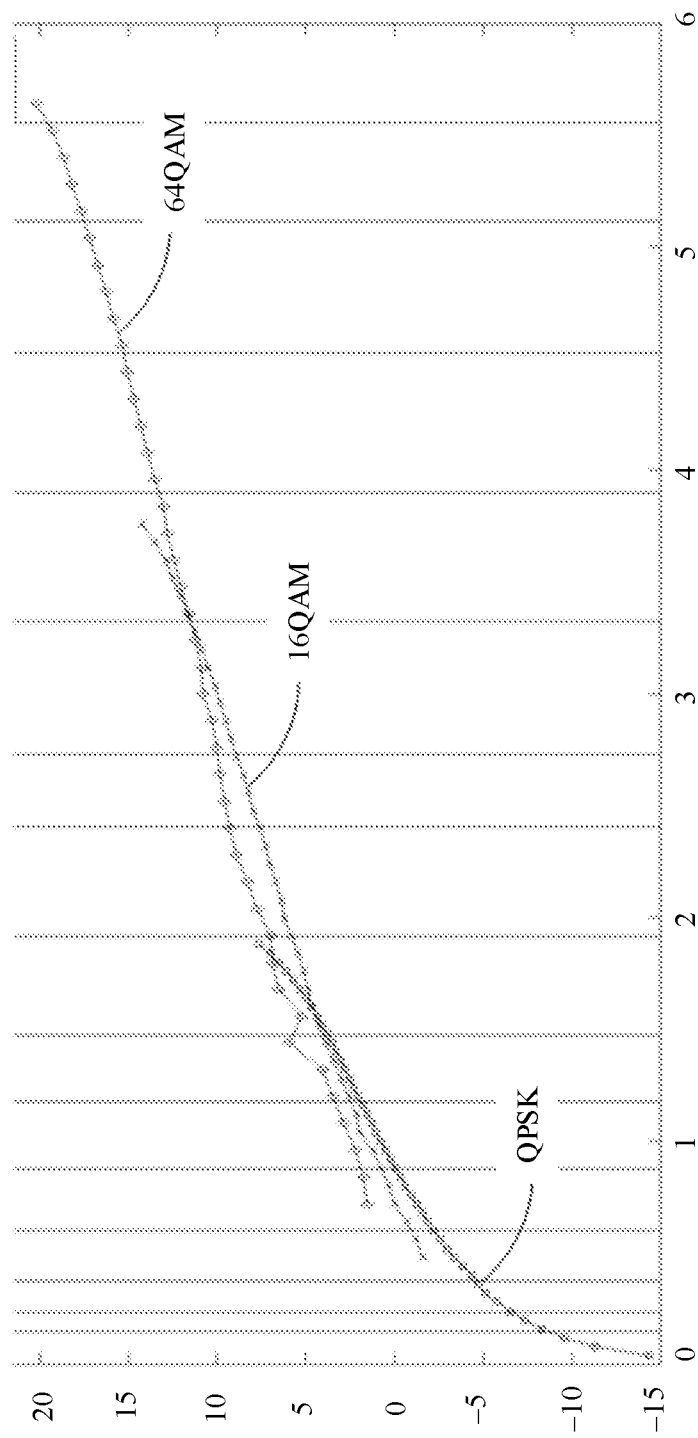
FIG. 5 is a simulation curve diagram of LDPC code at different code rates and in different modulation schemes when a highest modulation order of a system is 64QAM.

For example, data receiving and sending between a terminal device and a network side device are used as an example. The terminal device may measure a CQI and report the CQI to the network side device. The network side device obtains a target MCS level based on the CQI level reported by the terminal device, and indicates the target MCS level to the terminal device by using signaling. The terminal device obtains the target MCS level from the signaling. Both the network side device and the terminal device may determine, based on a correspondence between modulation schemes and transport block parameters, for example, any MCS table shown in the embodiments of the present invention, a target modulation scheme and a target transport block parameter that correspond to the target MCS level, thereby performing LDPC coding or decoding on a transport block based on the target modulation scheme and the target transport block parameter of the target MCS level. The network side device may obtain, based on the CQI level and a correspondence between CQI levels and modulation schemes, the target MCS level based on the CQI level reported by the terminal device. The correspondence between CQI levels and modulation schemes may be any CQI information table shown in the embodiments of the present invention. FIG. 5 is a simulation curve diagram of LDPC code at different code rates and in different modulation schemes when a highest modulation order of a system is 64QAM. A vertical axis of FIG. 5 represents an EsN0 required for reaching a BLER1e-1. A horizontal axis represents spectral efficiency. A circle symbol curve corresponds to QPSK, a cross symbol curve corresponds to 16QAM, and a rhombus symbol curve corresponds to 64QAM. Vertical lines in the figure represent spectral efficiency corresponding to each CQI level in a CQI table. An intersection point of a vertical line and a curve represents EsN0 required for reaching BLER1e-1 in this modulation scheme. If a vertical line intersects a plurality of curves, an intersection point with a smaller vertical coordinate value represents that BLER1e-1 may be reached by using lower EsN0 when a corresponding modulation scheme is used. Therefore, in spectral efficiency corresponding to the vertical line, a modulation scheme of a curve corresponding to the intersection point with the smaller vertical coordinate value should be selected.

For example, the 10th vertical line from left to right in FIG. 5 corresponds to the CQI level 10 in Table 23, spectral efficiency corresponding to the vertical line is 2.7305, there is an intersection point between the vertical line and the 16QAM curve and an intersection point between the vertical line and the 64QAM curve. The intersection point between the vertical line and the 16QAM curve is below all intersection points. Therefore, when the spectral efficiency is 2.7305, a code error rate is lowest and performance is best by using 16QAM. Therefore, a modulation scheme corresponding to the CQI level 10 should be 16QAM.

When the CQI level in Table 23 is 11, it can be learned from the 11th vertical line from left to right in FIG. 5 that performance of using 16QAM is quite close to that of using 64QAM. In a possible implementation, when the highest-order modulation scheme supported by the system is 64QAM, if the CQI level is 11, a modulation scheme may alternatively be 64QAM. That is, in Table 23, when the CQI level is 11, a modulation scheme may be one of 16QAM or 64QAM. A correspondence between CQI levels and modulation schemes may alternatively be shown in Table 29 or Table 31.

When the CQI level in Table 23 is 7, it can be learned from the seventh vertical line from left to right in FIG. 5 that performance of using QPSK is quite close to that of using 16QAM. In a possible implementation, when the highest-order modulation scheme supported by the system is 64QAM, if the CQI level is 7, a modulation mode may alternatively be 16QAM. That is, in Table 23, when the CQI level is 7, the modulation scheme may be one of QPSK or 16QAM. A correspondence between CQI levels and modulation schemes may alternatively be shown in Table 29 or Table 31.

Figure 6:
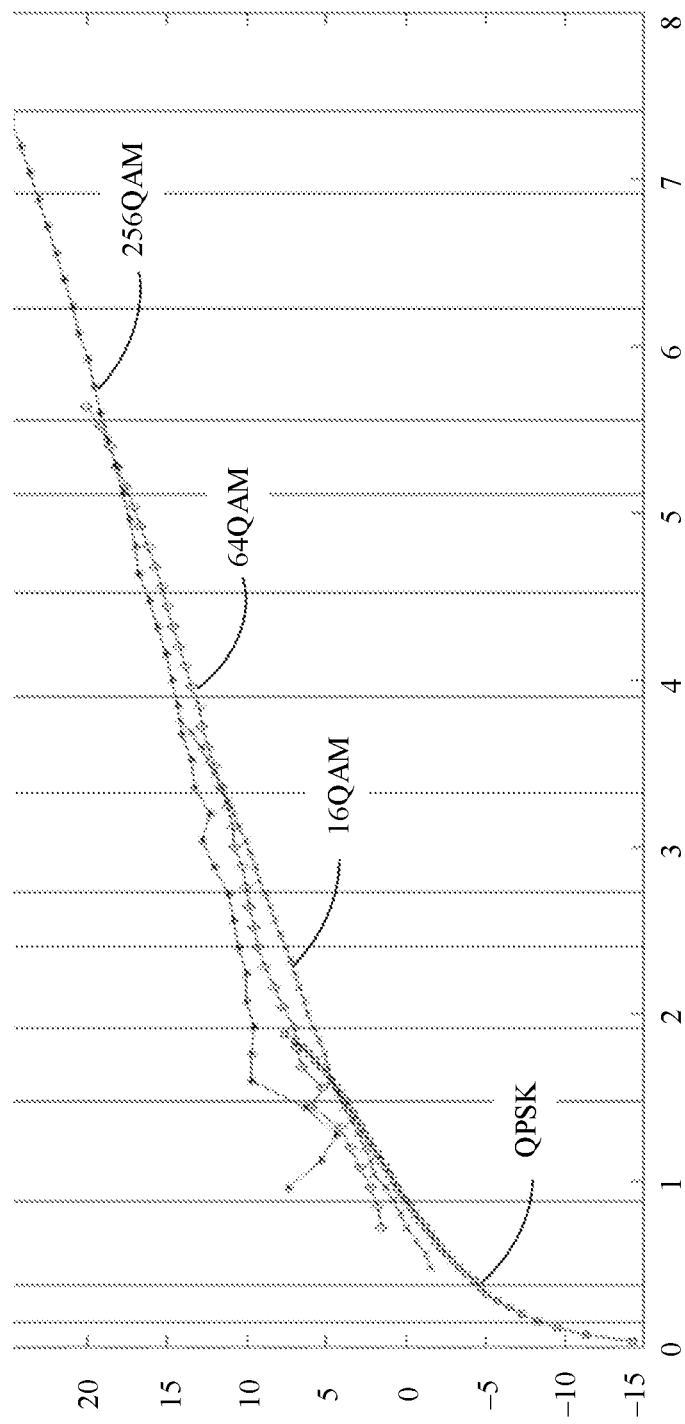
FIG. 6 is a simulation curve diagram of LDPC code at different code rates and in different modulation schemes when a highest modulation order of a system is 256QAM.

FIG. 6 is a simulation curve diagram of LDPC code at different code rates and in different modulation schemes when a highest modulation order of a system is 256QAM. A vertical axis represents EsN0 required for achieving BLER1e-1. A horizontal axis represents spectral efficiency. A circle symbol (o) curve corresponds to QPSK, a cross symbol (x) curve corresponds to 16QAM, a rhombus symbol (◊) curve corresponds to 64QAM, and a star symbol (*) curve corresponds to 256QAM. In FIG. 6, vertical lines represent spectral efficiency corresponding to each CQI level in a CQI table. An intersection point of a vertical line and a curve represents EsN0 required for reaching BLER1e-1 in this modulation scheme. If a vertical line intersects a plurality of curves, an intersection point with a smaller vertical coordinate value represents that BLER1e-1 may be reached by using lower EsN0 when a corresponding modulation scheme is used. Therefore, in spectral efficiency corresponding to the vertical line, a modulation scheme of a curve corresponding to the intersection point with the smaller vertical coordinate value should be selected.

When the CQI level in Table 24 is 8, it can be learned from the eighth vertical line from left to right in FIG. 6 that performance of using 16QAM is quite close to that of using 64QAM. In a possible implementation, when the highest-order modulation scheme supported by the system is 256QAM, if the CQI level is 8, a modulation scheme may alternatively be 64QAM. That is, in Table 24, when the CQI level is 11, a modulation scheme may be one of 16QAM or 64QAM. A correspondence between CQI levels and modulation schemes may alternatively be shown in Table 30 or Table 32.

When the CQI level in Table 24 is 4, it can be learned from the fourth vertical line from left to right in FIG. 6 that performance of using QPSK is quite close to that of using 16QAM. In a possible implementation, when the highest-order modulation scheme supported by the system is 256QAM, if the CQI level is 4, a modulation scheme may alternatively be 16QAM. That is, in Table 24, when the CQI level is 4, the modulation scheme may be one of QPSK or 16QAM. A correspondence between CQI levels and modulation schemes may alternatively be shown in Table 30 or Table 32.

Figure 7:
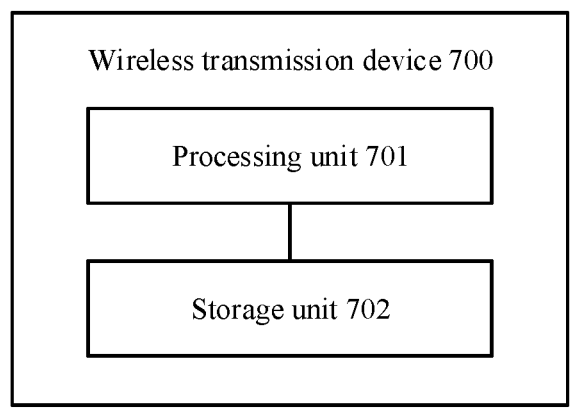
FIG. 7 is a structural block diagram of a wireless transmission device according to an embodiment of this application.

FIG. 7 is a structural block diagram of a wireless transmission device according to an embodiment of this application. As shown in FIG. 7, the wireless transmission device 700 may include a processing unit 701 and a storage unit 702, and may be used for a terminal device, or may be used for a network side device.

The processing unit 701 is configured to obtain a target modulation and coding scheme MCS level.

The processing unit 702 is further configured to determine, based on a correspondence that is among MCS levels, modulation schemes, and transport block parameters and that is stored in the storage unit, a target modulation scheme and a target transport block parameter that correspond to the target MCS level.

Optionally, in some embodiments, the processing unit 701 is further configured to perform low-density parity-check code LDPC coding or decoding on a transport block based on the target modulation scheme and the target transport block parameter.

The storage unit 702 may be a physically independent unit, or may be integrated with the processing unit 701.

For specific implementations and beneficial effects of the processing unit 701 and the storage unit 702, refer to the method shown in FIG. 1. Details are not described herein.

The processing unit may be implemented by a processor. The processor may be a central processing unit (CPU), a network processor (NP), or a combination of a CPU and an NP.

The processor may further include a hardware chip. The foregoing hardware chip may be an application-specific integrated circuit (ASIC), a programmable logic device (PLD), or a combination thereof. The PLD may be a complex programmable logic device (complex programmable logic device, CPLD), a field-programmable gate array (FPGA), generic array logic (generic array logic, GAL), or any combination of the CPLD, the FPGA, and the GAL.

The storage unit may be implemented by a memory. The memory may include a volatile memory, for example, a random access memory (RAM); or the memory may include a non-volatile memory, for example, a flash memory, a hard disk (HDD), or a solid-state drive (SSD); or the memory may include a combination of the foregoing types of memories.

Figure 8:
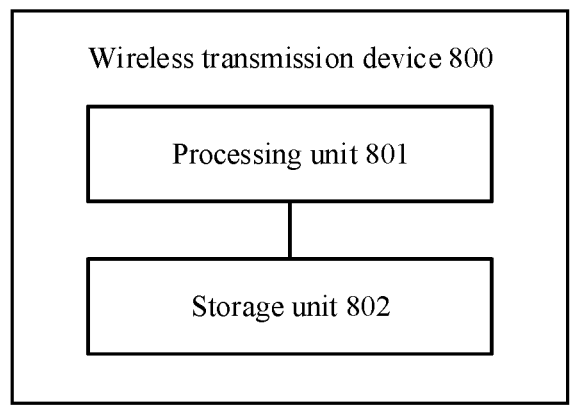
FIG. 8 is a structural block diagram of another wireless transmission device according to an embodiment of this application.

FIG. 8 is a structural block diagram of another wireless transmission device according to an embodiment of this application. As shown in FIG. 8, the wireless transmission device 800 includes a processing unit 801 and a storage unit 801, and may be used for a network side device.

The processing unit 801 is configured to obtain a channel quality indicator CQI level.

The processing unit 801 is further configured to obtain a target MCS level based on the CQI level and a correspondence that is between CQI levels and modulation schemes and that is stored in the storage unit 801.

For specific implementations and beneficial effects of the processing unit 801 and the storage unit 802, refer to the method shown in FIG. 4. Details are not described herein.

Another aspect of this application provides a wireless transmission device. The wireless transmission device further includes an encoder or an encoding unit.

Another aspect of this application provides a wireless transmission device. The wireless transmission device further includes a decoder or a decoding unit.

Another aspect of this application provides a computer-readable storage medium. The computer-readable storage medium stores an instruction. When the instruction is run on a computer, the computer is enabled to perform the method shown in FIG. 1.

Another aspect of this application provides a computer program product including an instruction. When the computer program product is run on a computer, the computer is enabled to perform the method shown in FIG. 1.

Another aspect of this application provides a computer-readable storage medium. The computer-readable storage medium stores an instruction. When the instruction is run on a computer, the computer is enabled to perform the method shown in FIG. 4.

Another aspect of this application provides a computer program product including an instruction. When the computer program product is run on a computer, the computer is enabled to perform the method shown in FIG. 4.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information processing method, comprising:
obtaining, by a wireless transmission device, a target modulation and coding scheme (MCS) level; and
determining, by the wireless transmission device based on a correspondence among MCS levels, modulation schemes, and transport block parameters, a target modulation scheme and a target transport block parameter that correspond to the target MCS level, wherein the correspondence among MCS levels, modulation schemes, and transport block parameters are stored in the wireless transmission device, and wherein the target modulation scheme and the target transport block parameter are used to perform low-density parity-check code (LDPC) coding or decoding on a transport block.

2. The method according to claim 1, wherein the transport block parameter comprises at least one of the following information: code rate information, quadrature amplitude modulation (QAM) symbol information, and LDPC base graph information.

3. The method according to claim 1, wherein a correspondence between the MCS levels and the modulation schemes comprises:
$N_1$ MCS levels correspond to quadrature phase shift keying (QPSK) modulation, $N_2$ MCS levels correspond to 16 quadrature amplitude modulation (QAM), and $N_3$ MCS levels correspond to 64QAM, wherein $N_1$ is equal to 11, 12, or 13, $N_2$ is equal to 8, 9, or 10, and $N_3$ is equal to 7, 8, or 9.

4. The method according to claim 1, wherein a correspondence between the MCS levels and the modulation schemes comprises:
$M_1$ MCS levels correspond to quadrature phase shift keying (QPSK) modulation, $M_2$ MCS levels correspond to 16 quadrature amplitude modulation (QAM), $M_3$ MCS levels correspond to 64QAM, and $M_4$ MCS levels correspond to 256QAM, wherein Mi is equal to 6, 9, 10, or 11, $M_2$ is equal to 5, 6, or 7, $M_3$ is equal to 5, 6, or 7, and $M_4$ is equal to 5, 6, 7, or 10.

5. The method according to claim 3, wherein ai of the $N_1$ MCS levels respectively correspond to $a_1$ of the following 12 code rates, wherein ai is a positive integer greater than or equal to 1 and less than or equal to $N_1$:
$0.11645+A1_1$, $0.14015+A1_2$, $0.17095+A1_3$, $0.2123+A1_4$, $0.25+A1_5$, $0.3026+A1_6$, $0.37285+A1_7$, $0.44105+A1_8$, $0.5202+A1_9$, $0.59885+A1_{10}$, $0.6789+A1_{11}$, and $0.76085+A1_{12}$, wherein values of $A1_1$ to $A1_{12}$ are greater than or equal to −0.02 and less than or equal to 0.02;
$a_2$ of the $N_2$ MCS levels respectively correspond to $a_2$ of the following nine code rates, wherein $a_2$ is a positive integer greater than or equal to 1 and less than or equal to 9:
$0.380425+A2_1$, $0.4378+A2_2$, $0.50175+A2_3$, $0.56155+A2_4$, $0.61965+A2_5$, $0.68145+A2_6$, $0.7455+A2_7$, $0.8059+A2_8$, and $0.8613+A2_9$, wherein values of $A2_1$ to $A2_9$ are greater than or equal to −0.02 and less than or equal to 0.02; and
$a_3$ of the $N_3$ MCS levels respectively correspond to $a_3$ of the following eight code rates, wherein $a_3$ is a positive integer greater than or equal to 1 and less than or equal to 8:
$0.5742+A3_1$, $0.6297+A3_2$, $0.686517+A3_3$, $0.74525+A3_4$, $0.801633+A3_5$, $0.855+A3_6$, $0.8976+A3_7$, and $0.931883+A3_8$, wherein values of $A3_1$ to $A3_8$ are greater than or equal to 0.02 and less than or equal to 0.02.

6. The method according to claim 4, wherein bi of the $M_1$ MCS levels respectively correspond to $b_1$ of the following 10 code rates, wherein $b_1$ is a positive integer greater than or equal to 1 and less than or equal to 10:
$0.07615+B1_1$, $0.1038+B1_2$, $0.1385+B1_3$, $0.1916+B1_4$, $0.25+B1_5$, $0.334+B1_6$, $0.4263+B1_7$, $0.53645+B1_8$, $0.6472+B1_9$, and $0.76085+B1_{10}$, wherein values of $B1_1$ to $B1_{10}$ are greater than or equal to −0.02 and less than or equal to 0.02;
$b_2$ of the $M_2$ MCS levels respectively correspond to $b_2$ of the following six code rates, wherein $b_2$ is a positive integer greater than or equal to 1 and less than or equal to 6:
$0.380425+B2_1$, $0.475875+B2_2$, $0.57355+B2_3$, $0.669525+B2_4$, $0.769825+B2_5$, and $0.8613+B2_6$, wherein values of $B2_1$ to $B2_6$ are greater than or equal to −0.02 and less than or equal to 0.02;
$b_3$ of the $M_3$ MCS levels respectively correspond to $b_3$ of the following six code rates, wherein $b_3$ is a positive integer greater than or equal to 1 and less than or equal to 6:
$0.5742+B3_1$, $0.646333+B3_2$, $0.71735+B3_3$, $0.790617+B3_4$, $0.858633+B3_5$, and $0.909883+B3_6$, wherein values of $B3_1$ to $B3_6$ are greater than or equal to −0.02 and less than or equal to 0.02; and
$b_4$ of the $M_4$ MCS levels respectively correspond to $b_4$ of the following six code rates, wherein $b_3$ is a positive integer greater than or equal to 1 and less than or equal to $M_4$:
$0.682413+B4_1$, $0.74005+B4_2$, $0.793138+B4_3$, $0.83415+B4_4$, $0.889425+B4_5$, and $0.925788+B4_6$, wherein values of $B4_1$ to $B4_6$ are greater than or equal to −0.02 and less than or equal to 0.02.

7. The method according to claim 3, wherein ci of the $N_1$ MCS levels respectively correspond to $c_1$ of the following 12 code rates, wherein $c_1$ is a positive integer greater than or equal to 1 and less than or equal to $N_1$:
$0.1164+C1_1$, $0.14355+C1_2$, $0.1748+C1_3$, $0.20895+C1_4$, $0.25+C1_5$, $0.30295+C1_6$, $0.3648+C1_7$, $0.43265+C1_8$, $0.50865+C1_9$, $0.5912+C1_{10}$, $0.67685+C1_{11}$, and $0.7543+C1_{12}$, wherein values of $C1_1$ to $C1_{12}$ are greater than or equal to −0.02 and less than or equal to 0.02;

$c_2$ of the $N_2$ MCS levels respectively correspond to $c_2$ of the following nine code rates, wherein $c_2$ is a positive integer greater than or equal to 1 and less than or equal to 9:

$0.37715+C2_1$, $0.432575+C2_2$, $0.4931+C2_3$, $0.553125+C2_4$, $0.619125+C2_5$, $0.686175+C2_6$, $0.746675+C2_7$, $0.803675+C2_8$, and $0.856475+C2_9$, wherein values of $C2_1$ to $C2_9$ are greater than or equal to −0.02 and less than or equal to 0.02; and $c_3$ of the $N_3$ MCS levels respectively correspond to c3 of the following eight code rates, wherein $C_3$ is a positive integer greater than or equal to 1 and less than or equal to 8:

$0.570983+C3_1$, $0.620917+C3_2$, $0.671933+C3_3$, $0.722083+C3_4$, $0.76655+C3_5$, $0.809317+C3_6$, $0.850817+C3_7$, and $0.8894+C3_8$, wherein values of $C3_1$ to $C3_8$ are greater than or equal to −0.02 and less than or equal to 0.02.

8. The method according to claim 3, wherein the transport block parameter comprises the code rate information, and $d_1$ of the $N_1$ MCS levels respectively correspond to $d_1$ of the following 12 code rates, wherein $d_1$ is a positive integer greater than or equal to 1 and less than or equal to $N_1$:

$0.1164+D1_1$, $0.1464+D1_2$, $0.1808+D1_3$, $0.21985+D1_4$, $0.26605+D1_5$, $0.31815+D1_6$, $0.3807+D1_7$, $0.4466+D1_8$, $0.5188+D1_9$, $0.5989+D1_{10}$, $0.6811+D1_{11}$, and $0.7543+D1_{12}$, wherein values of $D1_1$ to $D1_{12}$ are greater than or equal to −0.02 and less than or equal to 0.02;

$d_2$ of the $N_2$ MCS levels respectively correspond to $d_2$ of the following nine code rates, wherein $d_2$ is a positive integer greater than or equal to 1 and less than or equal to 9:

$0.37715+D2_1$, $0.432575+D2_2$, $0.4931+D2_3$, $0.553125+D2_4$, $0.619125+D2_5$, $0.686175+D2_6$, $0.746675+D2_7$, $0.803675+D2_8$, and $0.856475+D2_9$, wherein values of $D2_1$ to $D2_9$ are greater than or equal to −0.02 and less than or equal to 0.02; and $d_3$ of the $N_3$ MCS levels respectively correspond to $d_3$ of the following eight code rates, wherein $d_3$ is a positive integer greater than or equal to 1 and less than or equal to 8:

$0.56685+E3_1$, $0.616967+E3_2$, $0.666683+E3_3$, $0.721733+E3_4$, $0.781917+E3_5$, $0.840433+E3_6$, $0.887467+E3_7$, and $0.9258+E3_8$, wherein values of $D3_1$ to $D3_8$ are greater than or equal to −0.02 and less than or equal to 0.02.

9. The method according to claim 3, wherein the transport block parameter comprises the code rate information, and $e_1$ of the $N_1$ MCS levels respectively correspond to $e_1$ of the following 12 code rates, wherein $e_1$ is a positive integer greater than or equal to 1 and less than or equal to $N_1$:

$0.11645+E1_1$, $0.14015+E1_2$, $0.17095+E1_3$, $0.2123+E1_4$, $0.25+E1_5$, $0.3017+E1_6$, $0.36235+E1_7$, $0.42695+E1_8$, $0.4979+E1_9$, $0.5748+E1_{10}$, $0.65355+E1_{11}$, and $0.7275+E1_{12}$, wherein values of $E1_1$ to $E1_{12}$ are greater than or equal to −0.02 and less than or equal to 0.02;

$e_2$ of the $N_2$ MCS levels respectively correspond to $e_2$ of the following nine code rates, wherein $e_2$ is a positive integer greater than or equal to 1 and less than or equal to 9:

$0.36375+E2_1$, $0.421625+E2_2$, $0.479975+E2_3$, $0.542775+E2_4$, $0.606525+E2_5$, $0.669625+E2_6$, $0.72885+E2_7$, $0.7921+E2_8$, and $0.850275+E2_9$, wherein values of $E2_1$ to $E2_9$ are greater than or equal to −0.02 and less than or equal to 0.02; and $e_3$ of the $N_3$ MCS levels respectively correspond to $e_3$ of the following eight code rates, wherein $e_3$ is a positive integer greater than or equal to 1 and less than or equal to 8:

$0.56685+E3_1$, $0.616967+E3_2$, $0.666683+E3_3$, $0.721733+E3_4$, $0.781917+E3_5$, $0.840433+E3_6$, $0.887467+E3_7$, and $0.9258+E3_8$, wherein values of $E3_1$ to $E3_8$ are greater than or equal to −0.02 and less than or equal to 0.02.

10. The method according to claim 4, wherein the transport block parameter comprises the code rate information, and $f_1$ of the $M_1$ MCS levels respectively correspond to $f_1$ of the following 10 code rates, wherein $f_1$ is a positive integer greater than or equal to 1 and less than or equal to 10:

$0.07615+F1_1$, $0.1038+F1_2$, $0.1385+F1_3$, $0.1916+F1_4$, $0.25+F1_5$, $0.33505+F1_6$, $0.4337+F1_7$, $0.5477+F1_8$, $0.67+F1_9$, and $0.7275+F1_{10}$, wherein values of $F1_1$ to $F1_{10}$ are greater than or equal to −0.02 and less than or equal to 0.02;

$f_2$ of the $M_2$ MCS levels respectively correspond to $f_2$ of the following six code rates, wherein $f_2$ is a positive integer greater than or equal to 1 and less than or equal to 6:

$0.36375+F2_1$, $0.46505+F2_2$, $0.566+F2_3$, $0.67+F2_4$, $0.76105+F2_5$, and $0.850275+F2_6$, wherein values of $F2_1$ to $F2_6$ are greater than or equal to −0.02 and less than or equal to 0.02;

$f_3$ of the $M_3$ MCS levels respectively correspond to $f_3$ of the following six code rates, wherein $f_3$ is a positive integer greater than or equal to 1 and less than or equal to 6:

$0.56685+F3_1$, $0.618567+F3_2$, $0.67+F3_3$, $0.737517+F3_4$, $0.809533+F3_5$, and $0.889833+F3_6$, wherein values of $F3_1$ to $F3_6$ are greater than or equal to −0.02 and less than or equal to 0.02;

$f_4$ of the $M_4$ MCS levels respectively correspond to $f_4$ of the following six code rates, wherein $f_3$ is a positive integer greater than or equal to 1 and less than or equal to $M_4$:

$0.667375+F4_1$, $0.720725+F4_2$, $0.7804+F4_3$, $0.837413+F4_4$, $0.885388+F4_5$, and $0.925788+F4_6$, wherein values of $F4_1$ to $F4_6$ are greater than or equal to −0.02 and less than or equal to 0.02.

11. The method according to claim 3, wherein the transport block parameter comprises the code rate information, and $g_1$ of the $N_1$ MCS levels respectively correspond to $g_1$ of the following 12 code rates, wherein $g_1$ is a positive integer greater than or equal to 1 and less than or equal to $N_1$:

$0.11645+G1_1$, $0.14015+G1_2$, $0.17095+G1_3$, $0.2123+G1_4$, $0.25+G1_5$, $0.3017+G1_6$, $0.36235+G1_7$, $0.42695+G1_8$, $0.4979+G1_9$, $0.5748+G1_{10}$, $0.65355+G1_{11}$, and $0.7275+G1_{12}$, wherein values of $G1_1$ to $G1_{12}$ are greater than or equal to −0.02 and less than or equal to 0.02;

$g_2$ of the $N_2$ MCS levels respectively correspond to $g_2$ of the following nine code rates, wherein $g_2$ is a positive integer greater than or equal to 1 and less than or equal to 9:

$0.36375+G2_1$, $0.421625+G2_2$, $0.479975+G2_3$, $0.542775+G2_4$, $0.606525+G2_5$, $0.669625+G2_6$, $0.72885+G2_7$, $0.7921+G2_8$, and $0.850275+G2_9$, wherein values of $G2_1$ to $G2_9$ are greater than or equal to −0.02 and less than or equal to 0.02; and $g_3$ of the $N_3$ MCS levels respectively correspond to $g_3$ of the following eight code rates, wherein $g_3$ is a positive integer greater than or equal to 1 and less than or equal to 8:

0.56685+$G3_1$, 0.6254+$G3_2$, 0.68335+$G3_3$, 0.7352+$G3_4$, 0.79195+$G3_5$, 0.845983+$G3_6$, 0.889833+$G3_7$, and 0.9258+$G3_8$, wherein values of $G3_1$ to $G3_8$ are greater than or equal to −0.02 and less than or equal to 0.02.

12. The method according to claim 4, wherein the transport block parameter comprises the code rate information, and $h_1$ of the $M_1$ MCS levels respectively correspond to $h_1$ of the following 10 code rates, wherein $h_1$ is a positive integer greater than or equal to 1 and less than or equal to 10:

0.07615+$H1_1$, 0.1038+$H1_2$, 0.1385+$H1_3$, 0.1916+$H1_4$, 0.25+$H1_5$, 0.3259+$H1_6$, 0.4135+$H1_7$, 0.51365+$H1_8$, 0.6225+$H1_9$, and 0.7275+$H1_{10}$, where values of $H1_1$ to $H1_{10}$ are greater than or equal to −0.02 and less than or equal to 0.02;

$h_2$ of the $M_2$ MCS levels respectively correspond to $h_2$ of the following six code rates, wherein $h_2$ is a positive integer greater than or equal to 1 and less than or equal to 6:

0.36375+$H2_1$, 0.4564+$H2_2$, 0.5548+$H2_3$, 0.656825+$H2_4$, 0.75455+$H2_5$, and 0.850275+$H2_6$, wherein values of $H2_1$ to $H2_6$ are greater than or equal to −0.02 and less than or equal to 0.02;

$h_3$ of the $M_3$ MCS levels respectively correspond to $h_3$ of the following six code rates, wherein $h_3$ is a positive integer greater than or equal to 1 and less than or equal to 6:

0.56685+$H3_1$, 0.637167+$H3_2$, 0.6998+$H3_3$, 0.769117+$H3_4$, 0.836+$H3_5$, and 0.889833+$H3_6$, wherein values of $H3_1$ to $H3_6$ are greater than or equal to −0.02 and less than or equal to 0.02; and $h_4$ of the $M_4$ MCS levels respectively correspond to $h_4$ of the following six code rates, wherein $h_3$ is a positive integer greater than or equal to 1 and less than or equal to $M_4$:

0.667375+$H4_1$, 0.720725+$H4_2$, 0.7804+$H4_3$, 0.837413+$H4_4$, 0.885388+$H4_5$, and 0.925788+$H4_6$, wherein values of $H4_1$ to $H4_6$ are greater than or equal to −0.02 and less than or equal to 0.02.

13. The method according to claim 3, wherein the transport block parameter comprises the code rate information, and $i_1$ of the $N_1$ MCS levels respectively correspond to $i_1$ of the following 13 code rates, wherein $i_1$ is a positive integer greater than or equal to 1 and less than or equal to $N_1$:

0.1164+$I1_1$, 0.14395+$I1_2$, 0.17495+$I1_3$, 0.209+$I1_4$, 0.25+$I1_5$, 0.30165+$I1_6$, 0.3646+$I1_7$, 0.4314+$I1_8$, 0.50725+$I1_9$, 0.58645+$I1_{10}$, 0.6687+$I1_{11}$, and 0.7486+$I1_{12}$, and 0.8153+$I1_{13}$, wherein values of $I1_1$ to $I1_{13}$ are greater than or equal to −0.02 and less than or equal to 0.02;

$i_2$ of the $N_2$ MCS levels respectively correspond to $i_2$ of the following eight code rates, wherein $i_2$ is a positive integer greater than or equal to 1 and less than or equal to 8:

0.40765+$I2_1$, 0.4721+$I2_2$, 0.548525+$I2_3$, 0.621775+$I2_4$, 0.679175+$I2_5$, 0.7482+$I2_6$, 0.807325+$I2_7$, and 0.8516+$I2_8$, wherein values of $I2_1$ to $I2_8$ are greater than or equal to −0.02 and less than or equal to 0.02; and $i_3$ of the $N_3$ MCS levels respectively correspond to $i_3$ of the following eight code rates, wherein $i_3$ is a positive integer greater than or equal to 1 and less than or equal to 8:

0.567733+$I3_1$, 0.64035+$I3_2$, 0.6909+$I3_3$, 0.736917+$I3_4$, 0.7964+$I3_5$, 0.840233+$I3_6$, 0.8746+$I3_7$, and 0.9258+$I3_8$, where values of $I3_1$ to $I3_8$ are greater than or equal to −0.02 and less than or equal to 0.02.

14. The method according to claim 4, wherein the transport block parameter comprises the code rate information, and $j_1$ of the $M_1$ MCS levels respectively correspond to $j_1$ of the following 10 code rates, wherein $j_1$ is a positive integer greater than or equal to 1 and less than or equal to 10:

0.07615+$J1_1$, 0.10385+$J1_2$, 0.14265+$J1_3$, 0.19055+$J1_4$, 0.25+$J1_5$, 0.33785+$J1_6$, 0.44605+$J1_7$, 0.56845+$J1_8$, 0.7032+$J1_9$, and 0.8153+$J1_{10}$, wherein values of $J1_1$ to $J1_{10}$ are greater than or equal to −0.02 and is less than or equal to 0.02;

$j_2$ of the $M_2$ MCS levels respectively correspond to $j_2$ of the following six code rates, wherein $j_2$ is a positive integer greater than or equal to 1 and less than or equal to 6:

0.40765+$J2_1$, 0.5061+$J2_2$, 0.60705+$J2_3$, 0.69265+$J2_4$, 0.786075+$J2_5$, and 0.8516+$J2_6$, wherein values of $J2_1$ to $J2_6$ are greater than or equal to −0.02 and less than or equal to 0.02;

$j_3$ of the $M_3$ MCS levels respectively correspond to $j_3$ of the following six code rates, wherein $j_3$ is a positive integer greater than or equal to 1 and less than or equal to 6:

0.5677333+$J3_1$, 0.6500667+$J3_2$, 0.7232333+$J3_3$, 0.8008333+$J3_4$, 0.8519333+$J3_5$, and 0.9049+$J3_6$, wherein values of $J3_1$ to $J3_6$ are greater than or equal to −0.02 and less than or equal to 0.02; and $j_4$ of the $M_4$ MCS levels respectively correspond to $j_4$ of the following six code rates, wherein $j_3$ is a positive integer greater than or equal to 1 and less than or equal to $M_4$:

0.678675+$J4_1$, 0.7476625+$J4_2$, 0.8062625+$J4_3$, 0.8406875+$J4_4$, 0.90445+$J4_5$, and 0.9257875+$J4_6$, wherein values of $J4_1$ to $J4_6$ are greater than or equal to −0.02 and less than or equal to 0.02.

15. The method according to claim 3, wherein $k_1$ of the $N_1$ MCS levels respectively correspond to $k_1$ of the following 13 code rates, wherein $k_1$ is a positive integer greater than or equal to 1 and less than or equal to $N_1$:

0.1164+$K1_1$, 0.14645+$K1_2$, 0.1804+$K1_3$, 0.21875+$K1_4$, 0.2648+$K1_5$, 0.31645+$K1_6$, 0.3782+$K1_7$, 0.4451+$K1_8$, 0.51705+$K1_9$, 0.5971+$K1_{10}$, 0.6748+$K1_{11}$, 0.75135+$K1_{12}$, and 0.8153+$K1_{13}$, wherein values of $K1_1$ to $K1_{13}$ are greater than or equal to −0.02 and less than or equal to 0.02;

$k_2$ of the $N_2$ MCS levels respectively correspond to $k_2$ of the following eight code rates, wherein $k_2$ is a positive integer greater than or equal to 1 and less than or equal to 8:

0.40765+$K2_1$, 0.4721+$K2_2$, 0.548525+$K2_3$, 0.621775+$K2_4$, 0.679175+$K2_5$, 0.7482+$K2_6$, 0.807325+$K2_7$, and 0.8516+$K2_8$, wherein values of $K2_1$ to $K2_8$ are greater than or equal to −0.02 and less than or equal to 0.02; and $k_3$ of the $N_3$ MCS levels respectively correspond to $k_3$ of the following eight code rates, wherein $k_3$ is a positive integer greater than or equal to 1 and less than or equal to 8:

0.567733+$K3_1$, 0.64035+$K3_2$, 0.6909+$K3_3$, 0.736917+$K3_4$, 0.7964+$K3_5$, 0.840233+$K3_6$, 0.8746+$K3_7$, and 0.9258+$K3_8$, wherein values of $K3_1$ to $K3_8$ are greater than or equal to −0.02 and less than or equal to 0.02.

16. The method according to claim 4, wherein $o_1$ of the $M_1$ MCS levels respectively correspond to $o_1$ of the following 10 code rates, wherein $o_1$ is a positive integer greater than or equal to 1 and less than or equal to 10:

$0.07615+O1_1$, $0.1073+O1_2$, $0.15195+O1_3$, $0.20685+O1_4$, $0.2785+O1_5$, $0.36715+O1_6$, $0.4707+O1_7$, $0.58845+O1_8$, $0.7134+O1_9$, and $0.8153+O1_{10}$, wherein values of $O1_1$ to $O1_{10}$ are greater than or equal to −0.02 and less than or equal to 0.02;

$o_2$ of the $M_2$ MCS levels respectively correspond to $o_2$ of the following six code rates, wherein $o_2$ is a positive integer greater than or equal to 1 and less than or equal to 6:

$0.40765+O2_1$, $0.5061+O2_2$, $0.60705+O2_3$, $0.69265+O2_4$, $0.786075+O2_5$, and $0.8516+O2_6$, wherein values of $O2_1$ to $O2_6$ are greater than or equal to −0.02 and less than or equal to 0.02;

$o_3$ of the $M_3$ MCS levels respectively correspond to $o_3$ of the following six code rates, wherein $o_3$ is a positive integer greater than or equal to 1 and less than or equal to 6:

$0.5677333+O3_1$, $0.6500667+O3_2$, $0.7232333+O3_3$, $0.8008333+O3_4$, $0.8519333+O3_5$, and $0.9049+O3_6$, wherein values of $O3_1$ to $O3_6$ are greater than or equal to −0.02 and less than or equal to 0.02; and $o_4$ of the $M_4$ MCS levels respectively correspond to $o_4$ of the following six code rates, wherein $o_3$ is a positive integer greater than or equal to 1 and less than or equal to $M_4$:

$0.678675+O4_1$, $0.7476625+O4_2$, $0.8062625+O4_3$, $0.8406875+O4_4$, $0.90445+O4_5$, and $0.9257875+O4_6$, wherein values of $O4_1$ to $O4_6$ are greater than or equal to −0.02 and less than or equal to 0.02.

17. The method according to claim 3, wherein $p_1$ of the $N_1$ MCS levels respectively correspond to $p_1$ of the following 13 code rates, wherein $p_1$ is a positive integer greater than or equal to 1 and less than or equal to $N_1$:

$0.11645+P1_1$, $0.1403+P1_2$, $0.17085+P1_3$, $0.21215+P1_4$, $0.25+P1_5$, $0.3031+P1_6$, $0.3659+P1_7$, $0.43295+P1_8$, $0.50625+P1_9$, $0.5862+P1_{10}$, $0.6667+P1_{11}$, $0.732+P1_{12}$, and $0.79885+P1_{13}$, wherein values of $P1_1$ to $P1_{13}$ are greater than or equal to −0.02 and less than or equal to 0.02;

$p_2$ of the $N_2$ MCS levels respectively correspond to $p_2$ of the following eight code rates, wherein $p_2$ is a positive integer greater than or equal to 1 and less than or equal to 8:

$0.399425+P2_1$, $0.469975+P2_2$, $0.535125+P2_3$, $0.602675+P2_4$, $0.6667+P2_5$, $0.730975+P2_6$, $0.802475+P2_7$, and $0.86225+P2_8$, wherein values of $P2_1$ to $P2_8$ are greater than or equal to −0.02 and less than or equal to 0.02; and $p_3$ of the $N_3$ MCS levels respectively correspond to $p_3$ of the following eight code rates, wherein $p_3$ is a positive integer greater than or equal to 1 and less than or equal to 8:

$0.574833+P3_1$, $0.61845+P3_2$, $0.6667+P3_3$, $0.7207+P3_4$, $0.787767+P3_5$, $0.8409+P3_6$, $0.888517+P3_7$, and $0.9258+P3_8$, wherein values of $P3_1$ to $P3_8$ are greater than or equal to −0.02 and less than or equal to 0.02.

18. An information processing method, comprising:
obtaining a channel quality indicator (CQI) level; and
obtaining a target modulation and coding scheme (MCS) level based on the CQI level, wherein the CQI level is one of a plurality of CQI levels defined in a CQI information table, and the CQI information table comprises at least a correspondence between the CQI levels and modulation schemes, wherein the correspondence between the CQI levels and the modulation schemes is a first correspondence or a second correspondence, wherein the first correspondence comprises: modulation schemes corresponding to a CQI level 1 to a CQI level 6 are quadrature phase shift keying (QPSK), a modulation scheme corresponding to a CQI level 7 is QPSK or 16QAM, modulation schemes corresponding to a CQI level 8 to a CQI level 10 are 16QAM, a modulation scheme corresponding to a CQI level 11 is 16QAM or 64QAM, and a modulation scheme corresponding to a CQI level 12 is 64QAM; and the second correspondence comprises: modulation schemes corresponding to a CQI level 1 to a CQI level 3 are QPSK, a modulation scheme corresponding to a CQI level 4 is QPSK or 16QAM, a CQI level 5 to a CQI level 7 correspond to 16QAM, a CQI level 8 corresponds to 16QAM or 64QAM, a CQI level 9 to a CQI level 11 correspond to 64QAM, and a CQI level 12 to a CQI level 15 correspond to 256QAM.

19. The method according to claim 18, wherein the first correspondence comprises: a CQI level 0 is out of range, the modulation schemes corresponding to the CQI level 1 to the CQI level 6 are QPSK, the modulation scheme corresponding to the CQI level 7 is QPSK or 16QAM, the modulation schemes corresponding to the CQI level 8 to the CQI level 10 are 16QAM, the modulation scheme corresponding to the CQI level 11 is 16QAM or 64QAM, and the modulation scheme corresponding to the CQI level 12 is 64QAM; and the second correspondence comprises: a CQI level 0 is out of range, the modulation schemes corresponding to the CQI level 1 to the CQI level 3 are QPSK, the modulation scheme corresponding to the CQI level 4 is QPSK or 16QAM, the CQI level 5 to the CQI level 7 correspond to 16QAM, the CQI level 8 corresponds to 16QAM or 64QAM, the CQI level 9 to the CQI level 11 correspond to 64QAM, and the CQI level 12 to the CQI level 15 correspond to 256QAM.

20. A wireless transmission device, comprising a processor and a non-transitory memory coupled to the processor and having processor-executable instructions stored thereon, which when executed by the processor, cause the wireless transmission device to perform a method, comprising:
obtaining a target modulation and coding scheme (MCS) level; and
determining, based on a correspondence among MCS levels, modulation schemes, and transport block parameters, a target modulation scheme and a target transport block parameter that correspond to the target MCS level, wherein the correspondence among MCS levels, modulation schemes, and transport block parameters are stored in the wireless transmission device, and wherein the target modulation scheme and the target transport block parameter are used to perform low-density parity-check code (LDPC) coding or decoding on a transport block.

* * * * *

UNITED STATES PATENT AND TRADEMARK OFFICE
CERTIFICATE OF CORRECTION

PATENT NO. : 11,329,758 B2
APPLICATION NO. : 16/875766
DATED : May 10, 2022
INVENTOR(S) : Ma et al.

Page 1 of 2

It is certified that error appears in the above-identified patent and that said Letters Patent is hereby corrected as shown below:

In the Claims

Claim 4: Column 59, Line 65: "levels correspond to 256QAM, wherein Mi is equal to" should read -- levels correspond to 256QAM, wherein $M_1$ is equal to --.

Claim 5: Column 60, Line 1: "The method according to claim 3, wherein ai of the $N_1$" should read -- The method according to claim 3, wherein $a_1$ of the $N_1$ --.

Claim 5: Column 60, Line 3: "12 code rates, wherein ai is a positive integer greater than or" should read -- 12 code rates, wherein $a_1$ is a positive integer greater than or --.

Claim 6: Column 60, Line 29: "The method according to claim 4, wherein bi of the $M_1$" should read -- The method according to claim 4, wherein $b_1$ of the $M_1$ --.

Claim 7: Column 60, Line 62: "The method according to claim 3, wherein ci of the $N_1$" should read -- The method according to claim 3, wherein $c_1$ of the $N_1$ --.

Claim 7: Column 61, Line 13: "$c_3$ of the $N_3$ MCS levels respectively correspond to c3 of" should read -- $c_3$ of the $N_3$ MCS levels respectively correspond to $c_3$ of --.

Claim 8: Column 61, Lines 47-49: "0.56685+$E3_1$, 0.616967+$E3_2$, 0.666683+$E3_3$, 0.721733+$E3_4$, 0.781917+$E3_5$, 0.840433+$E3_6$, 0.887467+$E3_7$, and 0.9258+$E3_8$, wherein values of $D3_1$ to $D3_8$ are" should read -- 0.570983+$D3_1$, 0.620917+$D3_2$, 0.671933+$D3_3$, 0.722083+$D3_4$, 0.76655+$D3_5$, 0.809317+$D3_6$, 0.850817+$D3_7$, and 0.8894+$D3_8$, wherein values of $D3_1$ to $D3_8$ are --.

Claim 10: Column 62, Line 39: "than or equal to 0.02;" should read -- than or equal to 0.02; and --.

Claim 12: Column 63, Line 16: "0.6225+$H1_9$, and 0.7275+$H1_{10}$, where values of $H1_1$ to" should read -- 0.6225+$H1_9$, and 0.7275+$H1_{10}$, wherein values of $H1_1$ to --.

Signed and Sealed this
Eleventh Day of October, 2022

Katherine Kelly Vidal
*Director of the United States Patent and Trademark Office*

Claim 13: Column 64, Line 1: "$I3_8$, where values of $I3_1$ to $I3_8$ are greater than or equal" should read -- $I3_8$, wherein values of $I3_1$ to $I3_8$ are greater than or equal --.